US012496311B2

(12) United States Patent
Gruber et al.

(10) Patent No.: US 12,496,311 B2
(45) Date of Patent: Dec. 16, 2025

(54) METHODS FOR SAFELY REDUCING THROMBOPOIETIN

(71) Applicants: Aronora, Inc., Portland, OR (US); Oregon Health & Science University, Portland, OR (US); Ionis Pharmaceuticals, Inc., Carlsbad, CA (US)

(72) Inventors: Andras Gruber, Portland, OR (US); Erik Tucker, Portland, OR (US); Brett P. Monia, Encinitas, CA (US); Alexey Revenko, San Diego, CA (US)

(73) Assignees: Aronora, Inc., Portland, OR (US); Oregon Health & Science University, Portland, OR (US); Ionis Pharmaceuticals, Inc., Carlsbad, CA (US)

( * ) Notice: Subject to any disclaimer, the term of this patent is extended or adjusted under 35 U.S.C. 154(b) by 885 days.

(21) Appl. No.: 17/260,804

(22) PCT Filed: Jul. 16, 2019

(86) PCT No.: PCT/US2019/042033
§ 371 (c)(1),
(2) Date: Jan. 15, 2021

(87) PCT Pub. No.: WO2020/018558
PCT Pub. Date: Jan. 23, 2020

(65) Prior Publication Data
US 2021/0275569 A1 Sep. 9, 2021

Related U.S. Application Data

(60) Provisional application No. 62/699,487, filed on Jul. 17, 2018.

(51) Int. Cl.
*A61K 31/712* (2006.01)
*A61K 31/7115* (2006.01)
*A61P 7/02* (2006.01)

(52) U.S. Cl.
CPC ........ *A61K 31/7115* (2013.01); *A61K 31/712* (2013.01); *A61P 7/02* (2018.01)

(58) Field of Classification Search
None
See application file for complete search history.

(56) References Cited

U.S. PATENT DOCUMENTS

| | | |
|---|---|---|
| 3,687,808 A | 8/1972 | Merigan, Jr. et al. |
| 4,415,732 A | 11/1983 | Caruthers et al. |
| 4,469,863 A | 9/1984 | Ts'o et al. |
| 4,476,301 A | 10/1984 | Imbach et al. |
| 4,500,707 A | 2/1985 | Caruthers et al. |
| 4,725,677 A | 2/1988 | Koster et al. |
| 4,751,219 A | 6/1988 | Kempen |
| 4,845,205 A | 7/1989 | Dinh et al. |
| 4,973,679 A | 11/1990 | Caruthers et al. |
| 4,981,957 A | 1/1991 | Lebleu et al. |
| 5,013,830 A | 5/1991 | Ohutsuka et al. |
| 5,023,243 A | 6/1991 | Tullis |
| 5,034,506 A | 7/1991 | Summerton et al. |
| 5,118,800 A | 6/1992 | Smith et al. |
| 5,130,302 A | 7/1992 | Spielvogel et al. |
| 5,132,418 A | 7/1992 | Caruthers et al. |
| 5,134,066 A | 7/1992 | Rogers et al. |
| RE34,036 E | 8/1992 | McGeehan |
| 5,149,797 A | 9/1992 | Pederson et al. |
| 5,166,315 A | 11/1992 | Summerton et al. |
| 5,175,273 A | 12/1992 | Bischofberger et al. |
| 5,177,196 A | 1/1993 | Meyer, Jr. et al. |
| 5,177,198 A | 1/1993 | Spielvogel et al. |
| 5,185,444 A | 2/1993 | Summerton et al. |
| 5,188,897 A | 2/1993 | Suhadolnik et al. |
| 5,194,599 A | 3/1993 | Froehler et al. |
| 5,214,134 A | 5/1993 | Weis et al. |
| 5,216,141 A | 6/1993 | Benner |
| 5,220,007 A | 6/1993 | Pederson et al. |
| 5,223,618 A | 6/1993 | Cook et al. |
| 5,235,033 A | 8/1993 | Summerton et al. |
| 5,256,775 A | 10/1993 | Froehler |
| 5,264,423 A | 11/1993 | Cohen et al. |
| 5,264,562 A | 11/1993 | Matteucci |
| 5,264,564 A | 11/1993 | Matteucci |
| 5,276,019 A | 1/1994 | Cohen et al. |
| 5,286,717 A | 2/1994 | Cohen et al. |
| 5,319,080 A | 6/1994 | Leumann |
| 5,321,131 A | 6/1994 | Agrawal et al. |

(Continued)

FOREIGN PATENT DOCUMENTS

| WO | WO97046098 A1 | 12/1997 |
|---|---|---|
| WO | WO99014226 A2 | 3/1999 |

(Continued)

OTHER PUBLICATIONS

Vizio et al., International Journal of Molecular Sciences, 2021, vol. 22, pp. 1-17 (Year: 2021).*

(Continued)

*Primary Examiner* — Celine X Qian
(74) *Attorney, Agent, or Firm* — Michael Best & Friedrich LLP

(57) ABSTRACT

Provided herein are methods, compounds, and compositions for safely reducing thrombopoietin in a cell or an individual. Such methods, compounds, and compositions maintain platelet count within a safe hemostatic range. Such methods, compounds, and compositions are useful to safely treat, prevent, or ameliorate a disease that can benefit from platelet count reduction in an individual. Such methods, compounds, and compositions are useful for treating or preventing diseases in which thrombopoietin contributes to the presence or activation of platelets contributes to and promotes disease initiation or progression, and/or adversely affects disease outcome.

16 Claims, No Drawings

Specification includes a Sequence Listing.

(56) References Cited

U.S. PATENT DOCUMENTS

| | | | |
|---|---|---|---|
| 5,359,044 | A | 10/1994 | Cook et al. |
| 5,366,878 | A | 11/1994 | Pederson et al. |
| 5,367,066 | A | 11/1994 | Urdea et al. |
| 5,378,825 | A | 1/1995 | Cook et al. |
| 5,386,023 | A | 1/1995 | Sanghvi et al. |
| 5,393,878 | A | 2/1995 | Leumann |
| 5,399,676 | A | 3/1995 | Froehler |
| 5,403,711 | A | 4/1995 | Walder et al. |
| 5,405,938 | A | 4/1995 | Sumerton et al. |
| 5,405,939 | A | 4/1995 | Suhadolnik et al. |
| 5,432,272 | A | 7/1995 | Benner et al. |
| 5,434,257 | A | 7/1995 | Matteucci et al. |
| 5,446,137 | A | 8/1995 | Maag et al. |
| 5,453,496 | A | 9/1995 | Caruthers et al. |
| 5,455,233 | A | 10/1995 | Spielvogel et al. |
| 5,457,187 | A | 10/1995 | Gmeiner et al. |
| 5,457,191 | A | 10/1995 | Cook et al. |
| 5,459,255 | A | 10/1995 | Cook et al. |
| 5,466,677 | A | 11/1995 | Baxter et al. |
| 5,466,786 | A | 11/1995 | Burh et al. |
| 5,470,967 | A | 11/1995 | Huie et al. |
| 5,476,925 | A | 12/1995 | Letsinger et al. |
| 5,484,908 | A | 1/1996 | Froehler et al. |
| 5,489,677 | A | 2/1996 | Sanghvi et al. |
| 5,491,133 | A | 2/1996 | Walder et al. |
| 5,502,177 | A | 3/1996 | Matteucci et al. |
| 5,508,270 | A | 4/1996 | Baxter et al. |
| 5,514,785 | A | 5/1996 | Van Ness et al. |
| 5,519,126 | A | 5/1996 | Hecht |
| 5,519,134 | A | 5/1996 | Acevedo et al. |
| 5,525,711 | A | 6/1996 | Hawkins et al. |
| 5,527,899 | A | 6/1996 | Froehler |
| 5,536,821 | A | 7/1996 | Agrawal et al. |
| 5,541,306 | A | 7/1996 | Agrawal et al. |
| 5,541,307 | A | 7/1996 | Cook et al. |
| 5,550,111 | A | 8/1996 | Suhadolnik et al. |
| 5,552,540 | A | 9/1996 | Haralambidis et al. |
| 5,561,225 | A | 10/1996 | Maddry et al. |
| 5,563,253 | A | 10/1996 | Agrawal et al. |
| 5,565,350 | A | 10/1996 | Kmiec |
| 5,565,555 | A | 10/1996 | Froehler et al. |
| 5,567,811 | A | 10/1996 | Mistura et al. |
| 5,571,799 | A | 11/1996 | Tkachuk et al. |
| 5,576,427 | A | 11/1996 | Cook et al. |
| 5,587,361 | A | 12/1996 | Cook et al. |
| 5,587,469 | A | 12/1996 | Cook et al. |
| 5,587,470 | A | 12/1996 | Cook et al. |
| 5,591,722 | A | 1/1997 | Montgomery et al. |
| 5,594,121 | A | 1/1997 | Froehler et al. |
| 5,596,086 | A | 1/1997 | Matteucci |
| 5,596,091 | A | 1/1997 | Switzer et al. |
| 5,597,909 | A | 1/1997 | Urdea et al. |
| 5,602,240 | A | 2/1997 | De Mesmaeker et al. |
| 5,608,046 | A | 3/1997 | Cook et al. |
| 5,610,289 | A | 3/1997 | Cook et al. |
| 5,610,300 | A | 3/1997 | Altmann et al. |
| 5,614,617 | A | 3/1997 | Cook et al. |
| 5,618,704 | A | 4/1997 | Sanghvi et al. |
| 5,623,065 | A | 4/1997 | Cook et al. |
| 5,623,070 | A | 4/1997 | Cook et al. |
| 5,625,050 | A | 4/1997 | Beaton et al. |
| 5,627,053 | A | 5/1997 | Usman et al. |
| 5,633,360 | A | 5/1997 | Bishofberger et al. |
| 5,639,873 | A | 6/1997 | Barascut et al. |
| 5,645,985 | A | 7/1997 | Froehler et al. |
| 5,646,265 | A | 7/1997 | McGee |
| 5,646,269 | A | 7/1997 | Matteucci |
| 5,652,355 | A | 7/1997 | Metelev et al. |
| 5,652,356 | A | 7/1997 | Agrawal |
| 5,663,312 | A | 9/1997 | Chaturvedula |
| 5,670,633 | A | 9/1997 | Cook et al. |
| 5,672,697 | A | 9/1997 | Buhr et al. |
| 5,677,437 | A | 10/1997 | Teng et al. |
| 5,677,439 | A | 10/1997 | Weis et al. |
| 5,681,941 | A | 10/1997 | Cook et al. |
| 5,698,685 | A | 12/1997 | Summerton et al. |
| 5,700,920 | A | 12/1997 | Altmann et al. |
| 5,700,922 | A | 12/1997 | Cook |
| 5,721,218 | A | 2/1998 | Froehler |
| 5,750,692 | A | 5/1998 | Cook et al. |
| 5,763,588 | A | 6/1998 | Matteucci et al. |
| 5,792,608 | A | 8/1998 | Swaminathan et al. |
| 5,792,847 | A | 8/1998 | Burh et al. |
| 5,801,154 | A | 9/1998 | Baracchini et al. |
| 5,808,027 | A | 9/1998 | Cook et al. |
| 5,811,534 | A | 9/1998 | Cook et al. |
| 5,830,653 | A | 11/1998 | Froehler et al. |
| 5,859,221 | A | 1/1999 | Cook et al. |
| 5,948,903 | A | 9/1999 | Cook et al. |
| 5,994,517 | A | 11/1999 | Ts'o et al. |
| 6,005,087 | A | 12/1999 | Cook et al. |
| 6,005,096 | A | 12/1999 | Matteucci et al. |
| 6,166,199 | A | 12/2000 | Cook et al. |
| 6,268,490 | B1 | 7/2001 | Imanishi et al. |
| 6,300,319 | B1 | 10/2001 | Manoharan |
| 6,376,242 | B1 | 4/2002 | Hanson |
| 6,383,812 | B1 | 5/2002 | Chen et al. |
| 6,426,220 | B1 | 7/2002 | Bennett et al. |
| 6,525,031 | B2 | 2/2003 | Manoharan |
| 6,525,191 | B1 | 2/2003 | Ramasamy et al. |
| 6,531,584 | B1 | 3/2003 | Cook et al. |
| 6,582,908 | B2 | 6/2003 | Fodor et al. |
| 6,600,032 | B1 | 7/2003 | Manoharan et al. |
| 6,620,916 | B1 | 9/2003 | Takahara et al. |
| 6,660,720 | B2 | 12/2003 | Manoharan |
| 6,670,461 | B1 | 12/2003 | Wengel et al. |
| 6,770,748 | B2 | 8/2004 | Imanishi et al. |
| 6,794,499 | B2 | 9/2004 | Wengel et al. |
| 6,906,182 | B2 | 6/2005 | Ts'o et al. |
| 6,908,903 | B1 | 6/2005 | Theodore et al. |
| 7,015,315 | B1 | 3/2006 | Cook et al. |
| 7,022,521 | B2 | 4/2006 | Hanson |
| 7,034,133 | B2 | 4/2006 | Wengel et al. |
| 7,053,207 | B2 | 5/2006 | Wengel et al. |
| 7,101,993 | B1 | 9/2006 | Cook et al. |
| 7,262,177 | B2 | 8/2007 | Ts'o et al. |
| 7,399,845 | B2 | 7/2008 | Seth et al. |
| 7,427,672 | B2 | 9/2008 | Imanishi et al. |
| 7,491,805 | B2 | 2/2009 | Vargeese et al. |
| 7,547,684 | B2 | 6/2009 | Seth et al. |
| 7,569,686 | B1 | 8/2009 | Bhat et al. |
| 7,572,582 | B2 | 8/2009 | Wengel et al. |
| 7,582,744 | B2 | 9/2009 | Manoharan et al. |
| 7,666,854 | B2 | 2/2010 | Seth et al. |
| 7,696,345 | B2 | 4/2010 | Allerson et al. |
| 7,723,509 | B2 | 5/2010 | Manoharan et al. |
| 7,741,457 | B2 | 6/2010 | Swayze et al. |
| 7,750,131 | B2 | 7/2010 | Seth et al. |
| 7,851,615 | B2 | 12/2010 | Manoharan et al. |
| 7,875,733 | B2 | 1/2011 | Bhat et al. |
| 7,939,677 | B2 | 5/2011 | Bhat et al. |
| 8,022,193 | B2 | 9/2011 | Swayze et al. |
| 8,030,467 | B2 | 10/2011 | Seth et al. |
| 8,034,909 | B2 | 10/2011 | Wengel et al. |
| 8,080,644 | B2 | 12/2011 | Wengel et al. |
| 8,088,746 | B2 | 1/2012 | Seth et al. |
| 8,088,904 | B2 | 1/2012 | Swayze et al. |
| 8,106,022 | B2 | 1/2012 | Manoharan et al. |
| 8,124,745 | B2 | 2/2012 | Allerson et al. |
| 8,137,695 | B2 | 3/2012 | Rozema et al. |
| 8,153,365 | B2 | 4/2012 | Wengel et al. |
| 8,158,601 | B2 | 4/2012 | Chen et al. |
| 8,268,980 | B2 | 9/2012 | Seth et al. |
| 8,278,283 | B2 | 10/2012 | Seth et al. |
| 8,278,425 | B2 | 10/2012 | Prakash et al. |
| 8,278,426 | B2 | 10/2012 | Seth et al. |
| 8,313,772 | B2 | 11/2012 | Rozema et al. |
| 8,344,125 | B2 | 1/2013 | Manoharan et al. |
| 8,349,308 | B2 | 1/2013 | Yurkovetskiy et al. |
| 8,404,862 | B2 | 3/2013 | Manoharan et al. |
| 8,435,491 | B2 | 5/2013 | Wang et al. |
| 8,440,803 | B2 | 5/2013 | Swayze et al. |
| 8,450,467 | B2 | 5/2013 | Manoharan et al. |
| 8,501,805 | B2 | 8/2013 | Seth et al. |

(56) References Cited

U.S. PATENT DOCUMENTS

| | | |
|---|---|---|
| 8,501,930 B2 | 8/2013 | Rozema et al. |
| 8,530,640 B2 | 9/2013 | Seth et al. |
| 8,541,548 B2 | 9/2013 | Rozema |
| 8,546,556 B2 | 10/2013 | Seth et al. |
| 8,552,163 B2 | 10/2013 | Lee et al. |
| RE44,779 E | 2/2014 | Imanishi et al. |
| 8,828,956 B2 | 9/2014 | Manoharan et al. |
| 9,005,906 B2 | 4/2015 | Swayze et al. |
| 9,012,421 B2 | 4/2015 | Migawa et al. |
| 9,040,483 B2 | 5/2015 | Glidden et al. |
| 9,127,276 B2 | 9/2015 | Prakash et al. |
| 9,290,760 B2 | 3/2016 | Rajeev et al. |
| 2001/0053519 A1 | 12/2001 | Fodor et al. |
| 2003/0077829 A1 | 4/2003 | MacLachlan |
| 2003/0119724 A1 | 6/2003 | Ts'o et al. |
| 2003/0158403 A1 | 8/2003 | Manoharan et al. |
| 2003/0175906 A1 | 9/2003 | Manoharan et al. |
| 2003/0220279 A1* | 11/2003 | Honkanen ......... C12N 15/1137 435/375 |
| 2003/0228597 A1 | 12/2003 | Cowsert et al. |
| 2004/0087035 A1 | 5/2004 | Hanson |
| 2004/0171570 A1 | 9/2004 | Allerson et al. |
| 2005/0130923 A1 | 6/2005 | Bhat et al. |
| 2005/0164235 A1 | 7/2005 | Manoharan et al. |
| 2006/0148740 A1 | 7/2006 | Platenburg |
| 2006/0183886 A1 | 8/2006 | Tso et al. |
| 2007/0031844 A1 | 2/2007 | Khvorova et al. |
| 2008/0039618 A1 | 2/2008 | Allerson et al. |
| 2008/0108801 A1 | 5/2008 | Manoharan et al. |
| 2008/0206869 A1 | 8/2008 | Smith et al. |
| 2008/0281041 A1 | 11/2008 | Rozema et al. |
| 2008/0281044 A1 | 11/2008 | Monahan et al. |
| 2009/0203132 A1 | 8/2009 | Swayze et al. |
| 2009/0203135 A1 | 8/2009 | Forst et al. |
| 2009/0286973 A1 | 11/2009 | Manoharan et al. |
| 2010/0190837 A1 | 7/2010 | Migawa et al. |
| 2010/0197762 A1 | 8/2010 | Swayze et al. |
| 2010/0240730 A1 | 9/2010 | Beigelman et al. |
| 2011/0097264 A1 | 4/2011 | Wang et al. |
| 2011/0097265 A1 | 4/2011 | Wang et al. |
| 2011/0123520 A1 | 5/2011 | Manoharan et al. |
| 2011/0207799 A1 | 8/2011 | Rozema et al. |
| 2011/0269814 A1 | 11/2011 | Manoharan et al. |
| 2012/0035115 A1 | 2/2012 | Manoharan et al. |
| 2012/0095075 A1 | 4/2012 | Manoharan et al. |
| 2012/0101148 A1 | 4/2012 | Aking et al. |
| 2012/0128760 A1 | 5/2012 | Manoharan et al. |
| 2012/0136042 A1 | 5/2012 | Manoharan et al. |
| 2012/0157509 A1 | 6/2012 | Hadwiger et al. |
| 2012/0165393 A1 | 6/2012 | Rozema et al. |
| 2012/0230938 A1 | 9/2012 | Rozema et al. |
| 2013/0004427 A1 | 1/2013 | El-Sayed et al. |
| 2013/0109817 A1 | 5/2013 | Yurkovetskiy et al. |
| 2013/0121954 A1 | 5/2013 | Wakefield et al. |
| 2013/0130378 A1 | 5/2013 | Manoharan et al. |
| 2013/0178512 A1 | 7/2013 | Manoharan et al. |
| 2013/0203836 A1 | 8/2013 | Rajeev et al. |
| 2013/0236968 A1 | 9/2013 | Manoharan et al. |
| 2014/0107330 A1 | 4/2014 | Freier et al. |
| 2015/0018540 A1 | 1/2015 | Prakash et al. |
| 2015/0093587 A1 | 4/2015 | Imamura et al. |
| 2015/0184153 A1 | 7/2015 | Freier et al. |
| 2015/0191727 A1 | 7/2015 | Migawa et al. |
| 2015/0267195 A1 | 9/2015 | Seth et al. |
| 2015/0275212 A1 | 10/2015 | Albaek et al. |
| 2016/0367702 A1 | 12/2016 | Hoge et al. |

FOREIGN PATENT DOCUMENTS

| | | |
|---|---|---|
| WO | 2001021163 A2 | 3/2001 |
| WO | WO2004024757 A2 | 3/2004 |
| WO | WO2004101619 A1 | 11/2004 |
| WO | WO2004106356 A1 | 12/2004 |
| WO | WO2008098788 A2 | 8/2008 |
| WO | WO2009134487 A2 | 11/2009 |
| WO | 2010022444 A1 | 3/2010 |
| WO | WO2010054406 A1 | 5/2010 |
| WO | WO2010148013 A2 | 12/2010 |
| WO | WO2011100131 A2 | 8/2011 |
| WO | WO2012037254 A1 | 3/2012 |
| WO | WO2012068187 A1 | 5/2012 |
| WO | WO2012089352 A1 | 7/2012 |
| WO | WO2012089602 A1 | 7/2012 |
| WO | WO2012177947 A2 | 12/2012 |
| WO | WO2013075035 A1 | 5/2013 |
| WO | WO2013166121 A1 | 11/2013 |
| WO | WO2014179620 A1 | 11/2014 |
| WO | WO2015106128 A2 | 7/2015 |

OTHER PUBLICATIONS

Agoston et al., "Paraneoplastic thrombocytosis is associated with increased mortality and increased rate of lymph node metastasis in oesophageal adenocarcinoma" Pathology (2017) 49(5): 471-475.

Albaek et al., "Analogues of a Locked Nucleic Acid with Three-Carbon 2'4'-Linkages: Synthesis by Ring-Closing Metathesis and Influence on Nucleic Acid Duplex Stability and Structure", J. Org. Chem, vol. 71, 2006, pp. 7731-7740.

Ambrus et al., "Platelet aggregation inhibitors and metastatic spread of neoplastic cells" Prog Clin Biol Res (1982) 89: 83-95.

Badimon et al., "A sudden increase in plasma epinephrine levels transiently enhances platelet deposition on severely damaged arterial wall—studies in a porcine model" Thromb Haemost (1999) 82(6): 1736-1742.

Badimon et al., "Platelet deposition induced by severely damaged vessel wall is inhibited by a boroarginine synthetic peptide with antithrombin activity" Thromb Haemost (1994) 71(4): 511-516.

Badrnya et al., "Platelets mediate oxidized low-density lipoprotein-induced monocyte extravasation and foam cell formation" Artherioscler Thromb Vasc Biol (2014) 34(3): 571-580.

Baranyai et al., "Paraneoplastic thrombocytosis in gastrointestinal cancer" Platelets (2016) 27(4): 269-275.

Battinelli et al., "Anticoagulation inhibits tumor cell-mediated release of platelet angiogenic proteins and diminishes platelet angiogenic response" Blood (2014) 123(1): 101-112.

Battinelli et al., "Release of angiogenesis regulatory proteins from platelet alpha granules: modulation of physiologic and pathologic angiogenesis" Blood (2011) 118(5): 1359-1369.

Bauer et al., "von Willebrand factor fibers promote cancer-associated platelet aggregation in malignant melanoma of mice and humans" Blood (2015) 125(20): 3153-3163.

Biessen et al., "Novel hepatotrophic prodrugs of the antiviral nucleoside 9-(2-phosphonylmethoxyethyl)adenine with improved pharmacokinetics and antiviral activity", FASEB J, vol. 14, 2000, pp. 1784-1792.

Biessen et al., "Synthesis of Cluster Galactosides with High Affinity for the Hepatic Asialoglycoprotein Receptor", J. Med. Chem., vol. 38, 1995, pp. 1538-1546.

Biessen et al., "The Cholesterol Derivative of a Triantennary Galactoside with High Affinity for the Hepatic Asialoglycoprotein Receptor: a Potent Cholesterol Lowering Agent", J. Med. Chem., vol. 38, 1995, pp. 1846-1852.

Boneu et al., "Exhausted platelets in patients with malignant solid tumors without evidence of active consumption coagulopathy" Eur J Cancer Clin Oncol (1984) 20(7): 899-903.

Borst et al., "The inflammatory chemokine CXC motif ligand 16 triggers platelet activation and adhesion via CXC motif receptor 6-dependent phosphatidylinositide 3-kinase/Akt signaling" Circ Res (2012) 111(10): 1297-1307.

Bottsford-Miller et al., "Differential platelet levels affect response to taxane-based therapy in ovarian cancer" Clin Cancer Res (2015) 21(3): 602-610.

Boulaftali et al., "CalDAG-GEFI Deficiency Reduces Atherosclerotic Lesion Development in Mice" Arterioscler Thromb Vasc Biol (2016) 36(5): 792-799.

(56) References Cited

OTHER PUBLICATIONS

Braasch et al., "Novel Antisense and Peptide Nucleic Acid Strategies for Controlling Gene Expression", Biochemistry, vol. 41, No. 14, 2002, pp. 4503-4510.
Braasch et al., "Locked nucleic acid (LNA): fine-tuning the recognition of DNA and RNA", Chem. Biol., vol. 8, 2001, pp. 1-7.
Branch et al., "A good antisense molecule is hard to find," TIBS (1998) 23:45-50.
Brockmann et al., "Preoperative thrombocytosis predicts poor survival in patients with glioblastoma" Neuro Oncol (2007) 9(3): 335-342.
Broijersen et al., "Platelet activity in vivo in hyperlipoproteinemia—importance of combined hyperlipidemia" Thromb Haemost (1998) 79(2): 268-275.
Brown et al., "Challenges in the development of platelet growth factors: low expectations for low counts" Curr Hematol Rep (2002) 1(2): 110-118.
Brown et al., "Megakaryocyte ploidy and platelet changes in human diabetes and atherosclerosis" Arterioscler Thromb Vasc Biol (1997) 17(4): 802-807.
Burger et al., "Platelet P-selectin facilitates atherosclerotic lesion development" Blood (2003) 101(7): 2661-2666.
Cardier et al., "Thrombopoietin and Its Receptor, c-mpl, Are Constitutively Expressed by Mouse Liver Endothelial Cells: Evidence of Thrombopoietin as a Growth Factor for Liver Endothelial Cells", Blood Journal, vol. 91, No. 3, 1998, pp. 923-929.
Carvalho et al., "Platelet function in hyperlipoproteinemia" N Engl J Med (1974) 290(8): 434-438.
Chandraratne et al., "Critical role of platelet glycoprotein ibα in arterial remodeling" Artherioscler Thromb Vasc Biol (2015) 35(3): 589-597.
Chatterjee et al., "Platelet-derived CXCL12 regulates monocyte function, survival, differentiation into macrophages and foam cells through differential involvement of CXCR4-CXCR7" Cell Death Dis (2015) 1-16.
Chin "On the Preparation and Utilization of Isolated and Purified Oligonucleotides" Document purportedly located on a CD-ROM and contributed to the public collection of the Katherine R. Everett Law Library of the University of North Carolina on Mar. 14, 2002.
Cho et al., "Platelets increase the proliferation of ovarian cancer cells" Blood (2012) 120(24): 4869-4872.
Cho et al., "Role of ADP receptors on platelets in the growth of ovarian cancer" Blood (2017) 130(10): 1235-1242.
Chopra et al., "An in vivo study of the role of the tumor cell cytoskeleton in tumor cell-platelet-endothelial cell interactions" Cancer Res (1990) 50(23): 7686-7696.
Chopra et al., "Role of tumor cytoskeleton and membrane glycoprotein IRGpIIb/IIIa in platelet adhesion to tumor cell membrane and tumor cell-induced platelet aggregation" Cancer Res (1988) 48(13): 3787-3800.
Chou et al., "The thrombopoietin/MPL/Bcl-xL pathway is essential for survival and self-renewal in human preleukemia induced by AML1-ETO" Blood (2012) 120(4): 709-719.
Christie et al., "Hypersensitivity of platelets to adenosine diphosphate in patients with stable cardiovascular disease predicts major adverse events despite antiplatelet therapy" Platelets (2008) 19(2): 104-110.
Connolly et al., "Binding and Endocytosis of Cluster Glycosides by Rabbit Hepatocytes", J. Biol. Chem., vol. 257, 1982, pp. 939-945.
Crooke et al., "Basic Principles of Antisense Therapeutics", Antisense Research and Application (1998) Chapter 1, pp. 1-50.
Crooke et al., "Pharmacokinetic Properties of Several Novel Oligonucleotide Analogs in Mice", J. Pharmacol. Exp. Ther., 1996, vol. 227, No. 2, pp. 923-937.
Manoharan et al., "Chapter 15—Utilizing Chemistry to Harness RNA Interference Pathways for Therapeutics: Chemically Modified siRNAs and Antagomirs", Crooke S.T. Ed., Antisense Drug Technology, Chapter 15, 2008, pp. 437-464.
Swayze, "Chapter 6—The Medicinal Chemistry of Oligonucleotides", Crooke S.T. Ed., Antisense Drug Technology, Chapter 6, 2008, pp. 143-182.
Dardik et al., "Thrombin promotes platelet-mediated melanoma cell adhesion to endothelial cells under flow conditions: role of platelet glycoproteins P-selectin and GPIIb-IIIA" Br J Cancer (1998) 77(12): 2069-2075.
Daub et al., "Oxidized LDL-activated platelets induce vascular inflammation" Semin Thromb Haemost (2010) 36(2): 146-156.
De Meyer et al., "Binding of von Willebrand factor to collagen and glycoprotein Ibalpha, but not to glycoprotein IIb/IIIa, contributes to ischemic stroke in mice—brief report" Arterioscler Thromb Vasc Biol (2010) 30(190): 1949-1951.
Demers et al., "Increased efficacy of breast cancer chemotherapy in thrombocytopenia mice" Cancer Res (2011) 71(5): 1540-1549.
Diodati et al., "Effect of atherosclerosis on endothelium-dependent inhibition of platelet activation in humans" Circulation (1998) 98(1): 17-24.
Donati et al., "Animal models for the study of platelet-tumor cell interactions" Prog Clin Biol Res (1982) 89: 159-176.
Dovizio et al., "Pharmacological inhibition of platelet-tumor cell cross-talk prevents platelet-induced overexpression of cyclooxygenase-2 in HT29 human colon carcinoma cells" Mol Pharmacol (2013) 84(1): 25-40.
Duff et al., "Intrabody Tissue-Specific Delivery of Antisense Conjugates in Animals: Ligand-Linker-Antisense Oligomer Conjugates", Methods Enzymol, 2000, vol. 313, pp. 297-321.
Dymicka-Piekarska et al., "Thrombopoietin and reticulated platelets as thrombopoietic markers in colorectal cancer" Thromb Res (2008) 122(1): 141-143.
Egli, et al., "Synthesis, improved antisense activity and structural rationale for the divergent RNA affinities of 3′-fluoro hexitol nucleic acid (FHNA and Ara-FHNA) modified oligonucleotides." J Am Chem (2011) 133(41):16642-16649.
Elayadi et al., "Application of PNA and LNA oligomers to chemotherapy", Curr. Opinion Invens. Drugs, vol. 2, 2001, pp. 558-561.
Englisch et al., "Chemically Modified Oligonucleotides as Probes and Inhibitors", Angewandte Chemie, International Edition, vol. 30, 1991, p. 613-629.
Erdemir et al., "Clinical significance of platelet count in patients with renal cell carcinoma" Urol Int (2007) 79(2): 111-116.
Fitzgerald et al., "Increased prostacyclin biosynthesis in patients with severe atherosclerosis and platelet activation" N Engl J Med (1984) 310(7): 1065-1068.
Fitzgerald et al., "Platelet activation in unstable coronary disease" N Engl J Med (1986) 315(16): 983-989.
Freier et al., "The ups and downs of nucleic acid duplex stability: structure-stability studies on chemically-modified DNA:RNA duplexes", Nucleic Acids Reaserch, vol. 25, No. 22, 1997, pp. 4429-4443.
Frieden et al., "Expanding the design horizon of antisense oligonucleotides with alpha-L-LNA", Nucleic Acids Research, vol. 21, 2003, pp. 6365-6372.
Furman et al., "Increased platelet reactivity and circulating monocyte-platelet aggregates in patients with stable coronary artery disease" J Am Col Cardiol (1998) 31(2): 352-358.
Furman et al., "Release of soluble CD40L from platelets is regulated by glycoprotein IIb/IIIa and actin polymerization" J Am Coll Cardiol (2004) 43(12): 2319-2325.
Garlichs et al., "Upregulation of CD40 and CD40 ligand (CD154) in patients with moderate hypercholesterolemia" Circulation (2001) 104(20): 2395-2400.
Gasic et al., "Antimetastatic effects associated with platelet reduction" Proc Natl Acad Sci USA (1968) 61(1): 46-52.
Gasic et al., "Plasma membrane vesicles as mediators of interactions between tumor cells and components of the hemostatic and immune systems" Prog Clin Biol Res (1982) 89: 429-444.
Gastpar "Platelet-cancer cell interaction in metastasis formation: a possible therapeutic approcach to metastasis prophylaxis" J Med (1977) 8(2): 103-114.
Gastpar et al., "Platelet aggregation inhibitors in the prevention of metastasis in neoplastic disease: a review of experimental and clinical investigations" J Med (1981) 12(1): 15-33.
Gautschi et al., "Activity of a novel bcl-2/bcl-xLbispecific antisense oligonucleotide against tumors of diverse histologic origins" J. Natl. Cancer Inst. (2001) 93:463-471.

(56) References Cited

OTHER PUBLICATIONS

Gawaz et al., "Platelets modulate atherogenesis and progression of atherosclerotic plaques via interaction with progenitor and dendritic cells" J Thromb Haemost (2008) 6(2): 235-242.
Gebremeskel et al., "The reversible P2Y12 inhibitor ticagrelor inhibits metastasis and improves survival in mouse models of cancer" Int J Cancer (2015) 136(1): 234-240.
Gerdes et al., "Platelet CD40 Exacerbates Atherosclerosis by Transcellular Activation of Endothelial Cells and Leukocytes" Arterioscler Thomb Vasc Biol (2016) 36(3): 482-490.
Graf et al., "Expression of thrombopoietin and thrombopoietin receptor MPL in human leukemia-lymphoma and solid tumor cell lines" Leuk Res (1996) 20(10): 831-838.
Grignani et al., "The possible role of blood platelets in tumour growth and dissemination" Haematologica (1986) 71(3): 245-255.
Guillem-Llobat et al., "Aspirin prevents colorectal cancer metastasis in mice by splitting the crosstalk between platelets and tumor cells" Oncotarget (2016) 7(22): 32462-32477.
Hara et al., "Platelets as a source of growth-promoting factor(s) for tumor cells" Cancer Res (1980) 40(4): 1212-1216.
He et al., "Platelet releasates promote the proliferation of hepatocellular carcinoma cells by suppressing the expression of KLF6" Sci Rep (2017) 7(1): 1-12.
Helft et al., "Acute antithrombotic effect of a front-loaded regimen of clopidogrel in patients with atherosclerosis on aspirin" Arterioscler Thromb Vasc Biol (2000) 20(190): 2316-2321.
Hess et al., "Drug-induced inhibition of platelet function delays progression of peripheral occlusive arterial disease. A prospective double-blind arteriographically controlled trial" Lancet (1985) 1(8426): 415-419.
Hilgard "Blood platelets and tumour dissemination" Prog Clin Biol Res (1982) 89: 143-158.
Ho-Tin-Noe et al., "Platelet granule secretion continuously prevents intratumor hemorrhage" Cancer Res (2008) 68(16): 6851-6858.
Huo et al., "Circulating activated platelets exacerbate atherosclerosis in mice deficient in apolipoprotein E" Nat Med (2003) 9(1): 61-67.
International Search Report and Written Opinio for Application No. PCT/US2019/042033 dated Oct. 25, 2019 (12 pages).
Inwald et al., "CD40 is constitutively expressed on platelets and provides a novel mechanism for platelet activation" Circ Res (2003) 92(9): 1041-1048.
Jackson et al., "Role of Megakaryocytes in Breast Cancer Metastasis to Bone" Cancer Res (2017) 77(8): 1942-1954.
Jayaprakash et al., "Non-Nucleoside Building Blocks for Copper-Assisted and Copper-Free Click Chemistry for the Efficient Synthesis of RNA Conjugates", Org Lett, 2010, vol. 12, pp. 5410-5413.
Joosse et al., "Tumor-Educated Platelets as Liquid Biopsy in Cancer Patients" Cancer Cell (2015) 28(5): 552-554.
Kabanov et al., "A new class of antivirals: antisense oligonucleotides combined with a hydrophobic substituent effectivey inhibit influenza virus reproduction and synthesis of virus-specific proteins in MDCK cells", FEBS Lett., vol. 259, 1990, pp. 327-330.
Karpatkin et al., "Role of platelets in tumor cell metastases" Ann N Y Acad Sci (1981) 370: 101-118.
Karshovska et al., "Hyperreactivity of junctional adhesion molecule A-deficient platelets accelerates atherosclerosis in hyperlipidemic mice" Circ Res (2015) 116(4): 587-599.
Kato et al., "N-acteylgalactosamine incorporation into a peptide containing consecutive threonine residues by UDP-N-acetyl-D-galactosaminide:polypeptide N-acetylgalactosaminyltransferases", Glycobiol., vol. 11, 2001, pp. 821-829.
Kerr et al., "Comparison of tumor and microenvironment secretomes in plasma and in platelets during prostate cancer growth in a xenograft model" Neoplasia (2010) 12(5): 388-396.
Khorev et al., "Trivalent, Gal/GalNAc-containing ligands designed for the asialoglycoprotein receptor", Bioorg. Med. Chem., vol. 16, 2008, pp. 5216-5231.

Kim et al., "Insufficient platelet inhibition is related to silent embolic cerebral infarctions after coronary angiography" Stroke (2012) 43(3): 727-732.
Kim et al., "Oligomeric Glycopeptidomimetics Bearing the Cancer Related Tn-Antigen", Tetrahedron Lett., vol. 38, 1997, pp. 3487-3490.
Kisucka et al., "Elevated levels of soluble P-selectin in mice alter blood-brain barrier function, exacerbate stroke, and promote atherosclerosis" Blood (2009) 113(23): 6015-6022.
Kisucka et al., "Platelets and platelet adhesion support angiogenesis while preventing excessive hemorrhage" Proc Natl Acad Sci USA (2006) 103(4): 855-860.
Kleinschnitz et al., "Targeting platelets in acute experimental stroke: impact of glycoprotein Ib, VI, and IIb/IIIa blockade on infarct size, functional outcome, and intracranial bleeding" Circulation (2007) 115(17): 2323-2330.
Klement et al., "Platelets actively sequester angiogenesis regulators" Blood (2009) 113(12): 2835-2842.
Klinkhardt et al., "Clopidogrel but not aspirin reduces P-selectin expression and formation of platelet-leukocyte aggregates in patients with atherosclerotic vascular disease" Clin Pharmacol Ther (2003) 73(3): 232-241.
Koenen et al., "Disrupting functional interactions between platelet chemokines inhibits atherosclerosis in hyperlipidemic mice" Nat Med (2009) 15(1): 97-103.
Koltsova et al., "Genetic deletion of platelet glycoprotein Ib alpha but not its extracellular domain protects from atherosclerosis" Thromb Haemost (2014) 112(6): 1252-1263.
Kopp et al., "Platelet-derived transforming growth factor-beta down-regulates NKG2D thereby inhibiting natural killer cell antitumor reactivity" Cancer Res (2009) 69(19): 7775-7783.
Kornilova et al., "Development of a fluorescence polarization binding assay for asialoglycoprotein receptor", Analyt Biochem, 2012, vol. 425, pp. 43-46.
Koshkin et al., "LNA (Locked Nucleic Acids): Synthesis of the Adenine, Cytosine, Guanine, 5-Methylcytosine, Thymine and Uracil Bicyclonucleoside Monomers, Oligomerisation, and Unprecedented Nucleic Acid Recognition", Tetrahedron, vol. 54, 1998, pp. 3607-3630.
Kraft et al., "Efficacy and Safety of Platelet Glycoprotein Receptor Blockade in Aged and Comorbid Mice With Acute Experimental Stroke" Stroke (2015) 46(12): 3502-3506.
Krauth et al., "Paraneoplastic autoimmune thrombocytopenia in solid tumors" Crit Rev Oncol Hematol (2012) 81(1): 75-81.
Kuijpers et al., "Platelet CD40L Modulates Thrombus Growth Via Phosphatidylinositol 3-Kinase β, and Not Via CD40 and IκB Kinase α" Artherioscler Thromb Vasc Biol (2015) 35(6): 1374-1381.
Kumar et al., "The First Analogues of LNA (Locked Nucleic Acids): Phosphorothioate-LNA and 2'-THIO-LNA", Bioorg Med. Chem. Lett., vol. 8, 1998, pp. 2219-2222.
Kumar et al., "Design, synthesis, biophysical and primer extension studies of novel acyclic butyl nucleic acid (BuNA)", Org. Biomol. Chem, vol. 11, 2013, pp. 5853-5865.
Kyrle et al., "Inhibition of prostacyclin and thromboxane A2 generation by low-dose aspirin at the site of plug formation in man in vivo" Circulation (1987) 75(5): 1025-1029.
Kyrle et al., "Thromboxane A2 and prostacyclin generation in the microvasculature of patients with atherosclerosis—effect of low-dose aspirin" Thromb Haemost (1989) 61(3): 374-377.
Labelle et al., "Direct signaling between platelets and cancer cells induces an epithelial-mesenchymal-like transition and promotes metastasis" Cancer Cell (2011) 20(5): 576-590.
Langer et al., "Platelet-vessel wall interactions in atherosclerotic disease" Thromb Haemost (2008) 99(3): 480-486.
Lavie et al., "Thrombocytosis in women with vulvar carcinoma" Gynecol Oncol (1999) 72(1): 82-86.
Lee et al., "Pretreatment platelet count early predicts extrahepatic metastasis of human hepatoma" Liver Int (2015) 35(10): 2327-2336.
Lee et al., "New Synthetic Cluster Ligands for Calactose/N-Acetylgalactosamine-Specific Lectin of Mammalian Liver", Biochem., vol. 23, 1984, pp. 4255-4261.

(56) References Cited

OTHER PUBLICATIONS

Lee et al., "Facile Synthesis of a High-Affinity Ligand for Mammalian Hepatic Lectin Containing Three Terminal N-Acetylgalactosamine Residues", Bioconjug Chem., vol. 8, 1997, pp. 762-765.
Lee et al., "Protein microarrays to study carbohydrate-recognition events", Bioorg Med Chem Lett., vol. 16, No. 19, 2006, pp. 5132-5135.
Lee et al., "New and more efficient multivalent glyco-ligans for asialoglycoprotein receptor of mammalian hepatocytes", Bioorg Med Chem, 2011, vol. 19, pp. 2494-2500.
Lee et al., "New and more efficient multivalent glyco-ligands for asiloglycoprotein receptor of mammalian hepatocytes", Bioorganic & Medicinal Chemistry, vol. 19, 2011, pp. 2494-2500.
Lee et al., "prepartion of Cluster Glycosides of N-Acetylgalactosamine That Have Subnanomolar Binding Constants Towards the Mammalian Hepatic Gal/GalNAc-specific Receptor", Glycoconjugate J., 1987, vol. 4, pp. 317-328.
Lee et al., "Synthesis of Multivalent Neoglyconjugates of MUC1 by the Conjugation of Carbohydrate-Centered, Triazole-Linked Glycoclusters to MUC1 Petides Using Click Chemistry", J. Org. Chem., vol. 77, 2017, pp. 7564-7571.
Lee et al., "Synthesis of Peptide-Based Trivalent Scaffold for Prepartion of Cluster Glycosides", Methods Enzymol., vol. 362, 2003, pp. 38-43.
Lee, "Synthesis of some cluster glycosides suitable for attachment to proteins or solid matrices", Carbohydr. Res., vol. 67, 1978, pp. 509-514.
Lesyk et al., "The potential of enzastaurin to enhance platelet aggregation and growth factor secretion: implications for cancer cell survival" J Thromb Haemost (2015) 13(8): 1514-1520.
Letsinger et al., "Cholesteryl-conjugated oligonucleotides: Synthesis, properties, and activity as inhibitors of replication of human immunodeficiency virus in cell culture", Proc. Natl. Acad. Sci., vol. 86, 1989, pp. 6553-6556.
Leumann, "DNA Analogues: From Supramolecular Principles to Biological Properties", Bioorg. & Med. Chem., vol. 10, 2002, pp. 841-854.
Levin et al., "Thrombocytosis Associated With Malignant Disease" Arch Intern Med (1964) 114: 497-500.
Li et al., "Roles of purinergic receptor P2Y, G protein-coupled 12 in the development of atherosclerosis in apolipoprotein E-deficient mice" Artherioscler Thromb Vasc Biol (2012) 32(8): 81-89.
Liebman "Thrombocytopenia in cancer patients" Thromb Res (2014) 133(2): S63-S69.
Lievens et al., "Platelet CD40L mediates thrombotic and inflammatory processes in atherosclerosis" Blood (2010) 116(20): 4317-4327.
Lindemann et al., "Activated platelets mediate inflammatory signaling by regulated interleukin 1beta synthesis" J Cell Biol (2001) 154(3): 485-490.
Linden et al., "Platelets: pleiotropic roles in atherogenesis and atherothrombosis" Int J Biochem Cell Biol (2010) 42(11): 1762-1766.
Lissoni et al., "A biological study on the efficacy of low-dose subcutaneous interleukin-2 plus melatonin in the treatment of cancer-related thrombocytopenia" Oncology (1995) 52(5): 360-362.
Lonsdorf et al., "Engagement of αIIbβ3 (GPIIb/IIIa) with αvβ3 integrin mediates interaction of melanoma cells with platelets: a connection to hematogenous metastasis" J Biol Chem (2012) 287(3): 2168-2178.
Maher et al., "Comparative hybrid arrest by tandem antisense oligodeoxyribonucleotides or oligodeoxyribonucleoside methylpbosphonates in a cell-free system" Nucl. Acid. Res. (1988) 16(8):3341-3358.
Maier et al., "Synthesis of Antisense Oligonucleotides Conjugated to a Multivalent Carbohydrate Cluster for Cellular Targeting", Bioconjug Chem, 2003, vol. 14, pp. 18-29.
Maierhofer et al., "Probing multivalent carbohydrate-lectin interactions by an enzyme-linked lectin assay employing covalently immobilized carbohydrates", Bioorganic & Medicinal Chemistry, vol. 15, 2007, pp. 7661-7676.
Malpass et al., "Correlation between prolonged bleeding time and depletion of platelet dense granule ADP in patients with myelodysplastic and myeloproliferative disorders" J Lab Clin Med (1984) 103(6): 894-904.
Mamytbekova et al., "Antimetastatic effect of flurbiprofen and other platelet aggregation inhibitors" Neoplasma (1986) 33(4): 417-421.
Manoharan et al., "Chemical Modifications to Improve Uptake and Bioavailability of Antisense Oligonucleotides", Ann. Acad. Sci., vol. 660, 1992, pp. 306-309.
Manoharan et al., "Intoduction of a Lipophilic Thioether Tether in the Minor Groove of Nucleic Acids for Antisense Applications", Bioorg. Med. Chem. Lett., vol. 3, 1993, pp. 2765-2770.
Manoharan et al., "Cholic Acid-Oligonucleotide Conjugates for Antisense Applications", Bioorg. Med. Chem. Lett., vol. 4, 1994, pp. 1053-1060.
Manoharan et al., "Oligonucleotide Conjugates: Alteration of the Pharmacokinetic Properties of Antisense Agents", Nucleosides & Nucleotides, vol. 14, 1995, pp. 969-973.
Manoharan et al., "Lipidic Nucleic Acids", Tetrahedron Lett., vol. 36, 1995, pp. 3651-3654.
Manoharan, "Oligonucleotide Conjugates as Potential Antisense Drugs with Improved Uptake, Biodistribution, Targeted Delivery and Mechanism of Action", Antisense Nucleic Acid Drug Dev, vol. 12, 2002, pp. 103-128.
Massberg et al., "A critical role of platelet adhesion in the initiation of atherosclerotic lesion formation" J Exp Med (2002) 196(7): 887-896.
Massberg et al., "A crucial role of glycoprotein VI for platelet recruitment to the injured arterial wall in vivo" J Exp Med (2003) 197(1): 41-49.
Massberg et al., "Platelet adhesion via glycoprotein IIb integrin is critical for atheroprogression and focal cerebral ischemia: an in vivo study in mice lacking glycoprotein Iib" Circulation (2005) 112(8): 1180-1188.
Massberg et al., "Platelet-endothelial cell interactions during ischemia/reperfusion: the role of P-selectin" Blood (1998) 92(2): 507-515.
Matsui et al., "Thromboxane $A_2$ receptor signaling facilitates tumor colonization through P-selectin-mediated interaction of tumor cells with platelets and endothelial cells" Cancer Sci (2012) 103(4): 700-707.
Maurer et al., "Targeting platelet GPIbβ reduces platelet adhesion, GPIb signaling and thrombin generation and prevents arterial thrombosis" Arterioscler Thromb Vasc Biol (2013) 33(6): 1221-1229.
May et al., "Engagement of glycoprotein IIb/IIIa (alpha(IIb)beta3) on platelets upregulates CD40L and triggers CD40L-dependent matrix degradation by endothelial cells" Circulation (2002) 106(16): 2111-2117.
Meade et al., "Platelet counts and aggregation measures in the incidence of ischaemic heart disease (IHD)" Thromb Haemost (1997) 78(2): 926-929.
Menter et al., "Platelets and cancer: a casual or causal relationship: revisited" Cancer Metastasis Rev (2014) 33(1): 231-269.
Merwin et al., Bioconjug Chem, 1994, vol. 5, pp. 612-620.
Mikami et al., "Antitumor effect of antiplatelet agents in gastric cancer cells: an in vivo and in vitro study" Gastric Cancer (2016) 19(3): 817-826.
Mishra et al., "Improved leishmanicidal effect of phosphorotioate antisense oligonucleotides by LDL-mediated delivery", Biochim. Biophys. Acta., vol. 1264, 1995, pp. 229-237.
Mitrugno et al., "A novel and essential role for FcγRIIa in cancer cell-induced platelet activation" Blood (2014) 123(2): 249-260.
Mitrugno et al., "Aspirin therapy reduces the ability of platelets to promote colon and pancreatic cancer cell proliferation: Implications for the oncoprotein c-MYC" Am J Physiol Cell Physiol (2017) 312(2): C176-C189.
Morimoto et al., "Interaction of cancer cells with platelets mediated by Necl-5/poliovirus receptor enhances cancer cell metastasis to the lungs" Oncogene (2008) 27(3): 264-273.

(56) References Cited

OTHER PUBLICATIONS

Naina et al., "Paraneoplastic thrombocytosis in ovarian cancer" N Engl J Med (2012) 366(19): 1840.
Nannizzi-Alaimo et al., "Inhibitory effects of glycoprotein IIb/IIIa antagonists and aspirin on the release of soluble CD40 ligand during platelet stimulation" Circulation (2003) 107(8): 1123-1128.
Napoleao et al., "Prognostic evaluation of soluble CD40L in acute myocardial infarction: is not fancy, is science!" Ann Transl Med (2017) 5(4): 1-3.
New England Biolabs 1998/99 Catalog (cover page and pp. 121 and 284).
Nilsson et al., "Blood platelets contain tumor-derived RNA biomarkers" Blood (2011) 118(13): 3680-3683.
Nishikawa et al., "Thrombopoietin/MPL signaling confers growth and survival capacity to CD41-positive cells in a mouse model of Evi1 leukemia" Blood (2014) 124(24): 3587-3596.
Nishina et al., "Chimeric Antisense Oligonucleotide Conjugated to alpha-Tocopherol", Molecular Therapy Nucleic Acids, vol. 4, 2015, e220.
Nishina et al., "Efficient In Vivo Delivery of siRNA to the Liver by Conjugation of alpha-Tocopherol", Molecular Therapy, vol. 16, No. 4, 2008, pp. 734-740.
Oberhauser et al., "Effective incorporation of 2'-O-methyl-oligoribonucleotides into liposomes and enhanced cell association through modificaiton with thiocholesterol", Nucl. Acids Res., vol. 20, 1992, pp. 533-538.
Orum et al., "Locked nucleic acids: A promising molecular family for gene-function analysis and antisense drug development", Curr. Opinion Mol. Ther., vol. 3, 2001, pp. 239-243.
Paigen et al., "Analysis of atherosclerosis susceptibility in mice with genetic defects in platelet function" Arteriosclerosis (1990) 10(4): 648-652.
Pang et al., "Activation of tumour cell ECM degradation by thrombin-activated platelet membranes: potentially a P-selectin and GPIIb/IIIa-dependent process" Clin Exp Metastasis (2015) 32(5): 495-505.
Pankratova [Thrombocytosis and the thrombocyte formula in the diagnosis of lung cancer and suppurative diseases] Vestn Khir Im I I Grek (1957) 78(2): 32-39.
Pavia et al., "Synthetic Tn Glycopeptide related to human glycophorin A(M)", Int. J. Pep. Protein Res., vol. 22, 1983, pp. 539-548.
Pizzulli et al., "Changes in platelet size and count in unstable angina compared to stable angina or non-cardiac chest pain" Eur Heart (1998) 19(1): 80-84.
Podrez et al., "Platelet CD36 links hyperlipidemia, oxidant stress and a prothrombotic phenotype" Nat Med (2007) 13(9): 1086-1095.
Prica et al., "Safety and efficacy of thrombopoietin-receptor agonists in myelodysplastic syndromes: a systematic review and meta-analysis of randomized controlled trials" Br J Haematol (2014) 167(5): 626-638.
Pueyo et al., "A mimetic of the RGDF-peptide [arginine-glycine-aspartic acid-phenylalanine] blocks aggregation and flow-induced platelet deposition on severely injured stenotic arterial wall. Effects on different animal models and in humans" Thromb Res (1996) 81(1): 101-112.
Pujol et al., "A Sulfur Tripod Glycoconjugate that Releases a High-Affinity Copper Chelator in Hepatocytes", Angew Chemie Int Ed Engl, 2012, vol. 51, pp. 7445-7448.
Pulikkan et al., "Thrombopoietin/MPL participates in initiating and maintaining RUNX1-ETO acute myeloid leukemia via PI3K/AKT signaling" Blood (2012) 120(4): 868-879.
Rachidi et al., "Platelets subvert T cell immunity against cancer via GARP-TGFβ axis" Sci Immunol (2017) 2(11): 1-27.
Rajur et al., "Covalent Protein-Oligonucleotide Conjugates for Efficient Delivery of Antisense Molecules", Bioconjug Chem., vol. 8, 1997, pp. 935-940.
Ranjith et al., "Significance of platelet volume indices and platelet count in ischaemic heart disease" J Clin Pathol (2009) 62(9): 830-833.

Rensen et al., "Stimulation of Liver-Directed Cholesterol Flux in Mice by Novel N-Acetylgalactosamine-Terminated Glycolipids With High Affinity for the Asialoglycoprotein Receptor", Arterioscler Thromb Vasc Biol, 2006, vol. 26, pp. 169-175.
Rensen et al., "Determination of the Upper Size Limir for Uptake and Processing of Ligands by the Asialogylcoprotein Receptor on Hepatocytes in Veitro and in Vivo", J. Biol. Chem., vol. 276, 2001, pp. 37577-37584.
Rensen et al., "Design and Synthesis of Novel N-Acetylgalactosamine-Terminated Glycolipids for Targeting of Lipoproteins to the Hepatic Asialogylcoprotein Receptor", J. Med. Chem., vol. 47, 2004, pp. 5798-5808.
Rex et al., "Immune versus thrombotic stimulation of platelets differentially regulates signalling pathways, intracellular protein-protein interactions, and alpha-granule release" Thromb Haemost (2009) 102(1): 97-110.
Reynolds et al., "Rational siRNA design for RNA interference" Nature Biotechnology (2004) 22(3):326-330.
Rothwell et al., "Effect of daily aspirin on long-term risk of death due to cancer: analysis of individual patient data from randomised trials" Lancet (2011) 377(9759): 31-41.
Rothwell et al., "Effect of daily aspirin on risk of cancer metastasis: a study of incident cancers during randomised controlled trials" Lancet (2012) 379(9826): 1591-1601.
Rothwell et al., "Long-term effect of aspirin on colorectal cancer incidence and mortality: 20-year follow-up of five randomised trials" Lancet (2010) 376(9754): 1741-1750.
Sachais et al., "Elimination of platelet factor 4 (PF4) from platelets reduces atherosclerosis in C57Bl/6 and apoE-/- mice" Thromb Haemost (2007) 98(5): 1108-1113.
Sandset "CXCL4-platelet factor 4, heparin-induced thrombocytopenia and cancer" Thromb Res (2012) 129: S97-S100.
Sanghvi et al., "Heterocyclic Base Modifications in Nucleic Acids and Their Applications in Antisense Oligonucleotides" Antisense Research and Applications, Chapter 15, (1993) pp. 273-288.
Sangkhae et al., "The thrombopoietin receptor, MPL, is critical for development of a JAK2V617F-induced myeloproliferative neoplasm" Blood (2014) 124(26): 3956-3963.
Sasion-Behmoaras et al., "Short modified antisense oligonucleotides directed against Ha-ras point mutation induce selective cleavage of the mRNA and inhibit T24 cells proliferation", EMBO J., vol. 10, 1991, pp. 1111-1118.
Sato et al., "Glycoinsulins: Dendritic Sialyloligosaccharide-Displaying Insulins Showing a Prolonged Blood-Sugar-Lowering Activity", J Am Chem Soc, vol. 126, 2004, pp. 14013-14022.
Schmidt et al., "Extracellular matrix metalloproteinase inducer (CD147) is a novel receptor on platelets, activates platelets, and augments nuclear factor kappaB-dependent inflammation in monocytes" Circ Res (2008) 102(3): 302-309.
Schrottmaier et al., "Aspirin and P2Y12 Inhibitors in platelet-mediated activation of neutrophils and monocytes" Thromb Haemost (2015) 113(3): 478-489.
Schuhmann et al., "Blocking of platelet glycoprotein receptor Ib reduces "thrombo-inflammation" in mice with acute ischemic stroke" J Neuroinflammation (2017) 14(1): 18 1-6.
Schumacher et al., "Platelet-derived nucleotides promote tumor-cell transendothelial migration and metastasis via P2Y2 receptor" Cancer Cell (2013) 24(1): 130-137.
Schutz et al., "Absence of transforming growth factor beta 1 in murine platelets reduces neointima formation without affecting arterial thrombosis" Thromb Haemost (2017) 117(9): 1782-1797.
Serebruany et al., "Valsartan inhibits platelet activity at different doses in mild to moderate hypertensives: Valsartan Inhibits Platelets (VIP) trial" Am Heart J (2006) 151(1): 92-99.
Seth et al., "Short Antisense Oligonucleotides with Novel 2'-4' Conformationaly Restricted Nucleoside Analogues Show Improved Potency Without Increased Toxicity in Animals." J Med Chem (2009) 52:10-13.
Sharp et al., "The association of platelet and red cell count with platelet impedance changes in whole blood and light-scattering changes in platelet rich plasma: evidence from the Caerphilly Collaborative Heart Disease Study" Thromb Haemost (1990) 64(2): 211-215.

(56) References Cited

OTHER PUBLICATIONS

Shea et al., "Synthesis, hybridization properties and antiviral activity of lipid-oligodeoxynucleotide conjugates", Nucl. Acids Res., vol. 18, 1990, pp. 3777-3783.
Shim et al., "Molecular Imaging of Platelet-Endothelial Interactions and Endothelial von Willebrand Factor in Early and Mid-Stage Atherosclerosis" Circ Cardiovasc Imaging (2015) 8(7): 1-18.
Shimada et al., "Immune thrombocytopenia associated with solid cancer" J Obstet Gynaecol Res (2015) 41(9): 1495-1498.
Shimada et al., "Thrombocytosis associated with poor prognosis in patients with esophageal carcinoma" J Am Coll Surg (2004) 198(5): 737-741.
Singh et al., "LNA (locked nucleic acids): synthesis and high-affinity nucleic acid recognition", Chem. Commun, vol. 4, 1998, pp. 455-456.
Singh et al., "Synthesis of 2'-Amino-LNA: A Novel Conformationally Restricted High-Affinity Oligonucleotide Analogue with a Handle" J. Org. Chem., vol. 63, 1998, pp. 10035-10039.
Sliedregt et al., "Design and Synthesis of Novel Amphiphilic Dendritic Galactosides for Selective Targeting of Liposomes to the Hepatic Asialoglycoprotein Receptor", J. Med. Chem., vol. 42, 1999, pp. 609-618.
Spivak et al., "Chronic Myeloproliferative Disorders", American Society of Hematology, vol. 2003, No. 1, 2003, pp. 200-224.
Srivastava et al., "Five- and Six-Membered Conformationally Locked 2',4'-Carbocyclic ribo-Thymidines: Synthesis, Structure, and Biochemical Studies", J. Am. Chem. Soc., vol. 129, 2017, pp. 8362-8379.
Stephen et al., "The uncoupling of monocyte-platelet interactions from the induction of proinflammatory signaling in monocytes" J Immunol (2013) 191(11): 5677-5683.
Stivala et al., "Dietary α-linolenic acid increases the platelet count in ApoE-/- mice by reducing clearance" Blood (2013) 122(6): 1026-1033.
Stone et al., "Paraneoplastic thrombocytosis in ovarian cancer" N Eng Med (2012) 366(7): 610-618.
Suades et al., "Circulating and platelet-derived microparticles in human blood enhance thrombosis on atherosclerotic plaques" Thromb Haemost (2012) 108(6): 1208-1219.
Suades et al., "Growing thrombi release increased levels of CD235a(+) microparticles and decreased levels of activated platelet-derived microparticles. Validation in ST-elevation myocardial infarction patients" J Thromb Haemost (2015) 13(10): 1776-1786.
Suades et al., "High levels of TSP1+/CD142+ platelet-derived microparticles characterise young patients with high cardiovascular risk and subclinical atherosclerosis" Thromb Haemost (2015) 114(6): 1310-1321.
Suppiah et al., "Thrombocytosis as a prognostic factor for survival in patients with metastatic renal cell carcinoma" Cancer (2006) 107(8): 1793-1800.
Suzuki-Inoue "Essential in vivo roles of the platelet activation receptor CLEC-2 in tumour metastasis, lymphangiogenesis and thrombus formation" J Biochem (2011) 150(2): 127-132.
Suzuki-Inoue et al., "Involvement of the snake toxin receptor CLEC-2, in podoplanin-mediated platelet activation, by cancer cells" J Biol Chem (2007) 282(36): 25993-26001.
Svinarchuk et al., "Inhibition of HIV Proliferation in MT-4 cells by antisense oligonucleotide conjugated to lipophilic groups", Biochimie, vol. 75, 1993, pp. 49-54.
Sylman et al., "Platelet count as a predictor of metastasis and venous thromboembolism in patients with cancer" Converg Sci Phys Oncol (2017) 3(2): 1-12.
Tamussino et al., "Pretreatment hemoglobin, platelet count, and prognosis in endometrial carcinoma" Int J Gynecol Cancer (2001) 11(3): 236-240.
Tanaka et al., "Platelet-aggregating activities of metastasizing tumor cells. V. In situ roles of platelets in hematogenous metastases" Invasion Metastasis (1986) 6(4): 209-224.

Terres et al., [Effects of low-dose acetylsalicylic acid on thrombocytes in health subjects and in patients with coronary heart disease] Dtsch Med Wochenschr (1989) 114(33): 1231-1236.
Thaulow "Platelet function in blood from the coronary sinus in patients with arteriosclerotic heart disease" Thromb Haemost (1983) 50(3): 629-632.
Thaulow et al., "Blood platelet count and function are related to total and cardiovascular death in apparently healthy men" Circulation (1991) 84(2): 613-617.
The Concise Encyclopedia Of Polymer Science And Engineering, Kroschwitz, J.I., Ed., John Wiley & Sons, 1990, 858-859.
Theilmeier et al., "Endothelial von Willebrand factor recruits platelets to atherosclerosis- prone sites in response to hypercholesterolemia" Blood (2002) 99(12): 4486-4493.
Timar et al., "Calcium channel blocker treatment of tumor cells induces alterations in the cytoskeleton, mobility of the integrin alpha IIb beta 3 and tumor-cell-induced platelet aggregation" J Cancer Res Clin Oncol (1992) 118(6): 425-434.
Tomiya et al., "Liver-targeting of primaquine-(poly-gamma-glutamic acid) and its degradation in rat hepatocytes", Bioorg Med Chem, 2013, vol. 21, pp. 5275-5281.
Toyokuni et al., "Synthetic Vaccines: I. Synthesis of Multivalent Tn Antigen Cluster-Lysyllysine Conjugates", Tetrahedron Lett., vol. 31, 1990, pp. 2673-2676.
Tucker et al., "Hemostatic Safety and Antithrombotic Efficacy of Moderate Platelet Count Reduction by Thrombopoietin Inhibition in Primates", Science Translational Medicine, vol. 2, No. 37, 2010, pp. 1-21.
Ueland et al., "Dickkopf-1 enhances inflammatory interaction between platelets and endothelial cells and shows increased expression in atherosclerosis" Arterioscler Thromb Vasc Biol (2009) 29(8): pp. 1228-1234.
Valentijn et al., "Solid-phase Synthesis of Lysine-based Cluster Galactosides with High Affinity for the Asialoglycoprotein Receptor", Tetrahedron, vol. 53, 1997, pp. 759-770.
Van Rossenberg et al., "Stable polyplexes based on arginine-containing oligopeptides for in vivo gene delivery", Gene Ther, 2004, vol. 11, pp. 457-464.
Van Zanten et al., "Increased platelet deposition on atherosclerotic coronary arteries" J Clin Invest (1994) 93(2): 615-632.
Wahlestedt et al., "Potent and nontoxic antisense oligonucleotides containing locked nucleic acids", Proc. Natl. Acad. Sci., vol. 97, 2000, pp. 5633-5638.
Wang et al., "A Thrombopoietin Receptor Antagonist is Capable of Depleting Myelofibrosis Hematopoietic Stem and Progenitor Cells", Blood, vol. 127, No. 26, 2016, pp. 3398-3409.
Wang et al., "Enhanced Megakaryopoiesis and Platelet Activity in Hypercholesterolemic, B6-Ldlr-/-, Cdkn2a-Deficient Mice" Cir Cardiovasc Genet (2016) 9(3): 213-222.
Weber et al., "Activated tumor cell integrin avβ3 cooperates with platelets to promote extravasation and metastasis from the blood stream" Thromb Res (2016) 140: S27-S36.
Weksler et al., "Cumulative inhibitory effect of low-dose aspirin on vascular prostacyclin and platelet thromboxane production in patients with atherosclerosis" Circulation (1985) 71(2): 332-340.
Weksler et al., "Differential inhibition by aspirin of vascular and platelet prostaglandin synthesis in atherosclerotic patients" N Engl J Med (1983) 308(14): 800-805.
Wersall et al., "Mouse Platelet Ral GTPases Control P-Selectin Surface Expression, Regulating Platelet-Leukocyte Interaction" Arterioscler Thromb Vasc Biol (2018) 38(4): 787-800.
Westerlind et al., "Ligands of the asialoglycoprotein receptor for targeted gene delivery, part 1: Synthesis of and binding studies with biotinylated cluster glycosides containing N-acetylgalactosamine", Glycoconj., vol. 21, 2004, pp. 227-241.
Woolf et al., "Specificity of antisense oligonucleotides in vivo" PNAS (1992) 89: 7305-7309.
Wraith et al., "Oxidized low-density lipoproteins induce rapid platelet activation and shape change through tyrosine kinase and Rho kinase-signaling pathways" Blood (2013) 122(4): 580-589.
Wu et al., "TPO-Induced Metabolic Reprogramming Drives Liver Metastasis of Colorectal Cancer CD110+ Tumor-Initiating Cells" Cell Stem Cell (2015) 17(1): pp. 47-59.

(56) References Cited

OTHER PUBLICATIONS

Yacoub et al., "Enhanced levels of soluble CD40 ligand exacerbate platelet aggregation and thrombus formation through a CD40-dependent tumor necrosis factor receptor-associated factor-2/Rac1/p38 mitogen-activated protein kinase signaling pathway" Arterioscler Thromb Vasc Biol (2010) 30(12): pp. 2424-2433.

Yu et al., "Platelets promote the adhesion of human hepatoma cells with a highly metastatic potential to extracellular matrix protein: involvement of platelet P-selectin and GP IIb-IIIa" J Cancer Res Clin Oncol (2002) 128(5): pp. 283-287.

Zhang et al., "P-Selectin Expressed by a Human SELP Transgene Is Atherogenic in Apolipoprotein E-Deficient Mice" Arterioscler Thromb Vasc Biol (2016) 36(6): pp. 1114-1121.

Zhao et al., "Deletion of junctional adhesion molecule A from platelets increases early-stage neointima formation after wire injury in hyperlipidemic mice" J Cell Mol Med (2017) 21(8): pp. 1523-1531.

Zhou et al., "Fine Tuning of Electrostatics around the Internucleotidic Phosphate through Incorporation of Modified 2',4', -Carbocyclic-LNAs and ENAs Leads to Significant Modulation of Antisense Properties", J. Org. Chem, vol. 74, 2009, pp. 118-134.

Zuchtriegel et al., "Platelets Guide Leukocytes to Their Sites of Extravasation" PLoS Biol (2016) 14(5): pp. 1-28.

European Patent Office Extended European Patent Office for application 19838248.3, dated Apr. 14, 2023 (13 pages).

Stone et al., Supplementary Appendix for "Paraneoplastic thrombocytosis in ovarian cancer" N Eng Med (2012) 366 (7) (24 pages).

Kaser, A., et al. "Interleukin-6 stimulates thrombopoiesis through thrombopoietin: role in inflammatory thrombocytosis." Blood, The Journal of the American Society of Hematology 98.9 (2001): 2720-2725.

Desai, D., et al. "Development of liver-specific thrombopoietin targeted sirnas: impact on platelet count, megakaryocyte mass, and hematopoietic progenitors in normal and MPN murine models." Blood 132 (2018): 4329.

Shirai, T., et al. "Antisense Oligonucleotide Targeting of Thrombopoietin Synthesis Reduces Platelet Count within the Hemostatic Range and Slows Progression of De Novo Mammary Carcinogenesis in the Mmtv-Pymt Mouse." Blood 132 (2018): 989.

European Patent Office. Office Action for application 19838248.3, dated Mar. 27, 2024 (4 pages).

\* cited by examiner

SEQUENCE LISTING

```
<160> NUMBER OF SEQ ID NOS: 232

<210> SEQ ID NO 1
<211> LENGTH: 10855
<212> TYPE: DNA
<213> ORGANISM: Mus musculus

<400> SEQUENCE: 1
cctcctctgt aaaatgggca tcataatgtc agggcctttc tcccactggg ctgttgtgag        60
aaccaaagga ggcaatgcaa agcatgctct cagcaagtgc cgattttgga taagcactct       120
taaatggcat catctcacca ggccatcctg ggtgggggtt gcagggtgtt caaacaggat       180
gttgcctgtg ggatctgtga aacgaaccct gctgggacgg tccagcctgt gaagagaggt       240
ccagtgagac tggatctata gcctacaggc tcctctttat tgcccccttt actactccta       300
gtccttgccc ttttcccggt ctcaccgctg gtaggagaca gagaagcgta aacttgagcg       360
cagcaaagag actcgagcac gagctaccgc ctgcgacctc ggtcctgtca gcagcgccac       420
aaagtcttcg agaagagaag atggcctgag cactgtcaag ccttgccgcg ggactcaaac       480
ttcatcaggc ccacctccac cccagcctac ctgtgtggcc atcagcacgg gtccgctccc       540
caacgccggg ttccctcga tcgctgtaac tgcgatgctc tggatccctt ggatactcga       600
```

```
agaccaggcc agcgggctgt ggatctagat tgctgcgctc tgcatccggg gtaaggaata    660
agacggctgg cttcagaaag gtaccaggag gaccagtcct cctccgcgat gcaagtcgta    720
caggacctag tgtagagcct tccaccctcc taactccggg cacagcgggc ctcaccctgc    780
gggcaggtct ggcagcagtg tcctggcagc tggcgcggct gcctgcaggc cagggtgggg    840
cactgaggtt tgatgttctt gcagctgacc ctgccaggac ccctcccacg gcgagcccac    900
tgaggctgat ggcagagaac ataggaaaat taagggaatg aaaccatcag accccagggc    960
tgcagacagt caattctgct atttacaagt tacatggccc gtccaaagtt tcttaacttc   1020
tctgagcctc ggcgtccctg tctgcaaagt agaactaata atgtcattta tctagcaata   1080
ctgtaacggg aggggggaag ttggctaaaa gccagtcaca ttgtgggcga tcaataactg   1140
tcaacaccgc agacttgaaa gcggtttcct ccgatttgcg gaccagcctt ccctgagca    1200 tctccgagtc tactacttag gacaccagcg ttccgctacc ctctagagta gggcaggcag   1260
ctgcgttatc cactcaccgc ttcacaggcg cacagcacgc agcgcatcac cccaaaaggc   1320
tcccccaggt ccgggtgcca cgtctcgtcc aaggcataga ccttcccgcc gaaggagcag   1380
cctgcgggga cgggcttggc tggcggccgc tgtccggttg ctcgtgccgt aatgcctgct   1440
ccgggctctg cccgccaggc ccatggtccc ttggcaccgt gcaccgcgcc gcctctgctt   1500 tccccctccca ccctcccgct gcgcgaagcc acctgcgccc ggggccctct ccctgtggat   1560
gtagacttgc caggagtcag actcccctcc cgcacctccc cctggagccc acctacctgc   1620
cgctccccgg acaggcagcg gctccttctc ggaacggatg ggcagtgctg ggggctcagg   1680
gccagtgcca ctggccggcc gcgagccgag cagcagcagc ccgaggagca gccgcggggc   1740
cggcggggcc gggaggctcg gcatgacgcg gagcagacag ctggggaggc gggcgggagg   1800
agggagcagg agagggagta gggccggacc ggaggcgggc cggcaggagg gggccggggc   1860
caggaggggg gcagtggcga ggggctcgtc tcacagtcgc ctggtcggct cccggccggg   1920
cggggcggga gagagcgggc ggaggggcgc tgacccgggc cgtactccac tttagtgccc   1980
taggcgccgg ctctggcccg ttttatgccc gcgccaggcg tccgggcccg gggcctcctc   2040
ttcagcaaac gggcgcgggc ggcggctcca caaggagccc ggctgagccc gggggtccg    2100 gcccagcagc agcggccgga tcgcgagtgg gggaggggga caggctggga cccggcaggg   2160
gaggagggag ggactggagg aggggggagc ggagtgggta gggggaaggg aggaactagg   2220
gggcgcaaag agggagagga gaggcgggcc tcgacacccc cacacacgct ccttgcgacc   2280 accccctggag gtggtgtcca ccccaagacc agaggctcag gctagtgaag ggcagaggct   2340
gagcctcggg cctgtggcac tcttgaacga gatgggccgc tggaggatga ggacttgtct   2400
ttgaaaatga caccgatcca cccctaccta ggacccacag cacccccttc ctttcactct   2460
ggctgtattc ctatttccct tctaaggtct ctcctctttc ttcacttccc agggacagga   2520
acctagcctg tgcttcccag aatcaagcag tgcttccctg agtggagtca taattcacca   2580
gcaccccaac ctgctctcaa gtccatccaa ctaccacctc tggctctctc atgcttttcc   2640
ttcatccaag agatgaccct cttcctctcc agctcagtcc ccacctcctt tgtcctgctt   2700
ttctagacaa gcctccccat cctacacaca cacacacaca cacacacaca cacacacaca   2760
cacacacaca cacgcgcgcg cgcgcgcgcg cgcaccgttc ttcccactat cccagcacta   2820
ggcttcctaa tcttagaagg catctcttat tcaactggag aattccggga tccaggccat   2880
acgcctcagt agatagccca tcctctctga ggcgcagaga aagcctgagg aagacaaggg   2940
agagaggaca gggtcaggcc acaaggtccc tgaggacaga gactgtgggg agacagggac   3000
```

```
tggggagaaa gcacaggagc tagagccagg gccaaaggaa gagaggagcc agcaaagagg    3060
tatttgtggg ggaggctcgg cagctgtcct tcctaagaca gggacagatg ggcctggtta    3120
tttctcttgt cacatgtata gtggtaggac tagaagagga tcattgagca atcaagggca    3180
ggcttgccca cagagctgag gggtttagc gctccaggtc cctgtacccc tagtagaaag     3240
actgagccca gtcaatctgt ctgtctgtct gtctgtctgt ctgtctgtct gtctgtctgt    3300
ctattttaaa taagatctca ttatgcagcc ctggctcact aggtagacca ggctagcctt    3360
aaactctctg agatccacct acctctgcct cccaagtgct gagaatcaag acatgctctg    3420
ggctcaatct tttggaactc actctgtaga ccaggctggc ctcgtactca gaaatccacc    3480
tgcctctgcc tcccaagcgc tagaattaaa ggagtgtgcc accactgccc agctctgggc    3540 tcttttttt ttgttttgtt ttgttttttt tttatttatt tatttttatt atatgtaagt     3600
acactgtagc tgtcttcaga cactccagga gagtcagatc tcgatggttg tgagccacca    3660
tgtggttgct ggtatttgaa cttcggaaga gcagacgggt gctcttaccc actgagccat    3720
ctcaccagcc cctctgggct caatcttaac caaacacata tccctttact tcccgggtcc    3780
cacatattgt ccatactgtc tttctgataa cgtgatcatt ttctaatata ggcaatacct    3840
actttgccag ttggaaaggg gaaatgccag gaaagacact cctctggagc aggggaatat    3900
agaaggaaaa gcaagcaagc cagcatgctg tcagaattca gcagcaggta tactgttcag    3960
ggaaaagaaa tttggagagc caggaactga gacttcatcc atctaaaaca agacctctct    4020
ttcccagaga gaaccgtatt ctgccagatt tctcctggac taaccctctt ctctctctca    4080
cttaggtccc aggttctcat gtcgccagga catgagacag ttcccgctat acaaattctc    4140
tctagagtgt gtgtgggtgg aggagctggg ctctattcat ggaccatggt ccagccatgg    4200
gctctagtcc cagtagacag gaaaagaagt cgtcatttcc ggggagcct tcacctgggc     4260 ttggtggctc tctgctctct gattgggcgg aagtggcctg gcaggcttg tgaccctact     4320 acagaggagg ggctgtaccc caaccagtgt cttcctacct acttgttccc cagagtgctg    4380
cctgctgtgc acctgggtcc tgaggcccctt ctccacccgg tgagtggcaa gcaccatttg   4440
gggttaagtg ggggtatggt atgaagaaca aaaaagaacc gggctcttag ctgggggagg    4500
ggcaagcaaa ctggaaccta caggcactga cctttgtcaa gaagagtgga gccttcccag    4560
aatgggagga gcaggacaga gcagggaaag ggggttgggt agctggttta tgagggatta    4620
ttcacagact cagaattcag cataggtctg gctgctttgg ggccatgaga aaataagaaa    4680
gggggtgcgt gcaggcctgg agaacttgt ccagaggaac gtaatcctaa ttcccaccct     4740
catatggtca ttcttgttag cttaaggttc tgagtctggc actgggaagc tgggtcaggt    4800
gagccaaggc acgaaagag ggtaacagga ggggggcgtg tgtctgttga cagacctaca    4860
ggagatccca atattgaatc aggtgcaggt ctcggctcaa cttgtgaaaa gaggagggtc    4920
ctaatgcctc tttgctcaac ttgtgaaaag cgagggtccc aggaagggcc tggaagggat    4980
ctggaggggg cagggaggca gatgcagttg ccgtaaaaaa acgctggcag tgtctaaggt    5040
gaaggaagcc atgtgaggca gatatcatct tgctctgtaa gtgccaccca ggtctctggc    5100
ctcaggaaag aagtcctagt tctattaccc actttgactt gagtacttga aaatccaaag    5160
aaaagtcctg ggttttattt gtgggccaaa agggaaagaa tgtccaagtt tctcttttaa    5220
ttcctgcctc tggtggtctg ttatgtcctt acccagtctg cctcagtccc actcccaaca    5280
ccgttcctta gtgcatgtgt ccatttgcct gcccatttgc ttttcttct tggcctggtg     5340
```

```
acccatttc cactcttctc caaacttaac aacacccctc tctattcccg tcccacattc    5400
tctcccagct aacaaccaat gctcagaatt tgagtccact taaaatgtgt gcgtaacatc    5460
tcgctgctct tagcagggca acaattggta gatggcacca agatcttatc agagtcactg    5520
aagagctgtt acaagaggag gcactataat gcttcagtca caagaaaata tgggaccagt    5580
tggaacacaa acagctctgg ccctagctgg ccagcagttc aaggcctcca agcacccgtt    5640
tcccgtgcca gaaagtcttt tccttgaaac ctgatgaacg attcactatt tctgtcattt    5700
tcaggacaga gtccttggcc cacctctctc ccacccgact ctgccgaaag aagcacagaa    5760
gctcaagccg cctccatggc cccaggaaag attcagggga gaggccccat acagggagcc    5820
acttcagtta gacaccctgg ccagaatgga gctgactggt aaggctacat gaagggctag    5880
ggacaagttc aagaatggct tggccgcagg gcaggtgggc agagggctgg gaaccccagt    5940
ctcccctaga aaagggggtct gtctggacag cagacccctg gatttcaggt ctggcccaaa    6000 tgggatccc tgagtcacca cctgagaata agtttctcct tatccaccct tcaccgtcac    6060
ctctcctcat ccaagatttg ctcctggcgg ccatgcttct tgcagtggca agactaactc    6120
tgtccagccc cgtagctcct gcctgtgacc ccagactcct aaataaactg ctgcgtgact    6180
cccacctcct tcacagccga ctggtgagca accccaagcc ccctgctttt tacccatgta    6240
actgagttaa gggacttggg cctacagttc ctctcactcc agtattgtct ttggcgagac    6300
caccatgtct tagccctgac aagggctatg cttggcattg gtctcttaga ggctccagca    6360
tgagcatggt actaaggaag accaccccag tcaggggcca ccatcctgac ttccatttca    6420
gccttttcct cctgccccca tctttcttaa cagagtcagt gtcccgacgt cgacccttg    6480 tctatccctg ttctgctgcc tgctgtggac tttagcctgg gagaatggaa acccagacg    6540 gtaagaggct cctggactca ggcatgctgg cctcacacct gccagcctag gatgttccgg    6600
gccaggatgg actagagtga gacttccatc tcaaaaaaaa ggaagaaaat gtgttacatt    6660
gcctttccta gatcgtcttg ttattacaga tccctcctgc tccctaaaat tcttgaattt    6720 ttaaaagtc ttactttcaa cttggccacc ttatcccagg ttacattcac ctataatgag    6780
ctcttaagaa aacaatgaca aatttctgac caatatatca aataggaagg actttaattt    6840
catgccttta atctcatcac tcaggaagca gtggcaaaca gatctctgaa agttcaaggc    6900
cagtcaggga tgagacacta tctcaaacac atgtgtgtat gtatatgtac atacacatat    6960
atacatacat atgtatattt atatatacac atatattgt atatatgtat atttgtatat    7020
atatataata cacacacata tatgagat agtacatata tatgcatgat aaaaagatt    7080 aaaactgaat accataaaaa gttggttaga agcccttcat gtccatactt ttgacctact    7140
cttattcttg ttcaatcttt ttgtttaatg catttgtgta tatatatata tatggcagca    7200
catgccacat agaggtcaga gccattaagc ttggccacag caccttacc ctctgagcca    7260 tttcaagaac tcagcttgct ctctctctct ctttctctct ctttctctct ctctctctct    7320
ctctctctct ctctctctct cttcctttct ttattccttt ctttctttct tcctttcttc    7380
ttcttcttcc ttttcttctt ctcctcctcc tccttcttct tccttcttcc tcctcatttt    7440
cctccttctt ctttggtttt tcaagtcagg gtgtatttat gtctatccct ggctatcctt    7500
gctctataga ccaggctggc ttcaaactca gagatccatc tgcctctgcc tactgagtgc    7560
tgggatcaaa ggcgtgcgcc atcactgacc agcttctcaa ccttcttaag ttggtgtgta    7620
atctgatctg ctgcccacaa gtgacataaa gcagaaagta tcactaaatt aaggcaaaat    7680
caagattcaa atccttgctg ggcatagtga cacaaaccag aaatcctagc agctcagaga    7740
```

```
gccgggcaca aagatgagga gctacaggct agcctaagct acatagtgag agcttgtctc      7800
aaaaaataaa caatagcagc agaagcaagc caggtggcac atacctgtac tatgtagaat      7860 cccctttca  agtctcctag ggattctggg tcaggagaag gatgaatcat atgaattata      7920
gctctagctc tgtgtttgta acagggtcta cctatgtatt ccagactggc cttgaacttg      7980
tgatccccct gtctcagccc cccaagtgct gggattacag gcatgtgtca tcatattcag      8040
ctctgccatt tgttaagccc cttcccttca tcttcagggt tatggtgaca gttttgttgc      8100
tacatttaac ttagaagtgc tgtgggcaac agttttgtat cagaaaagaa taaggctaca      8160
atgctgcagc ctagagctaa aagctgctgc aaggtggagt ggctttctaa gagtctatgc      8220
aagaccaggc tacactgatg gacactggag ttgctgaagc agaggccaat gaccagttat      8280
taggagactg tgaaggaatt cctgtgatgg gtgggaccct catcctgtcc agttctcagc      8340
tcctatgatt catccttctg gctactccta tgggctcccc acccattctt agcactttt       8400 tttttttttt aagcagtcca ctttttcttt cccaggaaca gagcaaggca caggacattc      8460
taggggcagt gtcccttcta ctggagggag tgatggcagc acgaggacag ttggaaccct      8520
cctgcctctc atccctcctg ggacagcttt ctgggcaggt tcgcctcctc ttgggggccc      8580
tgcagggcct cctaggaacc caggtaagtc cccaaaccta tagaaactac ccttttattc      8640
agttcctaag gacctggggg aagacaaggg attcaaggtg cttccagtgt atgaaggttg      8700
gcttatacgg agtgatactt cccagacgtg atacctgggt gctggcaata aatcttttct      8760
ccttattcag aagaggcctg atatgtgggc ctactcactg gcctcaggcc catcctctgc      8820
cctcagcttc ctctacaggg caggaccaca gctcacaagg ccccaatgc  cctcttcttg      8880 agcttgcaac aactgcttcg gggaaaggtg cgcttcctgc ttctggtaga aggtcccacc      8940
ctctgtgtca gacggaccct gccaaccaca gctgtcccaa gcagtacttc tcaactcctc      9000
acactaaaca agttcccaaa caggacttct ggattgttgg agacgaactt cagtgtcaca      9060
gccagaactg ctggccctgg acttctgagc aggcttcagg gattcagagt caagattact      9120
cctggtcagc taaatcaaac ctccaggtcc ccagtccaaa tctctggata cctgaacagg      9180
acacacggac ctgtgaatgg aactcatggg ctctttgctg gaacctcact tcagaccctg      9240
gaagcctcag acatctcgcc cggagctttc aacaaaggct ccctggcatt caacctccag      9300
ggtggacttc ctccttctcc aagccttgct cctgatggac acacacccctt ccctccttca     9360 cctgccttgc ccaccaccca tggatctcca ccccagctcc acccctgtt  tcctgaccct      9420 tccaccacca tgcctaactc taccgcccct catccagtca caatgtaccc tcatcccagg      9480
aatttgtctc aggaaacata gcgcgggcac tggcccagtg agcgtctgca gcttctctcg      9540
gggacaagct tccccaggaa ggctgagagg cagctgcatc tgctccagat gttctgcttt      9600
cacctaaaag gccctgggga agggatacac agcactggag attgtaaaat tttaggagct      9660
attttttttt aacctatcag caatattcat cagagcagct agcgatcttt ggtctatttt      9720
cggtataaat ttgaaaatca ctaattctct atatgtgctt tcatacatta agtctgcaaa      9780
tgcctaggca ggtcttgcct tttaacccag gtagatgcta caccatatca gaaaacaaaa      9840
gggaactttc ctttgcttca gtttaagcc  ttccgcgcc  tccaacaccc ccacaatgcc      9900
ctccttccct tcactgtaat tctcagtgag actgtatggt cctcgagata tactgctctt      9960
gataaagaat taacaggcta tcacttagaa agactgtccc tacttaagag acaaaactga     10020
acctgtaaga gaataactgg gagcacccaa aagccaataa aaatcagaga ccaatgttct     10080
```

| | |
|---|---|
| tcactggggc aacagagctc ctggaccctg cctcccaaga aagctaacag gaagcctggg | 10140 |
| agctccacac cccaggtaag gctgtgcagc tggctcagta aagagcagac ttggatgtgg | 10200 |
| cagctgagca aagagcatca gcagctcagc aggggctcag ccaggcctgg gctcctgctt | 10260 |
| ccctcctgtg gaggtcaggc ggaagtgcag gaagtggcaa gaggcaggct cctcggctca | 10320 |
| cacagcagga caagcacaga gcgcttgaag gctctttata atttccacaa atgcacctaa | 10380 |
| aaagcagccc tgtgtggcca ctccaaactt tattggaacc ctcccaaatg aaggcagact | 10440 |
| tataggactt tccaagtaaa cccgagtctc agctttgttg gtgctagagg tttacattgc | 10500 |
| gcaagaacaa aaactgtatt gccagggtc aacctgcaat agccagagtc ttatgaaaag | 10560 |
| actggtgaga gcttttccct ctcttgtgtc ccaaagtaaa ggaggaaaga ccaccatgta | 10620 |
| ggtggaaaag ccaggatctc acagttccaa acacacacac acacgtgt ggggatgaca | 10680 |
| attcagacag tgccaggtgt ctacacaggc agaacctaat gaacggatca acagatgcac | 10740 |
| atagctaaaa ctgttatcag aatctcagtg tcagtttcta tgtgacagag accttcatct | 10800 |
| tctaattcta ggataaatat actttgtaat ttgtcgtaac actaaaagag gctaa | 10855 |

<210> SEQ ID NO 2
<211> LENGTH: 2416
<212> TYPE: DNA
<213> ORGANISM: Mus musculus

<400> SEQUENCE: 2

| | |
|---|---|
| ggtcctgtca gcagcgccac aaagtcttcg agaagagaag atggcctgag cactgtcaag | 60 |
| ccttgccgcg ggactcaaac ttcatcaggc ccacctccac cccagcctac ctgtgtggcc | 120 |
| atcagcacgg gtccgctccc caacgccggg ttccctcga tcactgtaac tgcgatgctc | 180 |
| tggatccctt ggatactcga agaccaggcc agcgggctgt ggatctagat tgctgcgctc | 240 |
| tgcatccggg gacagagtcc ttggcccacc tctctcccac ccgactctgc cgaaagaagc | 300 |
| acagaagctc aagccgcctc catggcccca ggaaagattc aggggagagg ccccatacag | 360 |
| ggagccactt cagttagaca ccctggccag aatggagctg actgatttgc tcctggcggc | 420 |
| catgcttctt gcagtggcaa gactaactct gtccagcccc gtagctcctg cctgtgaccc | 480 |
| cagactccta aataaactgc tgcgtgactc ccacctcctt cacagccgac tgagtcagtg | 540 |
| tcccgacgtc gacccttttgt ctatcccttgt tctgctgcct gctgtggact ttagcctggg | 600 |
| agaatggaaa acccagacgg aacagagcaa ggcacaggac attctagggg cagtgtccct | 660 |
| tctactggag ggagtgatgg cagcacgagg acagttggaa ccctcctgcc tctcatccct | 720 |
| cctgggacag cttctctggc aggttcgcct cctcttgggg gccctgcagg gcctcctagg | 780 |
| aacccagctt cctctacagg gcaggaccac agctcacaag gaccccaatg ccctcttctt | 840 |
| gagcttgcaa caactgcttc ggggaaaggt gcgcttcctg cttctggtag aaggtcccac | 900 |
| cctctgtgtc agacggaccc tgccaaccac agctgtccca gcagtacttc tcaactcct | 960 |
| cacactaaac aagttcccaa acaggacttc tggattgttg gagacgaact tcagtgtcac | 1020 |
| agccagaact gctggccctg gacttctgag caggcttcag ggattcagag tcaagattac | 1080 |
| tcctggtcag ctaaatcaaa cctccaggtc cccagtccaa atctctggat acctgaacag | 1140 |
| gacacacgga cctgtgaatg gaactcatgg gctctttgct ggaacctcac ttcagaccct | 1200 |
| ggaagcctca gacatctcgc ccggagcttt caacaaaggc tccctggcat tcaacctcca | 1260 |
| gggtggactt cctccttctc caagccttgc tcctgatgga cacacaccct tccctccttc | 1320 |
| acctgccttg cccaccaccc atggatctcc accccagctc caccccctgt ttcctgaccc | 1380 |

```
ttccaccacc atgcctaact ctaccgcccc tcatccagtc acaatgtacc ctcatcccag      1440
gaatttgtct caggaaacat agcgcgggca ctggcccagt gagcgtctgc agcttctctc      1500
ggggacaagc ttccccagga aggctgagag gcagctgcat ctgctccaga tgttctgctt      1560
tcacctaaaa ggccctgggg aagggataca cagcactgga gattgtaaaa ttttaggagc      1620 tattttttt taacctatca gcaatattca tcagagcagc tagcgatctt tggtctattt      1680
tcggtataaa tttgaaaatc actaattctc tatatgtgct ttcatacatt aagtctgcaa      1740
atgcctaggc aggtcttgcc ttttaaccca ggtagatgct acaccatatc agaaaacaaa      1800
agggaacttt cctttgcttc aagtttaagc cttcccgcgc ctccaacacc cccacaatgc      1860
cctccttccc ttcactgtaa ttctcagtga gactgtatgg tcctcgagat atactgctct      1920
tgataaagaa ttaacaggct atcacttaga aagactgtcc ctacttaaga gacaaaactg      1980
aacctgtaag agaataactg ggagcaccca aaagccaata aaaatcaggg accaatgttc      2040
ttcactgggg caacagagct cctggacccct gcctcccaag aaagctaaca ggaagcctgg      2100
gagctccaca ccccaggtaa ggctgtgcag ctggctcagt aaagagcaga cttggatgtg      2160
gcagctgagc aaagagcatc agcagctcag caggggctca gccaggcctg ggctcctgct      2220
tccctcctgt ggaggtcagg cggaagtgca ggaagtggca agaggcaggc tcctcggctc      2280
acacagcagg acaagcacag agcgcttgaa ggctctttat aatttccaca aatgcaccta      2340
aaaagcagcc ctgtgtggcc actccaaact ttattggaac cctcccaaat gaaggcagac      2400
ttataggact ttccaa                                                      2416
```

```
<210> SEQ ID NO 3
<211> LENGTH: 22
<212> TYPE: DNA
<213> ORGANISM: Artificial sequence
<220> FEATURE:
<223> OTHER INFORMATION: Primer

<400> SEQUENCE: 3
ccctttgtct atccctgttc tg                                               22

<210> SEQ ID NO 4
<211> LENGTH: 19
<212> TYPE: DNA
<213> ORGANISM: Artificial sequence
<220> FEATURE:
<223> OTHER INFORMATION: Primer

<400> SEQUENCE: 4
actgccccta gaatgtcct                                                   19

<210> SEQ ID NO 5
<211> LENGTH: 23
<212> TYPE: DNA
<213> ORGANISM: Artificial sequence
<220> FEATURE:
<223> OTHER INFORMATION: Probe

<400> SEQUENCE: 5
ccttgctctg ttccgtctgg gtt                                              23

<210> SEQ ID NO 6
<211> LENGTH: 20
<212> TYPE: DNA
<213> ORGANISM: Artificial sequence
<220> FEATURE:
```

<223> OTHER INFORMATION: Synthetic oligonucleotide

<400> SEQUENCE: 6
tctcgaagac tttgtggcgc                                                    20

<210> SEQ ID NO 7
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 7
agtttgagtc ccgcggcaag                                                    20

<210> SEQ ID NO 8
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 8
cgcagttaca gtgatcgagg                                                    20

<210> SEQ ID NO 9
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 9
atccacagcc cgctggcctg                                                    20

<210> SEQ ID NO 10
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 10
ctttcggcag agtcgggtgg                                                    20

<210> SEQ ID NO 11
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 11
actgaagtgg ctccctgtat                                                    20

<210> SEQ ID NO 12
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 12
tgcaagaagc atggccgcca                                                    20

```
<210> SEQ ID NO 13
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 13
gcagcagaac agggatagac                                                   20

<210> SEQ ID NO 14
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 14
gtgccttgct ctgttccgtc                                                   20

<210> SEQ ID NO 15
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 15
ggagggttcc aactgtcctc                                                   20

<210> SEQ ID NO 16
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 16
accaggagta atcttgactc                                                   20

<210> SEQ ID NO 17
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 17
tcacaggtcc gtgtgtcctg                                                   20

<210> SEQ ID NO 18
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 18
tgaggcttcc agggtctgaa                                                   20

<210> SEQ ID NO 19
<211> LENGTH: 20
<212> TYPE: DNA
<213> ORGANISM: Artificial sequence
<220> FEATURE:
<223> OTHER INFORMATION: Synthetic oligonucleotide
```

<400> SEQUENCE: 19
ggaagggtgt gtgtccatca                                        20

<210> SEQ ID NO 20
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 20
gttaggcatg gtggtggaag                                        20

<210> SEQ ID NO 21
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 21
ggccagtgcc cgcgctatgt                                        20

<210> SEQ ID NO 22
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 22
gtgaaagcag aacatctgga                                        20

<210> SEQ ID NO 23
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 23
ctaaaatttt acaatctcca                                        20

<210> SEQ ID NO 24
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 24
ccaaagatcg ctagctgctc                                        20

<210> SEQ ID NO 25
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 25
gacttaatgt atgaaagcac                                        20

<210> SEQ ID NO 26
<211> LENGTH: 20

```
<212> TYPE: DNA
<213> ORGANISM: Artificial sequence
<220> FEATURE:
<223> OTHER INFORMATION: Synthetic oligonucleotide

<400> SEQUENCE: 26
tatggtgtag catctacctg                                               20

<210> SEQ ID NO 27
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 27
gttggaggcg cgggaaggct                                               20

<210> SEQ ID NO 28
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 28
agcagtatat ctcgaggacc                                               20

<210> SEQ ID NO 29
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 29
tgtctcttaa gtagggacag                                               20

<210> SEQ ID NO 30
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 30
ttttattggc ttttgggtgc                                               20

<210> SEQ ID NO 31
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 31
ggcagggtcc aggagctctg                                               20

<210> SEQ ID NO 32
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 32
```
ccagctgcac agccttacct 20

<210> SEQ ID NO 33
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 33
gctgatgctc tttgctcagc 20

<210> SEQ ID NO 34
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 34
tctgtgcttg tcctgctgtg 20

<210> SEQ ID NO 35
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 35
ggagtggcca cacagggctg 20

<210> SEQ ID NO 36
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 36
gtaggaagac actggttggg 20

<210> SEQ ID NO 37
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 37
accccggatg cagagcgcag 20

<210> SEQ ID NO 38
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 38
tgccccaccc tggcctgcag 20

<210> SEQ ID NO 39
<211> LENGTH: 20
<212> TYPE: DNA
<213> ORGANISM: Artificial sequence

```
<220> FEATURE:
<223> OTHER INFORMATION: Synthetic oligonucleotide

<400> SEQUENCE: 39
tctactttgc agacagggac                                                    20

<210> SEQ ID NO 40
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 40
gcctgcccta ctctagaggg                                                    20

<210> SEQ ID NO 41
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 41
tggcttcgcg cagcgggagg                                                    20

<210> SEQ ID NO 42
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 42
ggcgactgtg agacgagccc                                                    20

<210> SEQ ID NO 43
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 43
gggtcccagc ctgtccccct                                                    20

<210> SEQ ID NO 44
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 44
cccgaggctc agcctctgcc                                                    20

<210> SEQ ID NO 45
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 45
ggaagcactg cttgattctg                                                    20
```

<210> SEQ ID NO 46
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 46
gggaagaacg gtgcgcgcgc					20

<210> SEQ ID NO 47
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 47
cccttgattg ctcaatgatc					20

<210> SEQ ID NO 48
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 48
atgtcttgat tctcagcact					20

<210> SEQ ID NO 49
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 49
gttaagattg agcccagagg					20

<210> SEQ ID NO 50
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 50
tgacagcatg ctggcttgct					20

<210> SEQ ID NO 51
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 51
tctcatgtcc tggcgacatg					20

<210> SEQ ID NO 52
<211> LENGTH: 20
<212> TYPE: DNA
<213> ORGANISM: Artificial sequence
<220> FEATURE:
<223> OTHER INFORMATION: Synthetic oligonucleotide

```
<400> SEQUENCE: 52
cttaagctaa caagaatgac                                              20

<210> SEQ ID NO 53
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 53
aagtgggtaa tagaactagg                                              20

<210> SEQ ID NO 54
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 54
gtcaccaggc caagaagaaa                                              20

<210> SEQ ID NO 55
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 55
ttatagtgcc tcctcttgta                                              20

<210> SEQ ID NO 56
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 56
tgaaaatgac agaaatagtg                                              20

<210> SEQ ID NO 57
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 57
actcagggat ccccatttgg                                              20

<210> SEQ ID NO 58
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 58
tggtggtctc gccaaagaca                                              20

<210> SEQ ID NO 59
```

```
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 59
gtaagacttt ttaaaaattc                                                 20

<210> SEQ ID NO 60
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 60
gtgtctcatc cctgactggc                                                 20

<210> SEQ ID NO 61
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 61
aacaagaata agagtaggtc                                                 20

<210> SEQ ID NO 62
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 62
gaaggaggaa aatgaggagg                                                 20

<210> SEQ ID NO 63
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 63
attttgcctt aatttagtga                                                 20

<210> SEQ ID NO 64
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 64
tgctattgtt tattttttga                                                 20

<210> SEQ ID NO 65
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 65
```

```
atatgatgac acatgcctgt                                              20

<210> SEQ ID NO 66
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 66
gtagcctggt cttgcataga                                              20

<210> SEQ ID NO 67
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 67
aagtggactg cttaaaaaaa                                              20

<210> SEQ ID NO 68
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 68
gccagcaccc aggtatcacg                                              20

<210> SEQ ID NO 69
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 69
gccatcttct cttctcgaag                                              20

<210> SEQ ID NO 70
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 70
tgggcctgat gaagtttgag                                              20

<210> SEQ ID NO 71
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 71
gcagcaatct agatccacag                                              20

<210> SEQ ID NO 72
<211> LENGTH: 20
<212> TYPE: DNA
```

```
<213> ORGANISM: Artificial sequence
<220> FEATURE:
<223> OTHER INFORMATION: Synthetic oligonucleotide

<400> SEQUENCE: 72
gcttctgtgc ttctttcggc                                               20

<210> SEQ ID NO 73
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 73
gccagggtgt ctaactgaag                                               20

<210> SEQ ID NO 74
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 74
gttagtcttg ccactgcaag                                               20

<210> SEQ ID NO 75
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 75
tggttggcag ggtccgtctg                                               20

<210> SEQ ID NO 76
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 76
catgagttcc attcacaggt                                               20

<210> SEQ ID NO 77
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 77
gggcgagatg tctgaggctt                                               20

<210> SEQ ID NO 78
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 78
gaagtccacc ctggaggttg                                               20
```

<210> SEQ ID NO 79
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 79
aggcaggtga aggagggaag                                               20

<210> SEQ ID NO 80
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 80
acattgtgac tggatgaggg                                               20

<210> SEQ ID NO 81
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 81
tgtccccgag agaagctgca                                               20

<210> SEQ ID NO 82
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 82
ccagggcctt ttaggtgaaa                                               20

<210> SEQ ID NO 83
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 83
gttaaaaaaa aatagctcct                                               20

<210> SEQ ID NO 84
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 84
ctaggcattt gcagacttaa                                               20

<210> SEQ ID NO 85
<211> LENGTH: 20
<212> TYPE: DNA
<213> ORGANISM: Artificial sequence
<220> FEATURE:

```
<223> OTHER INFORMATION: Synthetic oligonucleotide

<400> SEQUENCE: 85
ttttgttttc tgatatggtg                                          20

<210> SEQ ID NO 86
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 86
attacagtga agggaaggag                                          20

<210> SEQ ID NO 87
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 87
attctttatc aagagcagta                                          20

<210> SEQ ID NO 88
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 88
ttggtccctg atttttattg                                          20

<210> SEQ ID NO 89
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 89
ttagctttct tgggaggcag                                          20

<210> SEQ ID NO 90
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 90
ctctttactg agccagctgc                                          20

<210> SEQ ID NO 91
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 91
ccctgctgag ctgctgatgc                                          20
```

-continued

```
<210> SEQ ID NO 92
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 92
ggaaattata aagagccttc                                               20

<210> SEQ ID NO 93
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 93
tccaataaag tttggagtgg                                               20

<210> SEQ ID NO 94
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 94
actggtcctc ctggtacctt                                               20

<210> SEQ ID NO 95
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 95 acttccccccc tcccgttaca                                              20

<210> SEQ ID NO 96
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 96
tgactcctgg caagtctaca                                               20

<210> SEQ ID NO 97
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 97
acccactccg ctccccctc                                                20

<210> SEQ ID NO 98
<211> LENGTH: 20
<212> TYPE: DNA
<213> ORGANISM: Artificial sequence
<220> FEATURE:
<223> OTHER INFORMATION: Synthetic oligonucleotide
```

```
<400> SEQUENCE: 98
tggacttgag agcaggttgg                                               20

<210> SEQ ID NO 99
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 99
tgaataagag atgccttcta                                               20

<210> SEQ ID NO 100
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 100
gctcagtctt tctactaggg                                               20

<210> SEQ ID NO 101
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 101
cactccttta attctagcgc                                               20

<210> SEQ ID NO 102
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 102
cagtatggac aatatgtggg                                               20

<210> SEQ ID NO 103
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 103
gagtctgtga ataatccctc                                               20

<210> SEQ ID NO 104
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 104
gtgccttggc tcacctgacc                                               20

<210> SEQ ID NO 105
<211> LENGTH: 20
```

<212> TYPE: DNA
<213> ORGANISM: Artificial sequence
<220> FEATURE:
<223> OTHER INFORMATION: Synthetic oligonucleotide

<400> SEQUENCE: 105
ccctgccccc tccagatccc                                          20

<210> SEQ ID NO 106
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 106
aataaaaccc aggacttttc                                          20

<210> SEQ ID NO 107
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 107
gttagctggg agagaatgtg                                          20

<210> SEQ ID NO 108
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 108
ggtcccatat tttcttgtga                                          20

<210> SEQ ID NO 109
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 109
gtgacggtga agggtggata                                          20

<210> SEQ ID NO 110
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 110
cctctaagag accaatgcca                                          20

<210> SEQ ID NO 111
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 111
ctaggctggc aggtgtgagg                                            20

<210> SEQ ID NO 112
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 112
acaaatatac atatatacaa                                            20

<210> SEQ ID NO 113
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 113
gctgccatat atatatatat                                            20

<210> SEQ ID NO 114
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 114
atagccaggg atagacataa                                            20

<210> SEQ ID NO 115
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 115
tgattttgcc ttaatttagt                                            20

<210> SEQ ID NO 116
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 116
gggattctac atagtacagg                                            20

<210> SEQ ID NO 117
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 117
aactgtcacc ataaccctga                                            20

<210> SEQ ID NO 118
<211> LENGTH: 20
<212> TYPE: DNA
<213> ORGANISM: Artificial sequence

```
<220> FEATURE:
<223> OTHER INFORMATION: Synthetic oligonucleotide

<400> SEQUENCE: 118
ataactggtc attggcctct                                                    20

<210> SEQ ID NO 119
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 119
ggcccacata tcaggcctct                                                    20

<210> SEQ ID NO 120
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 120
ggccacacag gtaggctggg                                                    20

<210> SEQ ID NO 121
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 121
cgagtatcca agggatccag                                                    20

<210> SEQ ID NO 122
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 122
tccccggatg cagagcgcag                                                    20

<210> SEQ ID NO 123
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 123
ggaggcggct tgagcttctg                                                    20

<210> SEQ ID NO 124
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 124
ggtcacaggc aggagctacg                                                    20
```

<210> SEQ ID NO 125
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 125
gtagaaggga cactgcccct                                          20

<210> SEQ ID NO 126
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 126
ccctgaagcc tgctcagaag                                          20

<210> SEQ ID NO 127
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 127
atccagagat ttggactggg                                          20

<210> SEQ ID NO 128
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 128
gttccagcaa agagcccatg                                          20

<210> SEQ ID NO 129
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 129
gttgaaagct ccgggcgaga                                          20

<210> SEQ ID NO 130
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 130
aggcttggag aaggaggaag                                          20

<210> SEQ ID NO 131
<211> LENGTH: 20
<212> TYPE: DNA
<213> ORGANISM: Artificial sequence
<220> FEATURE:
<223> OTHER INFORMATION: Synthetic oligonucleotide

```
<400> SEQUENCE: 131
gtggagatcc atgggtggtg                                              20

<210> SEQ ID NO 132
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 132
gacaaattcc tgggatgagg                                              20

<210> SEQ ID NO 133
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 133
gctgcctctc agccttcctg                                              20

<210> SEQ ID NO 134
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 134
tgtatccctt ccccagggcc                                              20

<210> SEQ ID NO 135
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 135
agtgattttc aaatttatac                                              20

<210> SEQ ID NO 136
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 136
aggcaagacc tgcctaggca                                              20

<210> SEQ ID NO 137
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 137
tgatagcctg ttaattcttt                                              20

<210> SEQ ID NO 138
```

```
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 138
gttattctct tacaggttca                                              20

<210> SEQ ID NO 139
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 139
cagtgaagaa cattggtccc                                              20

<210> SEQ ID NO 140
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 140
catccaagtc tgctctttac                                              20

<210> SEQ ID NO 141
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 141
ggcctggctg agcccctgct                                              20

<210> SEQ ID NO 142
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 142
aggtgcattt gtggaaatta                                              20

<210> SEQ ID NO 143
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 143
gtctgccttc atttgggagg                                              20

<210> SEQ ID NO 144
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 144
```

```
tggaaggctc tacactaggt                                               20

<210> SEQ ID NO 145
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 145
ctgatggttt cattccctta                                               20

<210> SEQ ID NO 146
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 146
gtgttgacag ttattgatcg                                               20

<210> SEQ ID NO 147
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 147
ctgctccctc ctcccgcccg                                               20

<210> SEQ ID NO 148
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 148
acagccagag tgaaaggaag                                               20

<210> SEQ ID NO 149
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 149
tcttggatga aggaaaagca                                               20

<210> SEQ ID NO 150
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 150
atgggctatc tactgaggcg                                               20

<210> SEQ ID NO 151
<211> LENGTH: 20
<212> TYPE: DNA
```

```
<213> ORGANISM: Artificial sequence
<220> FEATURE:
<223> OTHER INFORMATION: Synthetic oligonucleotide

<400> SEQUENCE: 151
ctgccgagcc tcccccacaa                                                     20

<210> SEQ ID NO 152
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 152
tttaaaatag acagacagac                                                     20

<210> SEQ ID NO 153
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 153
ctgactctcc tggagtgtct                                                     20

<210> SEQ ID NO 154
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 154
agtaggtatt gcctatatta                                                     20

<210> SEQ ID NO 155
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 155
ggaaagagag gtcttgtttt                                                     20

<210> SEQ ID NO 156
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 156
gggactagag cccatggctg                                                     20

<210> SEQ ID NO 157
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 157
gctaagagcc cggttctttt                                                     20
```

<210> SEQ ID NO 158
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 158
ttattttctc atggccccaa                                               20

<210> SEQ ID NO 159
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 159
aggtctgtca acagacacac                                               20

<210> SEQ ID NO 160
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 160
ttcaccttag acactgccag                                               20

<210> SEQ ID NO 161
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 161
ggcaggaatt aaaagagaaa                                               20

<210> SEQ ID NO 162
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 162
tgttacgcac acattttaag                                               20

<210> SEQ ID NO 163
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 163
ctgtttgtgt tccaactggt                                               20

<210> SEQ ID NO 164
<211> LENGTH: 20
<212> TYPE: DNA
<213> ORGANISM: Artificial sequence
<220> FEATURE:

<223> OTHER INFORMATION: Synthetic oligonucleotide

<400> SEQUENCE: 164
cggccaagcc attcttgaac                                              20

<210> SEQ ID NO 165
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 165
gtcaggatgg tggcccctga                                              20

<210> SEQ ID NO 166
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 166
cctatttgat atattggtca                                              20

<210> SEQ ID NO 167
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 167
atatatgtac tatctcatat                                              20

<210> SEQ ID NO 168
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 168
ggtgctgtgg ccaagcttaa                                              20

<210> SEQ ID NO 169
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 169
tggtcagtga tggcgcacgc                                              20

<210> SEQ ID NO 170
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 170
aggatttctg gtttgtgtca                                              20

```
<210> SEQ ID NO 171
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 171
tgattcatcc ttctcctgac                                              20

<210> SEQ ID NO 172
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 172
tgatacaaaa ctgttgccca                                              20

<210> SEQ ID NO 173
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 173
aggatgaggg tcccacccat                                              20

<210> SEQ ID NO 174
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 174
tccttaggaa ctgaataaaa                                              20

<210> SEQ ID NO 175
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 175
gcggcaaggc ttgacagtgc                                              20

<210> SEQ ID NO 176
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 176
gccaaggact ctgtccccgg                                              20

<210> SEQ ID NO 177
<211> LENGTH: 20
<212> TYPE: DNA
<213> ORGANISM: Artificial sequence
<220> FEATURE:
<223> OTHER INFORMATION: Synthetic oligonucleotide
```

<400> SEQUENCE: 177
cagtttattt aggagtctgg                                               20

<210> SEQ ID NO 178
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 178
ggatagacaa agggtcgacg                                               20

<210> SEQ ID NO 179
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 179
agaggaggcg aacctgccca                                               20

<210> SEQ ID NO 180
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 180
accttctacc agaagcagga                                               20

<210> SEQ ID NO 181
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 181
tgagaagtac tgcttgggac                                               20

<210> SEQ ID NO 182
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 182
ggctgtgaca ctgaagttcg                                               20

<210> SEQ ID NO 183
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 183
gtctgaagtg aggttccagc                                               20

<210> SEQ ID NO 184
<211> LENGTH: 20

```
<212> TYPE: DNA
<213> ORGANISM: Artificial sequence
<220> FEATURE:
<223> OTHER INFORMATION: Synthetic oligonucleotide

<400> SEQUENCE: 184
ccagggagcc tttgttgaaa                                              20

<210> SEQ ID NO 185
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 185
gtccatcagg agcaaggctt                                              20

<210> SEQ ID NO 186
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 186
gctatgtttc ctgagacaaa                                              20

<210> SEQ ID NO 187
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 187
ggagcagatg cagctgcctc                                              20

<210> SEQ ID NO 188
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 188
gcacatatag agaattagtg                                              20

<210> SEQ ID NO 189
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 189
tctacctggg ttaaaaggca                                              20

<210> SEQ ID NO 190
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 190
```
aaggcttaaa cttgaagcaa                                          20

<210> SEQ ID NO 191
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 191
cgaggaccat acagtctcac                                          20

<210> SEQ ID NO 192
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 192
agtctttcta agtgatagcc                                          20

<210> SEQ ID NO 193
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 193
tgggtgctcc cagttattct                                          20

<210> SEQ ID NO 194
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 194
gctctgttgc cccagtgaag                                          20

<210> SEQ ID NO 195
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 195
gggtgtggag ctcccaggct                                          20

<210> SEQ ID NO 196
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 196
ctgctgtgtg agccgaggag                                          20

<210> SEQ ID NO 197
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 197
aaagtcctat aagtctgcct                                              20

<210> SEQ ID NO 198
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 198
caaggactct gtccgggtgg                                              20

<210> SEQ ID NO 199
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 199
atgtaacttg taaatagcag                                              20

<210> SEQ ID NO 200
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 200
gggcagagcc cggagcaggc                                              20

<210> SEQ ID NO 201
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 201
agcactgccc atccgttccg                                              20

<210> SEQ ID NO 202
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 202
ggtggacacc acctccaggg                                              20

<210> SEQ ID NO 203
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 203
ctgggaagtg aagaaagagg                                              20

<210> SEQ ID NO 204
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 204
agcaggacaa aggaggtggg                                               20

<210> SEQ ID NO 205
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 205
ctctctccct tgtcttcctc                                               20

<210> SEQ ID NO 206
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 206
agagagttta aggctagcct                                               20

<210> SEQ ID NO 207
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 207
ttccgaagtt caaataccag                                               20

<210> SEQ ID NO 208
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 208
tccagaggag tgtctttcct                                               20

<210> SEQ ID NO 209
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 209
agagggttag tccaggagaa                                               20

<210> SEQ ID NO 210
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 210
aggtgaaggc tcccccggaa						20

<210> SEQ ID NO 211
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 211
cgttcctctg gacaaagttc						20

<210> SEQ ID NO 212
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 212
agttgagccg agacctgcac						20

<210> SEQ ID NO 213
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 213
ggtggcactt acagagcaag						20

<210> SEQ ID NO 214
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 214
agtgggactg aggcagactg						20

<210> SEQ ID NO 215
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 215
tcttggtgcc atctaccaat						20

<210> SEQ ID NO 216
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 216
aacgggtgct tggaggcctt						20

<210> SEQ ID NO 217

```
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 217
agacagaccc cttttctagg                                              20

<210> SEQ ID NO 218
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 218
gtcccttaac tcagttacat                                              20

<210> SEQ ID NO 219
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 219
tgactctgtt aagaaagatg                                              20

<210> SEQ ID NO 220
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 220
ctgtaataac aagacgatct                                              20

<210> SEQ ID NO 221
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 221
cactgcttcc tgagtgatga                                              20

<210> SEQ ID NO 222
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 222
accaactttt tatggtattc                                              20

<210> SEQ ID NO 223
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 223
```
agagagagag agcaagctga                                              20

<210> SEQ ID NO 224
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 224
tgggcagcag atcagattac                                              20

<210> SEQ ID NO 225
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 225
gctagcctgt agctcctcat                                              20

<210> SEQ ID NO 226
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 226
ataggtagac cctgttacaa                                              20

<210> SEQ ID NO 227
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 227
gcagctttta gctctaggct                                              20

<210> SEQ ID NO 228
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 228
ataggagtag ccagaaggat                                              20

<210> SEQ ID NO 229
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 229
ccttcataca ctggaagcac                                              20

<210> SEQ ID NO 230
<211> LENGTH: 20
<212> TYPE: DNA

```
<213> ORGANISM: Artificial sequence
<220> FEATURE:
<223> OTHER INFORMATION: Synthetic oligonucleotide

<400> SEQUENCE: 230
tctgattttt attggctttt                                              20

<210> SEQ ID NO 231
<211> LENGTH: 1923
<212> TYPE: DNA
<213> ORGANISM: Homo sapien

<400> SEQUENCE: 231
cagaagtggc caggcaggc gtatgacctg ctgctgtgga ggggctgtgc cccaccgcca    60
catgtcttcc tacccatctg ctccccagag ggctgcctgc tgtgcacttg ggtcctggag   120
cccttctcca cccggataga ttcttcaccc ttggcccgcc tttgccccac cctactctgc   180
ccagaagtgc aagagcctaa gccgcctcca tggccccagg aaggattcag gggagaggcc   240
ccaaacaggg agccacgcca gccagacacc ccggccagaa tggagctgac tgaattgctc   300
ctcgtggtca tgcttctcct aactgcaagg ctaacgctgt ccagcccggc tcctcctgct   360
tgtgacctcc gagtcctcag taaactgctt cgtgactccc atgtccttca cagcagactg   420
agccagtgcc cagaggttca ccctttgcct cacctgtcc tgctgcctgc tgtggacttt    480
agcttgggag aatggaaaac ccagatggag gagaccaagg cacaggacat tctgggagca   540 gtgaccttc tgctggaggg agtgatggca gcacgggac aactgggacc cacttgcctc     600
tcatccctcc tggggcagct ttctggacag gtccgtctcc tccttggggc cctgcagagc   660
ctccttggaa cccagcttcc tccacagggc aggaccacag ctcacaagga tcccaatgcc   720
atcttcctga gcttccaaca cctgctccga ggaaaggtgc gtttcctgat gcttgtagga   780
gggtccaccc tctgcgtcag gcgggcccca cccaccacag ctgtccccag cagaacctct   840
ctagtcctca cactgaacga gctcccaaac aggacttctg gattgttgga gacaaacttc   900
actgcctcag ccagaactac tggctctggg cttctgaagt ggcagcaggg attcagagcc   960
aagattcctg gtctgctgaa ccaaacctcc aggtccctgg accaaatccc cggatacctg  1020
aacaggatac acgaactctt gaatggaact cgtggactct ttcctggacc ctcacgcagg  1080 acccctaggag ccccggacat ttcctcagga acatcagaca caggctccct gccacccaac 1140
ctccagcctg gatattctcc ttccccaacc catcctccta ctggacagta tacgctcttc  1200
cctcttccac ccaccttgcc caccctgtg gtccagctcc accccctgct tcctgaccct   1260
tctgctccaa cgcccacccc taccagccct cttctaaaca catcctacac ccactcccag  1320
aatctgtctc aggaagggta aggttctcag acactgccga catcagcatt gtctcgtgta  1380
cagctcccct ccctgcaggg cgcccctggg agacaactgg acaagatttc ctactttctc  1440
ctgaaaccca aagccctggt aaagggata cacaggactg aaaagggaat cattttcac    1500 tgtacattat aaaccttcag aagctatttt tttaagctat cagcaatact catcagagca  1560
gctagctctt tggtctattt tctgcagaaa tttgcaactc actgattctc tacatgctct  1620
ttttctgtga taactctgca aaggcctggg ctggcctggc agttgaacag agggagagac  1680
taaccttgag tcagaaaaca gagaaagggt aatttccttt gcttcaaatt caaggccttc  1740
caacgccccc atccccttta ctatcattct cagtgggact ctgatcccat attcttaaca  1800
gatctttact cttgagaaat gaataagctt tctctcagaa atgctgtccc tatacactag  1860
acaaaactga gcctgtataa ggaataaatg ggagcgccga aaagctccct aaaaagcaaa  1920
``` aaa                                                                    1923

<210> SEQ ID NO 232
<211> LENGTH: 14000
<212> TYPE: DNA
<213> ORGANISM: Homo sapien

<400> SEQUENCE: 232

```
ggtgtgatgg gcaatagcaa gaggccaaga caggtggcag cgagagccag atccccactc    60
acctgggctg agacattggc ctgaagttct cgcagtagct gccctggtg tagaatctgg    120
agcctcaagg gaacctgggt tagtcctgca aggccgcaca tgtgggcctt tctgagacag   180
gtgctctccc taaccttctc acgtgttttg cccccatccc acttaccccc actcctgggt   240
tccagcagcc ctcggaagag cagcaaaaaa tgcaaggagt cctctgtgtc actgagagtg   300
agcagggtga tgcccctac gccctgctgt gggggcctt ctagagtcag gatggcactg     360
aaggtctctg gggaagggac gatgatgaga gcccgtcaga aaccctcccc ccctttcctg   420
ggtgatagag aagactcaga acttcacgcc cggggctctt tgctccctac ctgcagccag   480
ggcccggtgc cggatgagag gcccccagac ctcccctgaa gggtgagtga gtgtcacaag   540
tgccacatgc agctgttctg ccctaaggag ccgcagagac aaccgaggca ctgcccgcca   600
cacccccacag acctggagca gagagacaag aaggccctac gctcagacac tgtgcaggct   660
aggccaatta ggatgcccag gcagggctta tgaaaaagga acatggaaag gaacctccag   720
ggtgccctag gaagcttaag aaagaacgct ggagccagat gcttgggttc caatcctggc   780
tgcaccactt actagctgtg tgaccttgaa caaatcacat tatcctactg agcctcagtt   840
ccccttctg taaatgggc atcataatgt cagtgccttc ctcccactgg gctgtggtga     900
ggaccacggg aggcaatgca gagcatgctc tcggcacagt gcccagactg gcaagtgct    960
cataaatggc atcatctcac caggccatct tgggtggggg ctgcagggtg ctcaaacagg  1020
acactgccat tggagtctga gaagcggatc ctggtagggc ggtccagcct gggaatgaga  1080
ggtcgggtga ggccggactg agccaaaagc agccctccc agctctccca gtttccctcc   1140
cgggcccgg cagctgaccc ctccttgctc cttcccttt ctcaccgcct gtaggagata    1200
gagaagcgga ggctagagcg cagcagcgag actcgggctc gtgccaccgc ctgcgacctc  1260
ggccctgtca gcagcgccac gaagtctggg acgggaggaa gatggcctga gcactgtcaa  1320
acgccgcttt ggtggcccag cctcaaccac aaccccgctg ttcgccagcc cctacccgt   1380
gtggccgtca ccacgggccc gctcctcagc gcctggctcc ccgcggtcgc tataactgcg  1440
atgctccggg tcccgcggat actcgaagga caggccgctc ggctgccgct ccgaactgct  1500
gcgctctgcg ggcgggggg taagaacacg gcttcagct ggccatggga aaggccagtc    1560
cgacgcccca tccaagtggc ccgggaccta gtatcgtggc cctgcctccc tccccgcagg  1620
gcggagcaag acttaccctg ggggcaggtc tggcagcagt gtcccggcag ctggcgcggc  1680
tgcccacagg ccggggttgg gcactctggt ttgatgttct tgcagctgac cctgccaggg  1740
cccctggtac ggcgacccca ctgaggctgc tcccggaaaa ggcgggaaac ccaagtgagt  1800
gcaagatgcc aactgatgag accccccag gcaaggatgt cccgcagagt cagccagctc   1860
tgccacttac aagctgcgtg acccagaca agctacttca tctctctggg cctcaaggtc  1920
cctgtctgga aaatgggat aataatactc tctatctagc aaggctgcca tgagagttag   1980
atgagcaggg aacgaaacgg agttggcaca gagcctcaca cagagtgggc gatcagtaac  2040
```

| | |
|---|---|
| agcacctaag aattggaggg gctgattccc cttcctccac cagaaaaata tccccaacat | 2100 |
| ctgccgactg ggctccttct cagcagctcc gagtccactc cgacgcccgc gcgacccggc | 2160 |
| gctccccacc cgccagggcc cgggccggcc gcggggtgca ctcaccgcct cgcaggcgca | 2220 |
| cagcacgcag cgcatcaccc cgaatggctc ccctaggtcc gggtgccacg tctcgtccaa | 2280 |
| ggcatagacc ttcccgccga aggtgcagcc tgcggggacg ggcttggctg gaggccgctg | 2340 |
| cccagctcgc gccgtgtgcc gccccggggg ctgcccgcgg gtcccgggtc ccaggcaccg | 2400 |
| cgcccttctg cccccgccca ccctccgggc cgcccgccgc gccgagccac ctgcgccccg | 2460 |
| cgcccccctcc gggctggcgc tgactcgccc cgagcccgac tccccgcccg cgcctccccc | 2520 |
| gggcgcccac ctacctgccg ctccccgaac gggcagcggc tccttctcag aacggatggg | 2580 |
| cagcacgggg ggctctgggc cggcgccgcg ggccggccgg gagccgagca gcagcagccc | 2640 |
| gaggagcagc agcggggccg gcggggccgg gaggctcggc atgacgcgaa cgggacagct | 2700 |
| ggggaggagg gagggaggag ggcgcgggag cgggcggagg gagggaggcg ggagtgcgga | 2760 |
| gggcggaggg ccgggccggg ggcggtgcgg cgggagggg ccggggccgg ggccggggcc | 2820 |
| ggggcagtgc cgcgagggc tcgtcgggcg gccgcagagt cggcgccggg ccgggcgggg | 2880 |
| cgggaggagc ggccgggagg agcgcgggcg ggcgggcgct gacccgggcc gtacgcggct | 2940 |
| ctactgcccc gggcgccggc tccggcccgt tttatgcccc gcgcccgacg ccccggccgg | 3000 |
| gggcctcctc ctcagcaaac ggggcggcgg cggcagctcg gcgaggggcc gggctgagcc | 3060 |
| cggggggtcc gacccagcag cagcggcccg gatcgcgggt gggggagggg agggaggggc | 3120 |
| tgggaccggg caggggagga gggaggggcg ggaggggaag ggggagcggg ggaggggag | 3180 |
| gggagggacc aggggggcgcg aagaggggga ggagaggcgg gcccggagcc ccccgctgct | 3240 |
| ggcggccaca gggcggctgg accaggaggt cggtgtccag cccaggaagg gagcctcagg | 3300 |
| ctagggaggg gcagaggcta ggcctgaggc ctggaccgct ctgtgagcga ggacccggtt | 3360 |
| ccgcccgaag gatgaagact tgtctttaaa gatgacaacg tacaggaaag gtccatcagc | 3420 |
| cgatctcccc ctgcctgggc ccacagcgcc ccccaaaccc tcaccaccct ctctcactgc | 3480 |
| ctagcctgcc tccctacctt ctctctgagg tcgctcctca ttcttgtgtt acccaggaca | 3540 |
| gggacctagc cagaaaccgg cagcattccc ccttctgtgg agtgacagta tctccctctc | 3600 |
| attgtaactt atcctcaggc gcattcgaca gtcccctctt gctttctcac ccccttcctt | 3660 |
| cacccaaggg accctctgcc tctccagccc actcccagcc tccttctct tggttccctg | 3720 |
| gtcatgcctg cctccctgtc tcctgtctct ccctcccaca cacacccact atcctcccag | 3780 |
| ctatcccagc accctccttc ctaatcttgg gagacatctc gtctggctgg acgggaaaat | 3840 |
| tccaggatct aggccacact tctcagcaga catgcccatc cttggggagg aggaacagga | 3900 |
| gagagcctga ggaagttctg ggggacaggg ggatgatggg atcaaggtca ggccaggaag | 3960 |
| cccctgagga cagagactgt ggggagactg ggactgggaa gaaagcaaag gagctagagc | 4020 |
| cagggccaaa ggaaaagggg ggccagcagg gaggtatttg cggggaggt ccagcagctg | 4080 |
| tctttcctaa gacagggaca catgggcctg gttattcctc ttgtcacatg tggaacggta | 4140 |
| ggagatggaa gacggagaca gaacaagcaa aggagggccc tgggcacaga ggtctgtgtg | 4200 |
| tgtagccatc taagccactg gaccccagca gacgagcacc taagctcagg cttaacccag | 4260 |
| tgcacgtgtg cgcacataca tgtgcccccgc acctgacagt ccactcaacc cgtccaaacc | 4320 |
| cttttccccat aacaccaacc cataacagga gatttctctc atgtgggcaa tatccgtgtt | 4380 |
| cccacttcga aagggggaat gacaagatag gactccctag gggattacag aaagaaaagc | 4440 |

```
aggaaagcaa gcatcctgtt ggatttcagc agcaggtatg atgtccaggg aaaagaaatt    4500
tggatagcca gggagtgaaa accccaccaa tcttaaacaa gacctctgtg cttcttcccc    4560
agcaacacaa atgtcctgcc agattcctcc tggaaaaaaa cttctgctcc tgtcccctc     4620 caggtcccag gttgcccatg tccaggaaaa gatggatccc cctatccaaa tcttctccgt    4680
ggtgtgtgtg ggtggaggag tggaccctgg tccaggcagg ggctccaggg aagagaaggc    4740
gtcacttccg ggggccttca ccagtgtctg gtggctccct tctctgattg ggcagaagtg    4800
gcccaggcag gcgtatgacc tgctgctgtg gaggggctgt gccccaccgc cacatgtctt    4860
cctacccatc tgctcccag agggctgcct gctgtgcact tgggtcctgg agcccttctc     4920
cacccggtga gtggccagca gggtgtgggg ttatgtgagg gtagaaagga cagcaaagag    4980
aaatgggctc ccagctgggg gaggggcagg caaactggaa cctacaggca ctgacctttg    5040
tcgagaagag tgtagccttc ccagaatggg aggagcaggg cagagcaggg gtaggggtg     5100 gggtgctggt ttctgaggga ctgatcactt acttggtgga atacagcaca gccctggctg    5160
gccctaagga aggggacat gagcccaggg agaaaataag agagggagct gcacttaggg     5220
cttagcaaac acagtagtaa gatggacaca gccccaatcc ccattcttag ctggtcattc    5280
ctcgttagct taaggttctg aatctggtgc tggggaagct gggccaggca agccagggcg    5340
caaggagagg gtaatgggag gagggcccac tcatgttgac agacctacag gaaatcccaa    5400
tattgaatca ggtgcaagcc tctttgcaca acttgtgaaa ggaggaggaa gccatgtggg    5460
gggtcctgtg aaggaaccgg aaggggttct gccaaggggg cagggaggca ggtgtgagct    5520
atgagacaga tatgttagtg ggcgcctaag acaaggtaag cccctaaggt gggcatcacc    5580
cagcaggtgc ccgttcctgg gcagctggtc tcaggaagga agtcccagaa ctgttagccc    5640
atctcttggc ctcagataat ggagtatttc aggacttgga gtccagagaa aagctccagt    5700
ggctttatgt gtgggggtag ataggaaag aatagaggtt aatttctccc ataccgcctt     5760
ttaatcctga cctctagtgg tcccagttac agctttgtgc agttcccctc cccagcccca    5820
ctccccaccg cagaagttac ccctcaacat attgcgcccg tttgccagtt cctcacccag    5880
gccctgcatc ccatttttcca ctctcttctc caggctgaag ccacaatact ttccttctct   5940
atccccatcc cagattttct ctgacctaac aaccaaggtt gctcagaatt taaggctaat    6000
taagatatgt gtgtatacat atcatgtcct gctgctctca gcaggggtag gtggcaccaa    6060
atccatgtcc gattcactga ggagtcctga caaaaggag acaccatatg ctttcttgct     6120
ttctttcttt cttctttct ttctttttt ttttgagac ggagtttcac tcttattgcc       6180
caggctggag tgcaatggtg cgatctcggc tcaccacaac ctccgcctcc caggtacaag    6240
cgattctcct gtctcagcct cccaagtagc ttggattaca ggcatgaacc accacaccct    6300
gctagttttt ttgtatttcg tagagccggg gtttcaccat gttagtgagg ctggtggcga    6360
actcctgacc tcaggtgatc cacccgcctt ggactcccaa agtgctggga ttacaggcat    6420
gagccactgc acccggcaca ccatatgctt tcatcacaag aaaatgtgag agaattcagg    6480
gctttggcag ttccaggctg gtcagcatct caagccctcc ccagcatctg ttcaccctgc    6540
caggcagtct cttcctagaa acttggttaa atgttcactc ttcttgctac tttcaggata    6600
gattcttcac ccttggcccg cctttgcccc accctactct gcccagaagt gcaagagcct    6660
aagccgcctc catggcccca ggaaggattc aggggagagg cccaaacag ggagccacgc     6720 cagccagaca ccccggccag aatggagctg actggtgaga acacacctga ggggctaggg    6780
```

```
ccatatggaa acatgacaga aggggagaga gaaaggagac acgctgcagg gggcaggaag    6840
ctgggggaac ccattctccc aaaaataagg ggtctgaggg gtggattccc tgggtttcag    6900
gtctgggtcc tgaatgggaa ttcctggaat accagctgac aatgatttcc tcctcatctt    6960
tcaacctcac ctctcctcat ctaagaattg ctcctcgtgg tcatgcttct cctaactgca    7020
aggctaacgc tgtccagccc ggctcctcct gcttgtgacc tccgagtcct cagtaaactg    7080
cttcgtgact cccatgtcct tcacagcaga ctggtgagaa ctcccaacat tatcccnttt    7140
atccgcgtaa ctggtaagac acccatactc ccaggaagac accatcactt cctctaactc    7200
cttgacccaa tgactattct tcccatattg tccccaccta ctgatcacac tctctgacaa    7260
ggattattct tcacaataca gcccgcattt aaaagctctc gtctagagat agtactcatg    7320
gaggactagc ctgcttatta ggctaccata gctctctcta tttcagctcc cttctccccc    7380
caccaatctt tttcaacaga gccagtgccc agaggttcac cctttgccta cacctgtcct    7440
gctgcctgct gtggacttta gcttgggaga atggaaaacc cagatggtaa gaaagccatc    7500
cctaaccttg gcttccctaa gtcctgtctt cagtttccca ctgcttccca tggattctcc    7560
aacattcttg agcttttaa aaatatctca ccttcagctt ggccacccta acccaatcta    7620
cattcaccta tgatgatagc ctgtggataa gatgatggct tgcaggtcca atatgtgaat    7680
agatttgaag ctgaacacca tgaaaagctg gagagaaatc gctcatggcc atgcctttga    7740
cctattcccg ttcagtcttc ttaaattggc atgaagaagc aagactcata tgtcatccac    7800
agatgacaca aagctgggaa gtaccactaa aataacaaaa gactgaatca agattcaaat    7860
cactgaaaga ctaggtcaaa aacaaggtga aacaacagag atataaactt ctacatgtgg    7920
gccgggggct cacgcctgta atcccagcac tttgggaggc cgaggcaggc agatcacctg    7980
agggcaggag tttgagagca gcctggccaa catggcgaaa ccccgtctct actaagaata    8040
cagaattagc cgggcatggt agtgcatgcc tgtaatccca gctacttgga aggctgaagc    8100
aggagaatcc cttgaaccca ggaggtggag gttgtagtga gctgagatca tgccaatgca    8160
ctccagcctg ggtgacaaga gcaaaactcc gtctcaaaaa gaaaaaaaaa ttctacatgt    8220
gtaaattaat gagtaaagtc ctattccagc tttcaggcca caatgccctg cttccatcat    8280
ttaagcctct ggccctagca cttcctacga aaaggatctg agagaattaa attgcccca    8340 aacttaccat gtaacattac tgaagctgct attcttaaag ctagtaattc ttgtctgttt    8400
gatgtttagc atccccattg tggaaatgct cgtacagaac tctattccga gtggactaca    8460
cttaaatata ctggcctgaa caccggacat cccctgaag acatatgcta atttattaag    8520
agggaccata ttaaactaac atgtgtctag aaagcagcag cctgaacaga aagagactag    8580
aagcatgttt tatgggcaat agtttaaaaa actaaaatct atcctcaaga acccagcgt    8640 cccttcttcc ttcaggactg agtcagggaa gaagggcagt tcctatgggt cccttctagt    8700
cctttctttt catccttatg atcattatgg tagagtctca tacctacatt tagtttattt    8760
attattatta tttgagacgg agtctcactc tatcccccag gctggagtgc agtggcatga    8820
tctcaactca ctgcaacctc agcctcccgg attcaagcga ttctcctgcc tcagtctccc    8880
aagtagctgg gattacaggt gcccaccacc atgcccagct aattttttgta ttttttggtag    8940 agatgggtt tcaccatgtt ggccaggctg atcttgaact cctgacctca ggtgatccac    9000
ctgcctcagc ctcccaaagt gctgggatta caggcgtgag ccactgcacc cagccttcat    9060
tcagtttaaa aatcaaatga tcctaaggtt ttgcagcaga aagagtaaat ttgcagcact    9120
agaaccaaga ggtaaaagct gtaacagggc agatttcagc aacgtaagaa aaaaggagct    9180
```

```
cttctcactg aaaccaagtg taagaccagg ctggactaga ggacacggga gtttttgaag    9240
cagaggctga tgaccagctg tcgggagact gtgaaggaat tcctgccctg ggtgggacct    9300
tggtcctgtc cagttctcag cctgtatgat tcactctgct ggctactcct aaggctcccc    9360
acccgctttt agtgtgccct ttgaggcagt gcgcttctct cttccatctc tttctcagga    9420
ggagaccaag gcacaggaca ttctgggagc agtgacccct ctgctggagg gagtgatggc    9480
agcacgggga caactgggac ccacttgcct ctcatccctc ctggggcagc tttctggaca    9540
ggtccgtctc ctccttgggg ccctgcagag cctccttgga acccaggtaa gtccccagtc    9600
aagggatctg tagaaactgt tcttttctga ctcagtcccc ctagaagacc tgagggaaga    9660
agggctcttc cagggagctc aagggcagaa gagctgatct actaagagtg ctccctgcca    9720
gccacaatgc ctgggtactg gcatcctgtc tttcctactt agacaaggga ggcctgagat    9780
ctggccctgg tgtttggcct caggaccatc ctctgccctc agcttcctcc acagggcagg    9840
accacagctc acaaggatcc caatgccatc ttcctgagct ccaacacct gctccgagga    9900
aaggtgcgtt tcctgatgct tgtaggaggg tccaccctct gcgtcaggcg ggccccaccc    9960
accacagctg tccccagcag aacctctcta gtcctcacac tgaacgagct cccaaacagg   10020
acttctggat tgttggagac aaacttcact gcctcagcca gaactactgg ctctgggctt   10080
ctgaagtggc agcagggatt cagagccaag attcctggtc tgctgaacca aacctccagg   10140
tccctggacc aaatccccgg atacctgaac aggatacacg aactcttgaa tggaactcgt   10200
ggactctttc ctggaccctc acgcaggacc ctaggagccc cggacatttc tcaggaaca    10260
tcagacacag gctccctgcc acccaacctc cagcctggat attctccttc cccaacccat   10320
cctcctactg gacagtatac gctcttccct cttccaccca ccttgcccac ccctgtggtc   10380
cagctccacc ccctgcttcc tgaccttct gctccaacgc ccaccctac cagccctctt    10440
ctaaacacat cctacaccca ctcccagaat ctgtctcagg aagggtaagg ttctcagaca   10500
ctgccgacat cagcattgtc tcgtgtacag ctcccttccc tgcagggcgc ccctgggaga   10560
caactggaca agatttccta ctttctcctg aaacccaaag ccctggtaaa agggatacac   10620
aggactgaaa agggaatcat ttttcactgt acattataaa ccttcagaag ctatttttttt  10680
aagctatcag caatactcat cagagcagct agctctttgg tctattttct gcagaaattt   10740
gcaactcact gattctctac atgctctttt tctgtgataa ctctgcaaag gcctgggctg   10800
gcctggcagt tgaacagagg gagagactaa ccttgagtca gaaaacagag aaagggtaat   10860
ttcctttgct tcaaattcaa ggccttccaa cgccccatc cccttactaa tcattctcag    10920
tgggactctg atcccatatt cttaacagat ctttactctt gagaaatgaa taagctttct   10980
ctcagaaatg ctgtccctat acactagaca aaactgagcc tgtataagga ataaatggga   11040
gcgccgaaaa gctccctaaa aagcaaggga aagatgttct tcgagggtgg caatagatcc   11100
ccctcacccct gccacccccaa acaaaaaagc taacaggaag ccttggagag cctcacaccc   11160
caggtaaggc tgtgtagaca gttcagtaaa gacaggacct ggatgtgaca gctgagcaaa   11220
cagctagagc tttggcagct cagcaggagg ctttgccagg catggacgcc tgcctccctc   11280
ctgtggaggt caggaggaag tgcaggaagt ggcatgagtc aggctccttg agctcacaca   11340
gcaggagaac aagtacaagt caagtacaag ttgaaggctc atttcccagt tcccgcaaat   11400
gcatctaaaa agcagctctg tgtgaccacc ataaactctg ctaggggatc tctaaaaagg   11460
agtcaggctt atggggcttt gcaaataagt gctgccttgg tgctcaggaa aaggtttgtg   11520
```

```
ttgcacaaaa acacaaattc cactgcaaaa atcaacctgc tacctccaga ggttcctgta    11580
ggaaaactag tggaagcttc ttcctctccc cgacccctga ggaaggaaag gctaccacgg    11640
aggtagagga gccaggaacc cagaaaccca aacactgcca caaatacccc agggtcacca    11700
aaggcattcc aaagcagcag aatgaaaggc aatgtgctag gaacctcgtg tactttacct    11760
tttgtaacat tcacacaact ctgtaaggta ggtattatct tttctgtttt agagatgagg    11820
aaactgaggc tcagagaagc caggtgagtt atcagtggtt acacgccctg tgggcaggag    11880
aagaaacacc ctagtctgac ctcactctag ggtccatact ctctccagtg tggtacactg    11940
tcctatatgt catttaatga ttctgtttac tgggaaagac atacaagtcc ttaaggagta    12000
acagttagag ttttgaggcc gggcgcggtg gctcacgcct gtaatcccag cactttggga    12060
ggccaaggca ggcggatcac aaggtcagga gatcaaggcc atcctggcca acacggtgaa    12120
accctgcctt tactaaaaat atgaaaaatt agccgagtgt ggtggcaagc gcctgtagtc    12180
ttgaacccgg gagatggagg ttgcagtgag ccaagatcgc gccactgcac tccagcctgg    12240
gcaacagagt gagactccat ctcaaaaaaa aaaagagtt ctgagtagaa aaccaaagtt    12300
cttagtggag gtgaccaatt tagacatctt cccatgtccc tctctcсcctt cacggacaga    12360 atagttttcc tagagaagga atcaacaaat gcacaaagct caaaaatgtt gtccaaatct    12420
caaatgctgt cagtttctgc atggaagaga agtagttcat tcatactaca aattccagca    12480
tgcagtcaag ggaatgttaa gtggaaacta acttactgac atattgagct gggttaaatt    12540
taataatcaa atgaaacact ttatagcaca tgaaagtgcc agcacctagg acacgataca    12600
ccaatagaac cagagaatga tggttccca gcacagacag atgagagaca agaatggcaa    12660
aactttaggg ccaggtatgg tggctcacac ccagcacttt gggaggccga ggcaggcgga    12720
tcacctgagg tcgggagttc gagaccagcc tgaccaacat ggagaaactc catctctact    12780
aaaaaataca aaattagctg gcatggtgg tgcatcacct gaggttggga gtttgagact    12840
ggcctgacca acatggagaa acctcgtctc tactaaaaat acaaaattag ctgagcatgg    12900
tggcacatgc ctgtaatccc agctactcgg aaggctgggg caggagaatc gcttgaaccc    12960
gggaggcaga agttgtggtg agccgagatc gcgccattgc actccagcct ggacaacaag    13020
agcgaaactc catttcaaaa aaaagaaaaa aagaaataga atgtcaaaac tgcaaatgtc    13080
accagaaact tccaggcatc tggtattggt atgtgactta ctccacttgt gggcaaatgc    13140
gagtaactca tgggcttctc cagtgtgaac ttacctgccc tattacaaat ctaacccatt    13200
cccaaatcag tctggttggt cccatccctt cttcccacta acacaaaaaa acaattacaa    13260
ccagaacact cctatcccta ttcaatgctc taccagttct cttcttctg ctaccccaag    13320 accgccagga cagtctatga taacctacac actattactt gtaattcgtt tgtctcactc    13380
tcatttgtcg ttctccaacc ccacaaaaaa acccacccca tggaaaggtt ctaggatttc    13440
ataaaaattc atcccaactc cctcccccta ctctacccat agtaaggtaa aagaaacacc    13500
tcttcctcct ccctgctgag gccattcatt ttcaacccat ttccctaaat actatttcta    13560
acacctcaca tgaagatccg aaaatgatgg ggaaggaaat accccaggta tcccagcagg    13620
ggaccagctc ccaggcaaaa ccagatcaaa cagacaactg tttaatgcac agagaatctt    13680
tttggattgt taccctaaac ttcctagggg aaaacagaac cccatatgct ttcctagaga    13740
cctctaatgc caagctgaag agccagctca catgctggag cccttatcat agccatttcc    13800
ttaatgtttt ttcttcccct actcataagt tagtgactgt agtcaggccg ctacatggtc    13860
ctggcactgg ccctggctct ggcctgccaa cttcattggt attgctgccc tgtccacttc    13920
```

```
cacttaccct ccctcccagg tcaccactgg aatgtagagc agagagccag ctcctccagc    13980
tgcttccaga accaccaagt                                                14000
```

METHODS FOR SAFELY REDUCING THROMBOPOIETIN

CROSS-REFERENCE TO RELATED APPLICATIONS

This patent application is a national stage filing under 35 U.S.C. 371 of International Patent Application No. PCT/US2019/042033, filed Jul. 16, 2019, which claims priority to U.S. Provisional Patent Application No. 62/699,487, filed Jul. 17, 2018, the contents of all of which are hereby incorporated by reference. Priority to these applications is hereby claimed.

STATEMENT OF GOVERNMENT SUPPORT

This invention was made with government support under R44 HL117589 and R44 HL095315 awarded by the National Institute of Health. The government has certain rights in the invention.

SEQUENCE LISTING

The present application is being filed along with a Sequence Listing in electronic format. The Sequence Listing is provided as a file entitled BIOL0339USASEQ_ST25.txt created on Jan. 13, 2021 which is 84 KB in size. The information in the electronic format of the sequence listing is incorporated herein by reference in its entirety.

FIELD

Provided herein are methods, compounds, and compositions useful for safely reducing the amount and activity of thrombopoietin (hereinafter TPO) in an individual. In general, the individual is affected by a disease or condition that would benefit from platelet count reduction. Non-limiting examples of diseases and conditions that may be treated with the methods, compounds, and compositions provided herein are certain cancers, cardiovascular conditions, autoimmune diseases, and metabolic disorders, and any other diseases in which TPO activity contributes to disease initiation or progression, and/or adversely affects disease outcome.

BACKGROUND

Platelets are produced from megakaryocytes found in bone marrow. Megakaryocytes undergo a process of fragmentation as they develop into giant cells. Thrombopoietin (TPO), the product of the myeloproliferative leukemia virus oncogene, promotes megakaryocyte development and is the ligand of the thrombopoietin receptor (MPL). Upon binding of TPO to MPL on megakaryocytes, several intracellular signaling proteins become tyrosine phosphorylated, which stimulates platelet production from the megakaryocytes.

Platelets have an established role in cancer progression and metastasis. It has been reported that cancer patients frequently have thrombocytosis, which has been characterized as a platelet count greater than 450,000 per cubic milliliter. Some tumors can activate blood through contact activation and tissue factor expression, resulting in thrombin generation, blood coagulation, and platelet activation. Activated platelets release biologically active molecules (e.g., PDGF) that can support cancer cell survival and proliferation. Platelets can also promote cancer progression by adhering to the surface of cancer cells and protecting them from immune surveillance. Furthermore, platelets can promote metastasis by facilitating endothelium adherence and protecting them from shear forces during invasion.

SUMMARY

Provided herein are compositions, compounds and methods for safely reducing a TPO RNA. In general, compositions, compounds and methods disclosed herein are capable of safely reducing TPO protein, and consequently TPO protein activity, in an individual in need thereof. TPO activity is a key component of platelet production. Many diseases and conditions, including, but not limited to, cancers, cardiovascular conditions, and autoimmune diseases, are promoted by platelet activity and individuals with these diseases or conditions could benefit from platelet count reduction.

In certain embodiments, compositions, compounds and methods disclosed herein comprise a TPO inhibitor or a use thereof. In certain embodiments, these compositions, compounds and methods are useful for treating or preventing diseases or conditions in which TPO or activation of platelets is associated with disease initiation, disease progression, and/or poor disease outcome. In certain embodiments, these compositions, compounds and methods are useful for treating or preventing diseases or conditions in which TPO or activation of platelets is related to disease initiation, disease progression, and/or poor disease outcome. In certain embodiments, these compositions, compounds and methods are useful for treating or preventing diseases or conditions in which TPO or activation of platelets contributes to and promotes disease initiation or progression, and/or adversely affects disease outcome. In certain embodiments, these compositions, compounds and methods safely inhibit the expression of TPO in individuals having or at risk of having a disease or condition wherein platelet activity contributes to the development and/or progression of the disease or condition. In certain embodiments, these compositions, compounds and methods are useful for treating or preventing diseases or conditions in which TPO or activation of platelets is associated with disease initiation, disease progression, and/or poor disease outcome. In certain embodiments, these compositions, compounds and methods safely inhibit the expression of TPO in individuals having or at risk of having a disease or condition wherein platelet activity is associated with the development and/or progression of the disease or condition. In certain embodiments, the disease or condition is cancer. In certain embodiments, the disease is a cardiovascular disease. In certain embodiments, the cardiovascular disease comprises a condition selected from thrombocytosis, essential thrombocythemia, thrombosis, arterial thrombosis, venous thrombosis, stroke, atherothrombosis, atherosclerosis, and a combination thereof. In certain embodiments, the disease or condition comprises inflammation. In certain embodiments, the disease or condition is vascular dementia. In certain embodiments, the disease or condition is asthma. In certain embodiments, the disease or condition is an autoimmune disease. In certain embodiments, the autoimmune disease is selected from lupus, systemic lupus erythematosus, arthritis, and psoriasis. In certain embodiments, the disease or condition is a metabolic condition. In certain embodiments, the metabolic condition is selected from diabetes, hyperglycemia, hyperinsulinemia, hypercholesterolemia, hypertriglyceridemia, hypertension, hyperlipidemia, obesity, and a combination thereof.

In general, TPO inhibitors disclosed herein are TPO-specific inhibitors. In certain embodiments, TPO-specific inhibitors safely decrease expression or activity of TPO.

TPO-specific inhibitors may also be referred to herein as a "safe TPO-specific inhibitor"; these terms may be used interchangeably. In certain embodiments, safe TPO-specific inhibitors include nucleic acids, proteins and small molecules. In certain embodiments, the safe TPO-specific inhibitor is a nucleic acid. In certain embodiments, the safe TPO-specific inhibitor comprises a modified oligonucleotide. In certain embodiments, the safe TPO-specific inhibitor consists essentially of a modified oligonucleotide. In certain embodiments, the modified oligonucleotide is a single stranded oligonucleotide. In certain embodiments, the modified oligonucleotide is a double stranded compound.

In certain embodiments, methods comprise administering a compound or composition disclosed herein to an individual in need thereof, wherein the individual has a platelet count equal to or greater than about 100,000/μL, about 120,000/μL, about 150,000/μL, about 200,000/μL, about 300,000/μL, 350,000/μL, about 400,000/μL, about 450,000/μL, or about 500,000/μL.

In certain embodiments, methods comprise administering a compound or composition disclosed herein to an individual in need thereof, thereby decreasing amount or activity of TPO in an individual. In certain embodiments, the platelet count of the individual is not reduced to less than about 25,000/μL, about 30,000/μL, about 35,000/μL, about 40,000/μL, about 45,000/μL, about 50,000/μL, about 55,000/μL, about 60,000/μL, about 65,000/μL, about 70,000/μL, about 75,000/μL, about 75,000/μL, about 80,000/μL, about 85,000/μL, about 90,000/μL, about 95,000/μL, about 100,000/μL, about 110,000/μL, about 120,000/μL, about 130,000/μL, about 140,000/μL, or about 150,000/μL. In some embodiments, TPO-specific inhibitors that safely decrease expression or activity of TPO may be administered to an individual without lowering their platelet count to less than 25,000/μL. In some embodiments, TPO-specific inhibitors that safely decrease expression or activity of TPO may be administered to an individual without lowering their platelet count to less than 50,000/μL. In some embodiments, TPO-specific inhibitors that safely decrease expression or activity of TPO may be administered to an individual without lowering their platelet count to less than about 100,000/μL.

In certain embodiments, methods comprise reducing an amount of a TPO RNA by at least about 10%, at least about 20%, at least about 30%, at least about 40%, at least about 50%, at least about 60%, at least about 70%, at least about 80%, or at least about 90%. In certain embodiments, methods comprise reducing an amount of the TPO RNA by less than about 20%, less than about 30%, less than about 40%, less than about 50%, less than about 60%, less than about 70%, less than about 80%, less than about 90%, or less than 95%. In certain embodiments, methods comprise reducing an amount of a TPO RNA by about 10% to about 20%, about 20% to about 30%, about 30% to about 40%, about 40% to about 50%, about 50% to about 60%, about 60% to about 70%, about 70% to about 80%, or about 80% to about 90%. In certain embodiments, the amount of the TPO RNA is a relative amount of the TPO RNA in a blood sample of the individual. In certain embodiments, the amount of the TPO RNA is a relative amount of the TPO RNA in a plasma sample of the individual. In certain embodiments, the amount of the TPO RNA is a relative amount of the TPO RNA in the liver of the individual. In certain embodiments, the TPO RNA is a TPO mRNA. In certain embodiments, the TPO RNA is a pre-mRNA. In certain embodiments, the TPO RNA is a combination of pre-mRNA and mRNA.

In certain embodiments, methods comprise reducing an amount of a TPO protein by at least about 10%, at least about 20%, at least about 30%, at least about 40%, at least about 50%, at least about 60%, at least about 70%, at least about 80%, or at least about 90%. In certain embodiments, methods comprise reducing an amount of the TPO protein by less than about 20%, less than about 30%, less than about 40%, less than about 50%, less than about 60%, less than about 70%, less than about 80%, less than about 90%, or less than 95%. In certain embodiments, methods comprise reducing an amount of a TPO protein by about 10% to about 20%, about 20% to about 30%, about 30% to about 40%, about 40% to about 50%, about 50% to about 60%, about 60% to about 70%, about 70% to about 80%, or about 80% to about 90%. In certain embodiments, the amount of the TPO protein is a relative amount of the TPO protein in a blood sample of the individual. In certain embodiments, the amount of the TPO protein is a relative amount of the TPO protein in a plasma sample of the individual. In certain embodiments, the amount of the TPO protein is a relative amount of the TPO protein in the liver of the individual.

Certain embodiments are directed to compounds useful for safely inhibiting TPO, which can be useful for treating, ameliorating, preventing or slowing progression of a disease or condition in a subject that can benefit from platelet count reduction. In some embodiments, the subject has a platelet count that is equal to or greater than about 100,000/μL, about 120,000/μL, about 150,000/μL, about 200,000/μL, about 250,000/μL, about 300,000/μL, about 350,000/μL, about 400,000/μL, or about 450,000/μL. Such diseases and conditions include, but not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. Certain embodiments are directed to compounds useful in reducing or inhibiting cancer cell proliferation, the number of primary tumors, individual tumor volume, total tumor volume, tumor growth, primary tumor intra-tumoral vessel density, primary tumor platelet deposition, and/or metastasis, or a combination thereof. In certain embodiments, the safe TPO-specific inhibitor is a safe antithrombotic agent that can be used to reduce the incidence or severity of thrombotic events in high risk individuals.

DETAILED DESCRIPTION

It is to be understood that both the foregoing general description and the following detailed description are exemplary and explanatory only and are not restrictive of the embodiments, as claimed. Herein, the use of the singular includes the plural unless specifically stated otherwise. As used herein, the use of "or" means "and/or" unless stated otherwise. Furthermore, the use of the term "including" as well as other forms, such as "includes" and "included," is not limiting.

The section headings used herein are for organizational purposes only and are not to be construed as limiting the subject matter described. All documents, or portions of documents, cited in this application, including, but not limited to, patents, patent applications, articles, books, treatises, and GenBank and NCBI reference sequence records are hereby expressly incorporated by reference for the portions of the document discussed herein, as well as in their entirety.

It is understood that the sequence set forth in each SEQ ID NO in the examples contained herein is independent of any modification to a sugar moiety, an internucleoside linkage, or a nucleobase. As such, compounds defined by a SEQ ID NO may comprise, independently, one or more modifications to a sugar moiety, an internucleoside linkage, or a nucleobase. Compounds described by ISIS/IONIS number (ISIS/ION #) indicate a combination of nucleobase sequence, chemical modification, and motif.

Unless otherwise indicated, the following terms have the following meanings:

"2'-deoxynucleoside" means a nucleoside comprising 2'-H(H) furanosyl sugar moiety, as found in naturally occurring deoxyribonucleic acids (DNA). In certain embodiments, a 2'-deoxynucleoside may comprise a modified nucleobase or may comprise an RNA nucleobase (uracil).

"2'-O-methoxyethyl" (also 2'-MOE and 2'-O(CH2)2-OCH3) refers to an O-methoxy-ethyl modification at the 2' position of a furanosyl ring. A 2'-O-methoxyethyl modified sugar is a modified sugar.

"2'-MOE nucleoside" (also 2'-O-methoxyethyl nucleoside) means a nucleoside comprising a 2'-MOE modified sugar moiety.

"2'-substituted nucleoside" or "2-modified nucleoside" means a nucleoside comprising a 2'-substituted or 2'-modified sugar moiety. As used herein, "2'-substituted" or "2-modified" in reference to a sugar moiety means a sugar moiety comprising at least one 2'-substituent group other than H or OH.

"3' target site" refers to the nucleotide of a target nucleic acid which is complementary to the 3'-most nucleotide of a particular compound.

"5' target site" refers to the nucleotide of a target nucleic acid which is complementary to the 5'-most nucleotide of a particular compound.

"5-methylcytosine" means a cytosine with a methyl group attached to the 5 position.

"About" means within ±10% of a value.

"Administration" or "administering" refers to routes of introducing a compound or composition provided herein to an individual to perform its intended function. An example of a route of administration that can be used includes, but is not limited to parenteral administration, such as subcutaneous, intravenous, or intramuscular injection or infusion.

"Administered concomitantly" or "co-administration" means administration of two or more compounds in any manner in which the pharmacological effects of both are manifest in the patient. Concomitant administration does not require that both compounds be administered in a single pharmaceutical composition, in the same dosage form, by the same route of administration, or at the same time. The effects of both compounds need not manifest themselves at the same time. The effects need only be overlapping for a period of time and need not be coextensive. Concomitant administration or co-administration encompasses administration in parallel or sequentially.

"Amelioration" refers to an improvement or lessening of at least one indicator, sign, or symptom of an associated disease, disorder, or condition. In certain embodiments, amelioration includes a delay or slowing in the progression or severity of one or more indicators of a condition or disease. The progression or severity of indicators may be determined by subjective or objective measures, which are known to those skilled in the art.

"Animal" refers to a human or non-human animal, including, but not limited to, mice, rats, rabbits, dogs, cats, pigs, and non-human primates, including, but not limited to, monkeys and chimpanzees.

"Antisense activity" means any detectable and/or measurable activity attributable to the hybridization of an antisense compound to its target nucleic acid. In certain embodiments, antisense activity is a decrease in the amount or expression of a target nucleic acid or protein encoded by such target nucleic acid compared to target nucleic acid levels or target protein levels in the absence of the antisense compound to the target.

"Antisense compound" means a compound comprising an oligonucleotide and optionally one or more additional features, such as a conjugate group or terminal group. Examples of antisense compounds include single-stranded and double-stranded compounds, such as, oligonucleotides, ribozymes, siRNAs, shRNAs, ssRNAs, and occupancy-based compounds.

"Antisense inhibition" means reduction of target nucleic acid levels in the presence of an antisense compound complementary to a target nucleic acid compared to target nucleic acid levels in the absence of the antisense compound.

"Antisense mechanisms" are all those mechanisms involving hybridization of a compound with target nucleic acid, wherein the outcome or effect of the hybridization is either target degradation or target occupancy with concomitant stalling of the cellular machinery involving, for example, transcription or splicing.

"Antisense oligonucleotide" means an oligonucleotide having a nucleobase sequence that is complementary to a target nucleic acid or region or segment thereof. In certain embodiments, an antisense oligonucleotide is specifically hybridizable to a target nucleic acid or region or segment thereof.

"Bicyclic nucleoside" or "BNA" means a nucleoside comprising a bicyclic sugar moiety. "Bicyclic sugar" or "bicyclic sugar moiety" means a modified sugar moiety comprising two rings, wherein the second ring is formed via a bridge connecting two of the atoms in the first ring thereby forming a bicyclic structure. In certain embodiments, the first ring of the bicyclic sugar moiety is a furanosyl moiety. In certain embodiments, the bicyclic sugar moiety does not comprise a furanosyl moiety.

"Branching group" means a group of atoms having at least 3 positions that are capable of forming covalent linkages to at least 3 groups. In certain embodiments, a branching group provides a plurality of reactive sites for connecting tethered ligands to an oligonucleotide via a conjugate linker and/or a cleavable moiety.

"Cell-targeting moiety" means a conjugate group or portion of a conjugate group that is capable of binding to a particular cell type or particular cell types.

"cEt" or "constrained ethyl" means a bicyclic furanosyl sugar moiety comprising a bridge connecting the 4'-carbon and the 2'-carbon, wherein the bridge has the formula: 4'-CH(CH$_3$)—O-2'.

"Chemical modification" in a compound describes the substitutions or changes through chemical reaction, of any of the units in the compound. "Modified nucleoside" means a nucleoside having, independently, a modified sugar moiety and/or modified nucleobase. "Modified oligonucleotide" means an oligonucleotide comprising at least one modified internucleoside linkage, a modified sugar, and/or a modified nucleobase.

"Chemically distinct region" refers to a region of a compound that is in some way chemically different than another region of the same compound. For example, a region having 2'-O-methoxyethyl nucleotides is chemically distinct from a region having nucleotides without 2'-O-methoxyethyl modifications.

"Chimeric antisense compounds" means antisense compounds that have at least 2 chemically distinct regions, each position having a plurality of subunits.

"Cleavable bond" means any chemical bond capable of being split. In certain embodiments, a cleavable bond is selected from among: an amide, a polyamide, an ester, an ether, one or both esters of a phosphodiester, a phosphate ester, a carbamate, a di-sulfide, or a peptide.

"Cleavable moiety" means a bond or group of atoms that is cleaved under physiological conditions, for example, inside a cell, an animal, or a human.

"Complementary" in reference to an oligonucleotide means the nucleobase sequence of such oligonucleotide or one or more regions thereof matches the nucleobase sequence of another oligonucleotide or nucleic acid or one or more regions thereof when the two nucleobase sequences are aligned in opposing directions. Nucleobase matches or complementary nucleobases, as described herein, are limited to the following pairs: adenine (A) and thymine (T), adenine (A) and uracil (U), cytosine (C) and guanine (G), and 5-methyl cytosine ($^m$C) and guanine (G) unless otherwise specified. Complementary oligonucleotides and/or nucleic acids need not have nucleobase complementarity at each nucleoside and may include one or more nucleobase mismatches. By contrast, "fully complementary" or "100% complementary" in reference to oligonucleotides means that such oligonucleotides have nucleobase matches at each nucleoside without any nucleobase mismatches.

"Conjugate group" means a group of atoms that is attached to an oligonucleotide. In certain embodiments, conjugate groups include a conjugate moiety and a conjugate linker that attaches the conjugate moiety to the oligonucleotide.

"Conjugate linker" means a group of atoms comprising at least one bond that connects a conjugate moiety to an oligonucleotide.

"Conjugate moiety" means a group of atoms that is attached to an oligonucleotide via a conjugate linker.

"Contiguous" in the context of an oligonucleotide refers to nucleosides, nucleobases, sugar moieties, or internucleoside linkages that are immediately adjacent to each other. For example, "contiguous nucleobases" means nucleobases that are immediately adjacent to each other in a sequence.

"Designing" or "designed to" refer to the process of designing a compound that specifically hybridizes with a selected nucleic acid molecule.

"Diluent" means an ingredient in a composition that lacks pharmacological activity, but is pharmaceutically necessary or desirable. For example, the diluent in an injected composition can be a liquid, e.g. saline solution.

"Differently modified" mean chemical modifications or chemical substituents that are different from one another, including absence of modifications. Thus, for example, a MOE nucleoside and an unmodified DNA nucleoside are "differently modified," even though the DNA nucleoside is unmodified. Likewise, DNA and RNA are "differently modified," even though both are naturally-occurring unmodified nucleosides. Nucleosides that are the same but for comprising different nucleobases are not differently modified. For example, a nucleoside comprising a 2'-OMe modified sugar and an unmodified adenine nucleobase and a nucleoside comprising a 2'-OMe modified sugar and an unmodified thymine nucleobase are not differently modified.

"Dose" means a specified quantity of a compound or pharmaceutical agent provided in a single administration, or in a specified time period. In certain embodiments, a dose may be administered in two or more boluses, tablets, or injections. For example, in certain embodiments, where subcutaneous administration is desired, the desired dose may require a volume not easily accommodated by a single injection. In such embodiments, two or more injections may be used to achieve the desired dose. In certain embodiments, a dose may be administered in two or more injections to minimize injection site reaction in an individual. In other embodiments, the compound or pharmaceutical agent is administered by infusion over an extended period of time or continuously. Doses may be stated as the amount of pharmaceutical agent per hour, day, week or month.

"Dosing regimen" is a combination of doses designed to achieve one or more desired effects.

"Double-stranded compound" means a compound comprising two oligomeric compounds that are complementary to each other and form a duplex, and wherein one of the two said oligomeric compounds comprises an oligonucleotide.

"TPO" means thrombopoietin and refers to any nucleic acid or protein encoded by the thrombopoietin gene (THPO), unless specified otherwise. For example, a "TPO RNA" means a pre-mRNA or mRNA transcribed from THPO A "TPO protein" means a protein translated from an RNA sequence transcribed from THPO. The target may be referred to in either upper or lower case.

"TPO-specific inhibitor" refers to any agent capable of specifically inhibiting TPO expression or activity at the molecular level. For example, TPO-specific inhibitors include nucleic acids (including antisense compounds), peptides, antibodies, small molecules, and other agents capable of reducing the amount or activity of TPO.

"Effective amount" means the amount of compound sufficient to effectuate a desired physiological outcome in an individual in need of the compound. The effective amount may vary among individuals depending on the health and physical condition of the individual to be treated, the taxonomic group of the individuals to be treated, the formulation of the composition, assessment of the individual's medical condition, and other relevant factors.

"Efficacy" means the ability to produce a desired effect.

"Expression" includes all the functions by which a gene's coded information is converted into structures present and operating in a cell. Such structures include, but are not limited to the products of transcription and translation.

"Gapmer" means an oligonucleotide comprising an internal region having a plurality of nucleosides that support RNase H cleavage positioned between external regions having one or more nucleosides, wherein the nucleosides comprising the internal region are chemically distinct from the nucleoside or nucleosides comprising the external regions. The internal region may be referred to as the "gap" and the external regions may be referred to as the "wings."

"Hybridization" means annealing of oligonucleotides and/or nucleic acids. While not limited to a particular mechanism, the most common mechanism of hybridization involves hydrogen bonding, which may be Watson-Crick, Hoogsteen or reversed Hoogsteen hydrogen bonding, between complementary nucleobases. In certain embodiments, complementary nucleic acid molecules include, but are not limited to, an antisense compound and a nucleic acid target. In certain embodiments, complementary nucleic acid molecules include, but are not limited to, an oligonucleotide and a nucleic acid target.

"Immediately adjacent" means there are no intervening elements between the immediately adjacent elements of the same kind (e.g. no intervening nucleobases between the immediately adjacent nucleobases).

"Individual" means a human or non-human animal selected for treatment or therapy.

"Inhibiting the expression or activity" refers to a reduction or blockade of the expression or activity relative to the expression of activity in an untreated or control sample and does not necessarily indicate a total elimination of expression or activity.

"Internucleoside linkage" means a group or bond that forms a covalent linkage between adjacent nucleosides in an oligonucleotide. "Modified internucleoside linkage" means any internucleoside linkage other than a naturally occurring, phosphate internucleoside linkage. Non-phosphate linkages are referred to herein as modified internucleoside linkages.

"Lengthened oligonucleotides" are those that have one or more additional nucleosides relative to an oligonucleotide disclosed herein, e.g. a parent oligonucleotide.

"Linked nucleosides" means adjacent nucleosides linked together by an internucleoside linkage.

"Mismatch" or "non-complementary" means a nucleobase of a first oligonucleotide that is not complementary to the corresponding nucleobase of a second oligonucleotide or target nucleic acid when the first and second oligonucleotides are aligned. For example, nucleobases including but not limited to a universal nucleobase, inosine, and hypoxanthine, are capable of hybridizing with at least one nucleobase but are still mismatched or non-complementary with respect to nucleobase to which it hybridized. As another example, a nucleobase of a first oligonucleotide that is not capable of hybridizing to the corresponding nucleobase of a second oligonucleotide or target nucleic acid when the first and second oligonucleotides are aligned is a mismatch or non-complementary nucleobase.

"MOE" means methoxyethyl.

"Monomer" refers to a single unit of an oligomer. Monomers include, but are not limited to, nucleosides and nucleotides.

"Motif" means the pattern of unmodified and/or modified sugar moieties, nucleobases, and/or internucleoside linkages, in an oligonucleotide.

"Natural" or "naturally occurring" means found in nature.

"Non-bicyclic modified sugar" or "non-bicyclic modified sugar moiety" means a modified sugar moiety that comprises a modification, such as a substituent, that does not form a bridge between two atoms of the sugar to form a second ring.

"Nucleic acid" refers to molecules composed of monomeric nucleotides. A nucleic acid includes, but is not limited to, ribonucleic acids (RNA), deoxyribonucleic acids (DNA), single-stranded nucleic acids, and double-stranded nucleic acids.

"Nucleobase" means a heterocyclic moiety capable of pairing with a base of another nucleic acid. As used herein a "naturally occurring nucleobase" is adenine (A), thymine (T), cytosine (C), uracil (U), and guanine (G). A "modified nucleobase" is a naturally occurring nucleobase that is chemically modified. A "universal base" or "universal nucleobase" is a nucleobase other than a naturally occurring nucleobase and modified nucleobase, and is capable of pairing with any nucleobase.

"Nucleobase sequence" means the order of contiguous nucleobases in a nucleic acid or oligonucleotide independent of any sugar or internucleoside linkage.

"Nucleoside" means a compound comprising a nucleobase and a sugar moiety. The nucleobase and sugar moiety are each, independently, unmodified or modified. "Modified nucleoside" means a nucleoside comprising a modified nucleobase and/or a modified sugar moiety. Modified nucleosides include abasic nucleosides, which lack a nucleobase.

"Oligomeric compound" means a compound comprising a single oligonucleotide and optionally one or more additional features, such as a conjugate group or terminal group.

"Oligonucleotide" means a polymer of linked nucleosides each of which can be modified or unmodified, independent one from another. Unless otherwise indicated, oligonucleotides consist of 8-80 linked nucleosides. "Modified oligonucleotide" means an oligonucleotide, wherein at least one sugar, nucleobase, or internucleoside linkage is modified. "Unmodified oligonucleotide" means an oligonucleotide that does not comprise any sugar, nucleobase, or internucleoside modification.

"Parent oligonucleotide" means an oligonucleotide whose sequence is used as the basis of design for more oligonucleotides of similar sequence but with different lengths, motifs, and/or chemistries. The newly designed oligonucleotides may have the same or overlapping sequence as the parent oligonucleotide.

"Parenteral administration" means administration through injection or infusion. Parenteral administration includes subcutaneous administration, intravenous administration, intramuscular administration, intraarterial administration, intraperitoneal administration, or intracranial administration, e.g. intrathecal or intracerebroventricular administration.

"Pathologically high platelet count" means a blood platelet count that can contribute to the development or progression of a disease or condition.

"Pharmaceutically acceptable carrier or diluent" means any substance suitable for use in administering to an individual. For example, a pharmaceutically acceptable carrier can be a sterile aqueous solution, such as PBS or water-for-injection.

"Pharmaceutically acceptable salts" means physiologically and pharmaceutically acceptable salts of compounds, such as oligomeric compounds or oligonucleotides, i.e., salts that retain the desired biological activity of the parent compound and do not impart undesired toxicological effects thereto.

"Pharmaceutical agent" means a compound that provides a therapeutic benefit when administered to an individual.

"Pharmaceutical composition" means a mixture of substances suitable for administering to an individual. For example, a pharmaceutical composition may comprise one or more compounds or salt thereof and a sterile aqueous solution.

"Phosphorothioate linkage" means a modified phosphate linkage in which one of the non-bridging oxygen atoms is replaced with a sulfur atom. A phosphorothioate internucleoside linkage is a modified internucleoside linkage.

"Phosphorus moiety" means a group of atoms comprising a phosphorus atom. In certain embodiments, a phosphorus moiety comprises a mono-, di-, or tri-phosphate, or phosphorothioate.

"Portion" means a defined number of contiguous (i.e., linked) nucleobases of a nucleic acid. In certain embodiments, a portion is a defined number of contiguous nucleobases of a target nucleic acid. In certain embodiments, a portion is a defined number of contiguous nucleobases of an oligomeric compound.

"Prevent" refers to delaying or forestalling the onset, development or progression of a disease, disorder, or condition for a period of time from minutes to indefinitely.

"Prodrug" means a compound in a form outside the body which, when administered to an individual, is metabolized to another form within the body or cells thereof. In certain embodiments, the metabolized form is the active, or more active, form of the compound (e.g., drug). Typically conversion of a prodrug within the body is facilitated by the action of an enzyme(s) (e.g., endogenous or viral enzyme) or chemical(s) present in cells or tissues, and/or by physiologic conditions.

"RNA" means an RNA transcript and includes pre-mRNA and mature mRNA unless otherwise specified. For example, the term "TPO RNA," as used herein, means an RNA transcript transcribed from THPO, including a pre-mRNA and a mature mRNA.

"Reduce" means to bring down to a smaller extent, size, amount, or number.

"RefSeq No." is a unique combination of letters and numbers assigned to a sequence to indicate the sequence is for a particular target transcript (e.g., target gene). Such sequence and information about the target gene (collectively, the gene record) can be found in a genetic sequence database. Genetic sequence databases include the NCBI Reference Sequence database, GenBank, the European Nucleotide Archive, and the DNA Data Bank of Japan (the latter three forming the International Nucleotide Sequence Database Collaboration or INSDC).

"Region" is defined as a portion of the target nucleic acid having at least one identifiable structure, function, or characteristic.

"RNAi compound" means an antisense compound that acts, at least in part, through RISC or Ago2, but not through RNase H, to modulate a target nucleic acid and/or protein encoded by a target nucleic acid. RNAi compounds include, but are not limited to double-stranded siRNA, single-stranded RNA (ssRNA), and microRNA, including microRNA mimics.

"Segments" are defined as smaller or sub-portions of regions within a nucleic acid.

"Side effects" means physiological disease and/or conditions attributable to a treatment other than the desired effects. In certain embodiments, side effects include injection site reactions, liver function test abnormalities, renal function abnormalities, liver toxicity, renal toxicity, central nervous system abnormalities, myopathies, and malaise. For example, increased aminotransferase levels in serum may indicate liver toxicity or liver function abnormality. For example, increased bilirubin may indicate liver toxicity or liver function abnormality.

"Single-stranded" in reference to a compound means the compound has only one oligonucleotide.

"Self-complementary" means an oligonucleotide that at least partially hybridizes to itself. A compound consisting of one oligonucleotide, wherein the oligonucleotide of the compound is self-complementary, is a single-stranded compound. A single-stranded compound may be capable of binding to a complementary compound to form a duplex.

"Sites," are defined as unique nucleobase positions within a target nucleic acid.

"Specifically hybridizable" refers to an oligonucleotide having a sufficient degree of complementarity between the oligonucleotide and a target nucleic acid to induce a desired effect, while exhibiting minimal or no effects on non-target nucleic acids. In certain embodiments, specific hybridization occurs under physiological conditions.

"Specifically inhibit" a target nucleic acid means to reduce or block expression of the target nucleic acid while exhibiting fewer, minimal, or no effects on non-target nucleic acids reduction and does not necessarily indicate a total elimination of the target nucleic acid's expression.

"Standard cell assay" means assay(s) described in the Examples and reasonable variations thereof.

"Standard in vivo experiment" means the procedure(s) described in the Example(s) and reasonable variations thereof.

"Sugar moiety" means an unmodified sugar moiety or a modified sugar moiety. "Unmodified sugar moiety" or "unmodified sugar" means a 2'-OH(H) furanosyl moiety, as found in RNA (an "unmodified RNA sugar moiety"), or a 2'-H(H) moiety, as found in DNA (an "unmodified DNA sugar moiety"). Unmodified sugar moieties have one hydrogen at each of the 1', 3', and 4' positions, an oxygen at the 3' position, and two hydrogens at the 5' position. "Modified sugar moiety" or "modified sugar" means a modified furanosyl sugar moiety or a sugar surrogate. "Modified furanosyl sugar moiety" means a furanosyl sugar comprising a non-hydrogen substituent in place of at least one hydrogen of an unmodified sugar moiety. In certain embodiments, a modified furanosyl sugar moiety is a 2'-substituted sugar moiety. Such modified furanosyl sugar moieties include bicyclic sugars and non-bicyclic sugars.

"Sugar surrogate" means a modified sugar moiety having other than a furanosyl moiety that can link a nucleobase to another group, such as an internucleoside linkage, conjugate group, or terminal group in an oligonucleotide. Modified nucleosides comprising sugar surrogates can be incorporated into one or more positions within an oligonucleotide and such oligonucleotides are capable of hybridizing to complementary oligomeric compounds or nucleic acids.

"Synergy" or "synergize" refers to an effect of a combination that is greater than additive of the effects of each component alone at the same doses.

"Target gene" refers to a gene encoding a target.

"Targeting" means specific hybridization of a compound that to a target nucleic acid in order to induce a desired effect.

"Target nucleic acid," "target RNA," "target RNA transcript" and "nucleic acid target" all mean a nucleic acid capable of being targeted by compounds described herein.

"Target region" means a portion of a target nucleic acid to which one or more compounds is targeted.

"Target segment" means the sequence of nucleotides of a target nucleic acid to which a compound described herein is targeted. "5' target site" refers to the 5'-most nucleotide of a target segment. "3' target site" refers to the 3'-most nucleotide of a target segment.

"Terminal group" means a chemical group or group of atoms that is covalently linked to a terminus of an oligonucleotide.

"Therapeutically effective amount" means an amount of a compound, pharmaceutical agent, or composition that provides a therapeutic benefit to an individual.

"Treat" refers to administering a compound or pharmaceutical composition to an individual in order to affect an alteration or improvement of a disease, disorder, or condition in the individual.

CERTAIN EMBODIMENTS

The present disclosure provides the following non-limiting numbered embodiments:

Embodiment 1. A method of safely treating, preventing, or ameliorating a disease or condition in an individual, wherein TPO contributes to initiation of the disease or condition, the method comprising administering a compound comprising a safe TPO-specific inhibitor to the individual, thereby treating, preventing, or ameliorating the disease in the individual.

Embodiment 2. A method of safely treating, preventing, or ameliorating a disease or condition in an individual, wherein TPO contributes to progression of the disease or condition, the method comprising administering a compound comprising a safe TPO-specific inhibitor to the individual, thereby treating, preventing, or ameliorating the disease in the individual.

Embodiment 3. A method of safely treating, preventing, or ameliorating a disease or condition in an individual, wherein platelet activity contributes to initiation of the disease or condition, the method comprising administering a compound comprising a safe TPO-specific inhibitor to the individual, thereby treating, preventing, or ameliorating the disease in the individual.

Embodiment 4. A method of safely treating, preventing, or ameliorating a disease or condition in an individual, wherein platelet activity contributes to progression of the disease or condition, the method comprising administering a compound comprising a safe TPO-specific inhibitor to the individual, thereby treating, preventing, or ameliorating the disease in the individual.

Embodiment 5. The method of any one of embodiments 1-4, wherein TPO activity adversely affects disease outcome in the individual.

Embodiment 6. The method of any one of embodiments 1-5, wherein platelet activity adversely affects disease outcome in the individual.

Embodiment 7. The method of any one of embodiments 1-6, wherein the individual has a platelet count equal to or greater than about 100,000/μL, about 120,000/μL, about 150,000/μL, about 200,000/μL, about 250,000/μL, about 300,000/μL, about 350,000/μL, about 400,000/μL, about 450,000/μL, before administering.

Embodiment 8. The method of any one of embodiments 1-7, wherein administering modulates TPO activity, platelet activity, or a combination thereof, in the invidividual.

Embodiment 9. The method of any one of embodiments 1-8, wherein the individual can benefit from platelet count reduction.

Embodiment 10. The method of any one of embodiments 1-9, wherein administering reduces platelet count in the invidividual.

Embodiment 11. The method of any one of embodiments 1-10, wherein administering reduces TPO activity, platelet activity, or a combination thereof, in the invidividual.

Embodiment 12. The method of any one of embodiments 1-11, wherein the disease or condition is cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, or atherosclerosis.

Embodiment 13. The method of embodiment 12, wherein the cancer is breast cancer, ovarian cancer, endometrial cancer, cervical cancer, prostate cancer, lung cancer, mesothelioma, gastrointestinal cancer, colon cancer, colorectal cancer, bladder cancer, liver cancer, esophageal cancer, pancreatic cancer, biliary tract cancer, sarcoma, chordoma, renal cancer, neuroblastoma, brain cancer, blood cancer, myeloma, B cell malignancy, lymphoma, or leukemia.

Embodiment 14. The method of embodiment 12 or 13, wherein administering the compound inhibits or reduces cancer cell proliferation, the number of primary tumors, individual tumor volume, total tumor volume, tumor growth, primary tumor intra-tumoral vessel density, primary tumor platelet deposition, and/or metastasis, or a combination thereof.

Embodiment 15. The method of any one of embodiments 1-14, wherein administering the safe TPO-specific inhibitor safely and partially reduces platelet count while leaving sufficient synthesis of TPO to maintain hemostatically safe platelet count.

Embodiment 16. The method of embodiment 15, wherein synthesis of TPO is extrahepatic.

Embodiment 17. A method of inhibiting expression or activity of TPO in a cell that expresses TPO receptor (MPL) comprising contacting the cell with a compound comprising a safe TPO-specific inhibitor, thereby inhibiting expression or activity of TPO in the cell.

Embodiment 18. The method of embodiment 17, wherein the cell is a liver cell.

Embodiment 19. The method of embodiment 17, wherein the cell is a cancer cell.

Embodiment 20. The method of embodiment 18 or 19, wherein the cell is in an individual.

Embodiment 21. The method of embodiment 20, wherein the individual has, or is at risk of having, cancer.

Embodiment 22. The method of any one of embodiments 1-21, wherein the individual is human.

Embodiment 23. The method of any one of embodiments 1-22, wherein the safe TPO-specific inhibitor selected from a nucleic acid, a polypeptide, an antibody, and a small molecule.

Embodiment 24. The method of any one of embodiments 1-23, wherein the compound comprises a modified oligonucleotide targeting TPO.

Embodiment 25. The method of embodiment 24, wherein the compound is single-stranded.

Embodiment 26. The method of embodiment 24, wherein the compound is double-stranded.

Embodiment 27. The method of any one of embodiments 24-26, wherein the modified oligonucleotide is 12 to 30 linked nucleosides in length.

Embodiment 28. The method of any one of embodiments 24-27, wherein the modified oligonucleotide comprises at least one modified internucleoside linkage, at least one modified sugar moiety, or at least one modified nucleobase.

Embodiment 28. The method of embodiment 28, wherein the at least one modified internucleoside linkage is a phosphorothioate internucleoside linkage, the at least one modified sugar is a bicyclic sugar or 2'-O-methyoxyethyl, and the at least one modified nucleobase is a 5-methylcytosine.

Embodiment 30. The method of embodiment 28 or 29, wherein at least one modified sugar comprises a 4'-CH(CH$_3$)—O-2' bridge or a 4'-(CH$_2$)$_n$—O-2' bridge, wherein n is 1 or 2.

Embodiment 31. The method of any one of embodiments 28-30, wherein each modified internucleoside is a phosphorothioate linkage.

Embodiment 32. The method of any one of embodiments 28-31, wherein each cytosine is a 5-methylcytosine.

Embodiment 33. The method of any one of embodiments 24-32, wherein the modified oligonucleotide comprises:
 a gap segment consisting of linked deoxynucleosides;
 a 5' wing segment consisting of linked nucleosides;
 a 3' wing segment consisting linked nucleosides;
wherein the gap segment is positioned immediately adjacent to and between the 5' wing segment and the 3' wing segment and wherein each nucleoside of each wing segment comprises a modified sugar.

Embodiment 34. The method of any one of embodiments 1-33, wherein the compound is administered parenterally.

Embodiment 35. The method of embodiment 34, wherein the compound is administered parenterally by subcutaneous or intravenous administration.

Embodiment 36. The method of any one of embodiments 1-35, comprising co-administering the compound and at least one additional therapy.

Embodiment 37. The method of embodiment 36, wherein the compound and the additional therapy are administered concomitantly.

Embodiment 38. The method of embodiment 37, wherein the compound and the additional therapy are administered consecutively.

Embodiment 39. The method of any one of embodiments 36-38, wherein the additional therapy is a secondary agent selected from a chemotherapeutic agent and a hormone therapy.

Embodiment 40. The method of any one of embodiments 36-38, wherein the additional therapy is a secondary agent selected from an anti-HER2 antibody, a tyrosine kinase inhibitor, and a PARP inhibitor.

Embodiment 41. The method of any one of embodiments 1-40, wherein administering reduces an amount of a TPO RNA in a biological sample from the individual by at least about 10%, at least about 20%, at least about 30%, at least about 40%, at least about 50%, at least about 60%, at least about 70%, at least about 80%, or at least about 90% relative to a reference amount in a reference sample.

Embodiment 42. The method of embodiment 41, wherein the reference sample is a reference biological sample obtained from the individual before the administering.

Embodiment 43. The method of embodiment 41, wherein the reference sample is a reference biological sample obtained from a control subject that does not have the disease or condition.

Embodiment 44. The method of any one of embodiments 41-43, wherein the biological sample and the biological sample comprise blood, plasma, serum, urine, or a combination thereof.

Embodiment 45. Use of a compound comprising a safe TPO-specific inhibitor for the manufacture or preparation of a medicament for treating a disease or condition that can benefit from platelet count reduction.

Embodiment 46. The use of embodiment 45, wherein the disease or condition is thrombosis, arterial thrombosis, venous thrombosis, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, or atherosclerosis.

Embodiment 47. Use of a compound comprising a safe TPO-specific inhibitor for the treatment of a disease or condition that can benefit from platelet count reduction.

Embodiment 48. The use of embodiment 47, wherein the disease or condition is cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, or atherosclerosis.

Embodiment 49. The use of embodiment 46 or 48, wherein the cancer is breast cancer, ovarian cancer, endometrial cancer, cervical cancer, prostate cancer, lung cancer, mesothelioma, gastrointestinal cancer, colon cancer, colorectal cancer, bladder cancer, liver cancer, esophageal cancer, pancreatic cancer, biliary tract cancer, sarcomas, chordoma, renal cancer, neuroblastoma, brain cancer, blood cancer, myeloma, multiple myeloma, a B cell malignancy, a lymphoma, a leukemia, or a myeloproliferative neoplasm.

Embodiment 50. The use of any one of embodiments 45-49 wherein the safe TPO-specific inhibitor safely and partially reduces platelet count while leaving sufficient synthesis of TPO to maintain hemostatically safe platelet count.

Embodiment 51. Embodiment 1. The use of embodiment 50, wherein the hemostatically safe platelet count is an extrahepatic platelet count.

Embodiment 52. The use of any one of embodiments 45-51, wherein the compound is capable of reducing or inhibiting cancer cell proliferation, the number of primary tumors, individual tumor volume, total tumor volume, tumor growth, primary tumor intra-tumoral vessel density, primary tumor platelet deposition, or metastasis.

Embodiment 53. The use of any one of embodiments 45-52, wherein the safe TPO-specific inhibitor is selected from a nucleic acid, a polypeptide, an antibody, and a small molecule.

Embodiment 54. The use of any of embodiments 45-53, wherein the compound comprises a modified oligonucleotide targeted to TPO.

Embodiment 55. The use of embodiment 54, wherein the compound is single-stranded.

Embodiment 56. The use of embodiment 54, wherein the compound is double-stranded Embodiment 57. The use of any one of embodiments 54-56, wherein the modified oligonucleotide is 12 to 30 linked nucleosides in length.

Embodiment 58. The use of any one of embodiments 54-57, wherein the modified oligonucleotide comprises at least one modified internucleoside linkage, at least one modified sugar moiety, or at least one modified nucleobase.

Embodiment 59. The use of embodiment 58, wherein the at least one modified internucleoside linkage is a phosphorothioate internucleoside linkage, the at least one modified sugar is a bicyclic sugar or 2'-O-methoxyethyl, and the at least one modified nucleobase is a 5-methylcytosine.

Embodiment 60. The use of embodiment 58 or 59, wherein at least one modified sugar comprises a 4'-CH(CH$_3$)—O-2' bridge or a 4'-(CH$_2$)$_n$—O-2' bridge, wherein n is 1 or 2.

Embodiment 61. The use of any of embodiments 58-60, wherein each modified internucleoside is a phosphorothioate linkage.

Embodiment 62. The use of any of embodiments 58-61, wherein each cytosine is a 5-methylcytosine.

Embodiment 63. The use of any one of embodiments 41-62, wherein the modified oligonucleotide comprises:
 a gap segment consisting of linked deoxynucleosides;
 a 5' wing segment consisting of linked nucleosides;
 a 3' wing segment consisting linked nucleosides;
wherein the gap segment is positioned immediately adjacent to and between the 5' wing segment and the 3' wing segment and wherein each nucleoside of each wing segment comprises a modified sugar.

Certain embodiments provide methods, compounds, and compositions for ameliorating, treating or preventing diseases or conditions, wherein TPO activity or activation of platelets contributes to and promotes disease initiation or progression. In certain embodiments, methods, compounds, and compositions are useful for ameliorating, treating or preventing diseases or conditions, wherein TPO activity or activation of platelets is associated with disease initiation or progression. In certain embodiments, methods, compounds, and compositions are useful for ameliorating, treating or preventing diseases or conditions, wherein TPO activity or activation of platelets is related to disease initiation or progression. In certain embodiments, TPO activity or activation of platelets adversely affects disease outcome. In certain embodiments, the diseases or conditions include, but are not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis by administering the compound or composition to the individual, wherein the compound or composition comprises a safe TPO-specific inhibitor. In certain embodiments, methods, compounds, and compositions reduce, prevent or abolish a symptom of the disease or condition. In certain embodiments, safe TPO-specific inhibitors are nucleic acids (including antisense compounds), peptides, antibodies, small molecules, and other agents capable of reducing the amount or activity of TPO. In certain embodiments, the individual is human.

Certain embodiments disclosed herein provide compounds or compositions comprising a safe TPO-specific inhibitor. Such compounds or compositions are useful for treating or preventing diseases or conditions in which TPO or activation of platelets contributes to and promotes disease initiation or progression, and/or adversely affects disease outcome. Compounds or compositions may be useful for treating or preventing diseases or conditions in which TPO or activation of platelets is associated with or related to disease initiation or progression, and/or adversely affects disease outcome. In certain embodiments, the diseases or conditions include, but are not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis, or a symptom thereof. In certain embodiments, the safe TPO-specific inhibitor is a nucleic acid, polypeptide, antibody, small molecules, or other agent capable of inhibiting the expression or activity of TPO. In certain embodiments, the safe TPO-specific inhibitor is a nucleic acid targeting TPO. In certain embodiments, the nucleic acid is single stranded. In certain embodiments, the safe TPO-specific inhibitor is a double stranded compound. In certain embodiments, the compound or composition comprises an antisense compound. In any of the foregoing or following embodiments, the compound or composition may comprise an oligomeric compound. In certain embodiments, the compound or composition comprises an oligonucleotide targeting a TPO RNA. In certain embodiments, the oligonucleotide is at least partially complementary to a TPO RNA. In certain embodiments, the oligonucleotide is single stranded. In certain embodiments, the compound comprises deoxyribonucleotides. In certain embodiments, the compound comprises ribonucleotides and is double-stranded. In certain embodiments, the oligonucleotide is a modified oligonucleotide. In certain embodiments, the modified oligonucleotide is single stranded.

In any of the foregoing or following embodiments, compounds may comprise a modified oligonucleotide consisting of 8 to 80, 10 to 30, 12 to 50, 13 to 30, 13 to 50, 14 to 30, 14 to 50, 15 to 30, 15 to 50, 16 to 30, 16 to 50, 17 to 30, 17 to 50, 18 to 22, 18 to 24, 18 to 30, 18 to 50, 19 to 22, 19 to 30, 19 to 50, or 20 to 30 linked nucleosides. In certain embodiments, the modified oligonucleotide consists of 12 to 24 linked nucleosides. In certain embodiments, the modified oligonucleotide consists of 16 linked nucleosides. In certain embodiments, the modified oligonucleotide consists of 18 linked nucleosides. In certain embodiments, the modified oligonucleotide consists of 20 linked nucleosides.

In certain embodiments, at least one internucleoside linkage of said modified oligonucleotide is a modified internucleoside linkage. In certain embodiments, at least one internucleoside linkage is a phosphorothioate internucleoside linkage. In certain embodiments, the internucleoside linkages are phosphorothioate linkages and phosphate ester linkages.

In certain embodiments, any of the foregoing oligonucleotides comprises at least one modified sugar. In certain embodiments, at least one modified sugar comprises a 2'-O-methoxyethyl group. In certain embodiments, at least one modified sugar is a bicyclic sugar, such as a 4'-CH (CH$_3$)—O-2' group, a 4'-CH$_2$—O-2' group, or a 4'-(CH$_2$)$_2$—O-2'group.

In certain embodiments, at least one nucleoside of said modified oligonucleotide comprises a modified nucleobase. In certain embodiments, the modified nucleobase is a 5-methylcytosine.

In certain embodiments, a compound or composition comprises a modified oligonucleotide comprising: a) a gap segment consisting of linked deoxynucleosides; b) a 5' wing segment consisting of linked nucleosides; and c) a 3' wing segment consisting of linked nucleosides. The gap segment is positioned between the 5' wing segment and the 3' wing segment and each nucleoside of each wing segment comprises a modified sugar. In certain embodiments, at least one internucleoside linkage is a phosphorothioate linkage. In certain embodiments, and at least one cytosine is a 5-methylcytosine.

In certain embodiments, a compound comprises a modified oligonucleotide described herein and a conjugate group. In certain embodiments, the conjugate group is linked to the modified oligonucleotide at the 5' end of the modified oligonucleotide. In certain embodiments, the conjugate group is linked to the modified oligonucleotide at the 3' end of the modified oligonucleotide. In certain embodiments, the conjugate group comprises at least one N-Acetylgalactosamine (GalNAc), at least two N-Acetylgalactosamines (GalNAcs), or at least three N-Acetylgalactosamines (GalNAcs).

In certain embodiments, a compound comprises a modified oligonucleotide 20 to 80 linked nucleosides in length and having a nucleobase sequence comprising the nucleobase sequences of any one of SEQ ID NOs: 6-230. In certain embodiments, the compound is an antisense compound or oligomeric compound. In certain embodiments, the compound is single-stranded. In certain embodiments, the compound is double-stranded. In certain embodiments, the modified oligonucleotide is 12 to 30 linked nucleosides in length.

In certain embodiments, the compounds or compositions disclosed herein further comprise a pharmaceutically acceptable carrier or diluent.

In certain embodiments, the compound or composition is co-administered with a second agent. In certain embodiments, the compound or composition and the second agent are administered concomitantly.

In certain embodiments, compounds and compositions described herein safely targeting TPO can be used in methods of safely inhibiting expression of TPO in a cell. In certain embodiments, the cell is a cell that expresses TPO receptor (MPL). In certain embodiments, the cell is a liver cell. In certain embodiments, the cell is a cancer cell. In certain embodiments, the cell contributes to a disease or condition selected from cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. In certain embodiments, compounds and compositions described herein targeting TPO can be used in methods of treating, preventing, or ameliorating cancer including, but not limited to, breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis.

Certain Indications and Methods

Certain embodiments provided herein relate to methods of safely treating or preventing diseases or conditions in which TPO or activation of platelets contributes to and promotes disease initiation or progression, and/or adversely affects disease outcome. Certain embodiments provided herein relate to methods of safely inhibiting TPO expression or activity, which can be useful for treating, preventing, or ameliorating a disease or condition that can benefit from platelet count reduction in an individual, by administration of a compound or composition that safely targets TPO. Certain embodiments provided herein relate to methods of safely treating or preventing diseases or conditions in which TPO or activation of platelets is related to disease initiation or progression, and/or adversely affects disease outcome. Certain embodiments provided herein relate to methods of safely treating or preventing diseases or conditions in which TPO or activation of platelets is associated with disease initiation or progression, and/or adversely affects disease outcome. In certain embodiments, the pathologically high platelet count can be equal to or greater than about 100,000/µL, about 120,000/µL, about 150,000/µL, about 200,000/µL, about 250,000/µL, about 300,000/µL, about 350,000/µL, about 400,000/µL, about 450,000/µL, or about 500,000/µL. In certain embodiments, the disease is one in which platelets contribute to disease onset, disease progression, disease severity, or a combination thereof. Such diseases include, but not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. In contrast, and for clarity, examples of diseases or conditions that would not benefit from platelet count reduction include dehydration and reactive thrombocythemia (e.g., thrombocythemia following trauma and bleeding). In certain embodiments, diseases or conditions that would not benefit from platelet count reduction are disease or conditions wherein platelet activity does not contribute to or promote the disease or condition. In certain embodiments, such a compound or composition comprises a safe TPO-specific inhibitor.

In certain embodiments, a method of safely inhibiting expression or activity of TPO in a cell comprises contacting the cell with a compound or composition comprising a safe TPO-specific inhibitor, thereby inhibiting expression or activity of TPO in the cell. In certain embodiments, the cell is a cell that expresses TPO receptor (MPL). In certain embodiments, the cell is a liver cell. In certain embodiments, the cell is a cancer cell. In certain embodiments, the safe TPO-specific inhibitor is a nucleic acid, peptide, antibody, small molecule or other agent capable of safely inhibiting the expression or activity of the TPO. In certain embodiments, the safe TPO-specific inhibitor is an antisense compound or an oligomeric compound targeted to a TPO RNA. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

In certain embodiments, methods comprise administering to the individuals a compound or composition comprising a safe TPO-specific inhibitor, thereby treating or preventing the disease. In certain embodiments, the diseases or conditions include, but are not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. comprises administering to an individual having the disease a compound or composition comprising a safe TPO-specific inhibitor, thereby treating, preventing, or ameliorating the disease. In certain embodiments, the disease is cancer. In certain embodiments, the individual is identified as having, or at risk of having, cancer. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. In certain embodiments, the cancer is breast cancer. In certain embodiments, the safe TPO-specific inhibitor is administered to the individual parenterally. In certain embodiments, the parenteral administration is subcutaneous administration. In certain embodiments, the individual is human. In certain embodiments, the safe TPO-specific inhibitor is a nucleic acid, peptide, antibody, small molecule or other agent capable of inhibiting the expression or activity of the TPO. In certain embodiments, the safe TPO-specific inhibitor is an antisense compound or an oligomeric compound targeted to TPO. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

In certain embodiments, methods of safely reducing but not eliminating signaling through the TPO receptor, cMPL, to a lower level in an individual comprising administering a safe TPO-specific inhibitor to the individual, thereby attenuating the proliferation or growth rate of cells that utilize the cMPL pathway. In certain embodiments, the cells that utilize the cMPL pathway are normal megakaryocytes. In certain embodiments, the megakaryocytes depend on cMPL signaling for production of platelets (thrombocytes). In certain embodiments, administering the safe TPO-specific inhibitor reduces platelet count (PLC), thereby also interfering with the progression of disease conditions where platelets play a pathogenetic role such as cancer. In certain embodiments, administering the safe TPO-specific inhibitor leaves sufficient synthesis of TPO to maintain hemostatically safe PLC. In certain embodiments, the safe TPO-specific inhibitor is a nucleic acid, peptide, antibody, small molecule or other agent capable of inhibiting the expression or activity of the TPO. In certain embodiments, the safe TPO-specific inhibitor is an antisense compound or an oligomeric compound targeted to TPO. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

In certain embodiments, methods of safely inhibiting expression of TPO selectively in the liver of an individual comprises administering a compound or composition comprising a safe TPO-specific inhibitor, thereby inhibiting expression or activity of TPO selectively in the liver of the individual. In certain embodiments, selectively inhibiting expression or activity of TPO in the liver of an individual selectively and/or partially decreases MLP/JAK/STAT/MAPK/Shc/activity in megakaryocytes. In certain embodiments, selectively inhibiting expression or activity of TPO in the liver of an individual selectively and/or partially reduces platelet production and platelet count. In certain embodiments, selectively inhibiting expression or activity of TPO in the liver of an individual is tolerable in the individual. In certain embodiments, selectively inhibiting expression or activity of TPO in the liver of an individual leaves sufficient production of TPO in extrahepatic tissues to maintain hemostatic platelet count and function. In certain embodiments, administering the safe TPO-specific inhibitor leaves sufficient synthesis of TPO to maintain hemostatically safe PLC. In certain embodiments, the individual has a disease in which TPO or activation of platelets contributes to and promotes disease initiation or progression, and/or adversely affects disease outcome. In certain embodiments, the individual has a disease in which TPO or activation of platelets is associated with or related to disease initiation or progression, and/or adversely affects disease outcome. In certain embodiments, the individual has or is at risk of having a disease or condition including, but not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. In certain embodiments, the individual has or is identified as having, or at risk of having, cancer. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. In certain embodiments, the cancer is breast cancer. In certain embodiments, the safe TPO-specific inhibitor is administered to the individual parenterally. In certain embodiments, the parenteral administration is subcutaneous administration. In certain embodiments, the individual is human. In certain embodiments, the safe TPO-specific inhibitor is a nucleic acid, peptide, antibody, small molecule or other agent capable of inhibiting the expression or activity of the TPO. In certain embodiments, the safe TPO-specific inhibitor is an antisense compound or an oligomeric compound targeted to TPO. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

In certain embodiments, methods of inhibiting expression of TPO selectively in the liver of an individual comprises administering an effective and tolerable amount of a compound or composition comprising a safe TPO-specific inhibitor, thereby inhibiting expression or activity of TPO selectively in the liver of the individual. In certain embodiments, the effective and tolerable amount of the safe TPO-specific inhibitor administered to the individual is capable of selectively and/or partially decreases MLP/JAK/STAT/MAPK/Shc/activity in megakaryocytes. In certain embodiments, the effective and tolerable amount of the safe TPO-specific inhibitor administered to the individual is capable of selectively and/or partially reducing platelet production and platelet count. In certain embodiments, the effective and tolerable amount of the safe TPO-specific inhibitor administered to the individual is capable of leaving sufficient production of TPO in extrahepatic tissues to maintain hemostatic platelet count and function. In certain embodiments, administering the safe TPO-specific inhibitor leaves sufficient synthesis of TPO to maintain hemostatically safe PLC. In certain embodiments, the individual has or is at risk of having a disease in which TPO or activation of platelets contributes to and promotes disease initiation or progression, and/or adversely affects disease outcome. In certain embodiments, the individual has or is at risk of having a disease in which TPO or activation of platelets is associated with or related to disease initiation or progression, and/or adversely affects disease outcome. In certain embodiments, the individual has or is at risk of having a disease that can benefit from platelet count reduction including, but not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. In certain embodiments, the individual has or is identified as having, or at risk of having, cancer. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. In certain embodiments, the cancer is breast cancer. In certain embodiments, the safe TPO-specific inhibitor is administered to the individual parenterally. In certain embodiments, the parenteral administration is subcutaneous administration. In certain embodiments, the individual is human. In certain embodiments, the safe TPO-specific inhibitor is a nucleic acid, peptide, antibody, small molecule or other agent capable of inhibiting the expression or activity of the TPO. In certain embodiments, the safe TPO-specific inhibitor is an antisense compound or an oligomeric compound targeted to TPO. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

In certain embodiments, methods of reducing or inhibiting cancer cell proliferation, the number of primary tumors, individual tumor volume, total tumor volume, tumor growth, primary tumor intra-tumoral vessel density, primary tumor platelet deposition, and/or metastasis in an individual having cancer comprises administering to the individual a compound or composition comprising a safe TPO-specific inhibitor. In certain embodiments, administering a safe TPO-specific inhibitor to the individual having cancer improves tumor free survival or overall survival of the individual. In certain embodiments, the individual is identified as having, or at risk of having cancer. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. In certain embodiments, the cancer is breast cancer. In certain embodiments, the safe TPO-specific inhibitor is administered to the individual parenterally. In certain embodiments, the parenteral administration is subcutaneous administration. In certain embodiments, the individual is human. In certain embodiments, the safe TPO-specific inhibitor is a nucleic acid, peptide, antibody, small molecule or other agent capable of inhibiting the expression or activity of the TPO. In certain embodiments, the safe TPO-specific inhibitor is an antisense compound or an oligomeric compound targeted to TPO. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

In certain embodiments, methods, compounds, and compositions disclosed herein are useful for safely treating, ameliorating or preventing a disease or condition in a subject in need thereof, wherein the subject has a pathologically high platelet count. In certain embodiments, methods that safely treat, prevent, or ameliorate a disease associated with a pathologically high platelet count that can benefit from platelet count reduction or a disease in which TPO or activation of platelets contributes to and promotes disease initiation or progression, and/or adversely affects disease outcome in an individual comprise administering a compound comprising a safe TPO-specific inhibitor to the individual, thereby treating, preventing, or ameliorating the disease in the individual. It will be understood that different diseases associated with a pathologically high platelet count that can benefit from platelet count reduction do not necessarily have the same quantitative platelet count. It will be understood that the platelet count that is pathological may not be the same amount for different diseases. Nonetheless, in certain embodiments, diseases associated with a pathologically high platelet count can benefit from platelet count reduction by treatment with a TPO inhibitor. In certain embodiments, the pathologically high platelet count can be equal to or greater than about 100,000/µL, about 120,000/µL, about 150,000/µL, about 200,000/µL, about 250,000/µL, about 300,000/µL, about 350,000/µL, about 400,000/µL, about 450,000/µL, or about 500,000/µL.

Certain embodiments are drawn to compounds and compositions described herein for use in therapy. Certain embodiments are drawn to a compound or composition comprising a safe TPO-specific inhibitor for use in treating, preventing, or ameliorating a disease in which TPO or activation of platelets contributes to and promotes disease initiation or progression, and/or adversely affects disease outcome. Certain embodiments are drawn to a compound or composition comprising a safe TPO-specific inhibitor for use in treating, preventing, or ameliorating a disease in which TPO or activation of platelets related to or associated with disease initiation or progression, and/or adversely affects disease outcome. Certain embodiments are drawn to a compound or composition comprising a safe TPO-specific inhibitor for use in treating, preventing, or ameliorating a disease that can benefit from platelet count reduction including, but not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. Certain embodiments are drawn to a compound or composition comprising a safe TPO-specific inhibitor for use in treating, preventing, or ameliorating cancer associated with TPO. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. In certain embodiments, the cancer is breast cancer. In certain embodiments, the safe TPO-specific inhibitor is a nucleic acid, peptide, antibody, small molecule or other agent capable of inhibiting the expression or activity of the TPO. In certain embodiments, the safe TPO-specific inhibitor is an antisense compound or an oligomeric compound targeted to TPO. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

Certain embodiments are drawn to a compound or composition comprising a safe TPO-specific inhibitor for use in reducing or inhibiting cancer cell proliferation, the number of primary tumors, individual tumor volume, total tumor volume, tumor growth, primary tumor intra-tumoral vessel density, primary tumor platelet deposition, and/or metastasis, or a combination thereof, in an individual. In certain embodiments, the individual is identified as having, or at risk of having cancer. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. In certain embodiments, the individual is human. In certain embodiments, the safe TPO-specific inhibitor is a nucleic acid, peptide, antibody, small molecule or other agent capable of inhibiting the expression or activity of the TPO. In certain embodiments, the safe TPO-specific inhibitor is an antisense compound or an oligomeric compound targeted to TPO. In certain embodiments, the safe TPO-specific inhibitor is oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

Certain embodiments are drawn to use of compounds or compositions described herein for the manufacture or preparation of a medicament for therapy. Certain embodiments are drawn to the use of a compound or composition as described herein in the manufacture or preparation of a medicament for treating, preventing, or ameliorating a disease in which TPO or activation of platelets contributes to and promotes disease initiation or progression, and/or adversely affects disease outcome. Certain embodiments are drawn to the use of a compound or composition as described herein in the manufacture or preparation of a medicament for treating, preventing, or ameliorating a disease in which TPO or activation of platelets related to or associated with disease initiation or progression, and/or adversely affects disease outcome. Certain embodiments are drawn to the use of a compound or composition as described herein in the manufacture or preparation of a medicament for treating, preventing, or ameliorating a disease that can benefit from platelet count reduction including, but not limited to, cancer, thrombocytosis, essential thrombocythemia, thrombosis, arterial thrombosis, venous thrombosis, inflammation, inflammatory disease, asthma, autoimmune disease, lupus, systemic lupus erythematosus, arthritis, psoriasis, diabetes, hyperglycemia, hyperinsulinemia, cardiovascular disease, hypercholesterolemia, hypertriglyceridemia, hypertension, hyperlipidemia, obesity, atherothrombosis, and atherosclerosis. Certain embodiments are drawn to the use of a compound or composition as described herein in the manufacture or preparation of a medicament for treating, preventing, or ameliorating cancer associated with TPO. In certain embodiments, the compound or composition as described herein is used in the manufacture or preparation of a medicament for treating, preventing, or ameliorating cancer. In certain embodiments, the cancer is breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis. In certain embodiments, the cancer is breast cancer. In certain embodiments, the compound or composition comprises a nucleic acid, peptide, antibody, small molecule or other agent capable of inhibiting the expression or activity of the TPO. In certain embodiments, the compound or composition comprises an antisense compound or an oligomeric compound targeted to TPO. In certain embodiments, the compound or composition comprises an oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound or composition comprising a modified oligonucleotide can be single-stranded. In certain embodiments, the compound or composition comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

Certain embodiments are drawn to the use of a compound or composition for the manufacture or preparation of a medicament for reducing or inhibiting cancer cell proliferation, the number of primary tumors, individual tumor volume, total tumor volume, tumor growth, primary tumor intra-tumoral vessel density, primary tumor platelet deposition, and/or metastasis, or a combination thereof, in an individual having or at risk of having cancer. In certain embodiments, the compound or composition comprises a nucleic acid, peptide, antibody, small molecule or other agent capable of inhibiting the expression or activity of the TPO. In certain embodiments, the compound or composition comprises an antisense compound or an oligomeric compound targeted to TPO. In certain embodiments, the compound or composition comprises an oligonucleotide targeted to TPO. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound or composition comprising a modified oligonucleotide can be single-stranded. In certain embodiments, the compound or composition comprising a modified oligonucleotide can be double-stranded. In certain embodiments, the compound is linked to a conjugate group. In certain embodiments, the conjugate group comprises at least one N-Acetylgalactosamine (GalNAc), at least two N-Acetylgalactosamines (GalNAcs), or at least three N-Acetylgalactosamines (GalNAcs).

In any of the foregoing methods or uses, the cancer can be breast cancer. In certain embodiments, the breast cancer or breast cancer cell has one or more of the following characteristics: Androgen Receptor positive, dependent on androgen for growth, Estrogen Receptor (ER) negative, independent of estrogen for growth, Progesterone Receptor (PR) negative, independent of progesterone for growth, or Her2/neu negative. In certain embodiments, the breast cancer or breast cancer cell is ER, PR, and HER2 triple negative and AR positive (ER−, PR−, HER2−, AR+). In certain embodiments, the breast cancer or breast cancer cell is ER negative and AR positive (ER−, AR+). In certain embodiments, the breast cancer or breast cancer cell is ER positive and AR positive (ER+, AR+). In certain embodiments, the breast cancer or breast cancer cell is apocrine. Apocrine breast cancers are often "triple negative", meaning that the cells do not express ER, PR, or HER2 receptors, and usually, but not necessarily, AR positive. In certain embodiments, an apocrine breast cancer or breast cancer cell is ER, PR, and HER2 triple negative and AR positive (ER−, PR−, HER2−, AR+). In certain embodiments, an apocrine breast cancer or breast cancer cell is ER negative and AR positive (ER−, AR+). In certain embodiments, an apocrine breast cancer or breast cancer cell originates from the sweat gland of the breast. In certain embodiments, an apocrine breast cancer or breast cancer cell is a ductal cancer or cancer cell of the breast. In certain embodiments, an apocrine breast cancer can have any one or more of the following features: a large amount of eosinophilic granular cytoplasm, well-defined margins, large vesicular nuclei, a nuclear to cytoplasmic ratio of about 1:2, and/or accumulations of secreted granules in the apical cytoplasm known as apical snouts. In certain embodiments, the breast cancer or breast cancer cell is an ER negative and AR positive (ER−, AR+) molecular apocrine breast cancer or breast cancer cell. In certain aspects, an ER negative and AR positive (ER−, AR+) molecular apocrine breast cancer or breast cancer cell can further be PR positive, PR negative, HER2 negative, or HER2 positive. In certain embodiments, the breast cancer is HER2 positive. In certain embodiments, the breast cancer is PR positive. In certain embodiments, the breast cancer is ER positive. Breast cancer can be identified as positive or negative with respect to hormone receptors, such as ER, PR, or HER2 by standard histological techniques. For example, histological breast cancer samples can be classified as "triple negative" (ER−, PR−, HER2−) when less than 1% of cells demonstrate nuclear staining for estrogen and progesterone receptors, and immunohistochemical staining for HER2 shows a 0, 1-fold, or a 2-fold positive score and a FISH ratio (HER2 gene signals to chromosome 17 signals) of less than 1.8 according to the relevant ASCO and CAP guidelines. (Meyer, P. et al., PLoS ONE 7 (5): e38361 (2012)).

In any of the foregoing methods or uses, the compound or composition can comprise an antisense compound targeted to TPO. In certain embodiments, the compound comprises an oligonucleotide, for example an oligonucleotide consisting of 8 to 80 linked nucleosides, 10 to 30 linked nucleosides, 12 to 30 linked nucleosides, or 20 linked nucleosides. In certain embodiments, the oligonucleotide comprises at least one modified internucleoside linkage, at least one modified sugar and/or at least one modified nucleobase. In certain embodiments, the modified internucleoside linkage is a phosphorothioate internucleoside linkage, the modified sugar is a bicyclic sugar or a 2'-O-methoxyethyl, and the modified nucleobase is a 5-methylcytosine. In certain embodiments, the modified oligonucleotide comprises a gap segment consisting of linked deoxynucleosides; a 5' wing segment consisting of linked nucleosides; and a 3' wing segment consisting of linked nucleosides, wherein the gap segment is positioned immediately adjacent to and between the 5' wing segment and the 3' wing segment and wherein each nucleoside of each wing segment comprises a modified sugar. In certain embodiments, the compound can comprise a modified oligonucleotide 20 to 80 linked nucleosides in length and having a nucleobase sequence comprising the nucleobase sequences of any one of SEQ ID NOs: 6-230. In certain embodiments, the compound is an antisense compound or oligomeric compound. In certain embodiments, the compound is single-stranded. In certain embodiments, the compound is double-stranded. In certain embodiments, the modified oligonucleotide is 12 to 30 linked nucleosides in length. In certain embodiments, the modified oligonucleotide is 16 to 30 linked nucleosides in length. In certain embodiments, the compounds or compositions disclosed herein further comprise a pharmaceutically acceptable carrier or diluent.

In any of the foregoing methods or uses, the compound or composition comprises or consists of a modified oligonucleotide 12 to 30 linked nucleosides in length or 16 to 30 linked nucleosides in length, wherein the modified oligonucleotide comprises:
 a gap segment consisting of linked 2'-deoxynucleosides;
 a 5' wing segment consisting of linked nucleosides; and
 a 3' wing segment consisting of linked nucleosides;
  wherein the gap segment is positioned between the 5' wing segment and the 3' wing segment and wherein each nucleoside of each wing segment comprises a modified sugar.

In any of the foregoing methods or uses, the compound or composition can be administered parenterally. For example, in certain embodiments the compound or composition can be administered through injection or infusion. Parenteral administration includes subcutaneous administration, intravenous administration, intramuscular administration, intraarterial administration, intraperitoneal administration, or intracranial administration. In certain embodiments, the parenteral administration is subcutaneous administration. In certain embodiments, the compound or composition is co-administered with a second agent. In certain embodiments, the compound or composition and the second agent are administered concomitantly.

Certain Compounds

In certain embodiments, compounds described herein are antisense compounds. In certain embodiments, the antisense compound comprises or consists of an oligomeric compound. In certain embodiments, the oligomeric compound comprises a modified oligonucleotide. In certain embodiments, the modified oligonucleotide has a nucleobase sequence complementary to that of a target nucleic acid.

In certain embodiments, a compound described herein comprises or consists of a modified oligonucleotide. In certain embodiments, the modified oligonucleotide has a nucleobase sequence complementary to that of a target nucleic acid.

In certain embodiments, a compound or antisense compound is single-stranded. Such a single-stranded compound or antisense compound comprises or consists of an oligomeric compound. In certain embodiments, such an oligomeric compound comprises or consists of an oligonucleotide. In certain embodiments, the oligonucleotide is an antisense oligonucleotide. In certain embodiments, the oligonucleotide is modified. In certain embodiments, the oligonucleotide of a single-stranded antisense compound or oligomeric compound comprises a self-complementary nucleobase sequence.

In certain embodiments, compounds are double-stranded. Such double-stranded compounds comprise a first modified oligonucleotide having a region complementary to a target nucleic acid and a second modified oligonucleotide having a region complementary to the first modified oligonucleotide. In certain embodiments, the modified oligonucleotide is an RNA oligonucleotide. In such embodiments, the thymine nucleobase in the modified oligonucleotide is replaced by a uracil nucleobase. In certain embodiments, compound comprises a conjugate group. In certain embodiments, each modified oligonucleotide is 12-30 linked nucleosides in length.

In certain embodiments, compounds are double-stranded. Such double-stranded compounds comprise a first oligomeric compound having a region complementary to a target nucleic acid and a second oligomeric compound having a region complementary to the first oligomeric compound. The first oligomeric compound of such double stranded compounds typically comprises or consists of a modified oligonucleotide. The oligonucleotide of the second oligomeric compound of such double-stranded compound may be modified or unmodified. The oligomeric compounds of double-stranded compounds may include non-complementary overhanging nucleosides.

Examples of single-stranded and double-stranded compounds include but are not limited to oligonucleotides, siRNAs, microRNA targeting oligonucleotides, and single-stranded RNAi compounds, such as small hairpin RNAs (shRNAs), single-stranded siRNAs (ssRNAs), and microRNA mimics.

In certain embodiments, a compound described herein has a nucleobase sequence that, when written in the 5' to 3' direction, comprises the reverse complement of the target segment of a target nucleic acid to which it is targeted.

In certain embodiments, a compound described herein comprises an oligonucleotide 10 to 30 linked subunits in length. In certain embodiments, compound described herein comprises an oligonucleotide is 12 to 30 linked subunits in length. In certain embodiments, compound described herein comprises an oligonucleotide is 12 to 22 linked subunits in length. In certain embodiments, compound described herein comprises an oligonucleotide is 14 to 30 linked subunits in length. In certain embodiments, compound described herein comprises an oligonucleotide is 14 to 20 linked subunits in length. In certain embodiments, compound described herein comprises an oligonucleotide is 15 to 30 linked subunits in length. In certain embodiments, compound described herein comprises an oligonucleotide is 15 to 20 linked subunits in length. In certain embodiments, compound described herein comprises an oligonucleotide is 16 to 30 linked subunits in length. In certain embodiments, compound described herein comprises an oligonucleotide is 16 to 20 linked subunits in length. In certain embodiments, compound described herein comprises an oligonucleotide is 17 to 30 linked subunits in length. In certain embodiments, compound described herein comprises an oligonucleotide is 17 to 20 linked subunits in length. In certain embodiments, compound described herein comprises an oligonucleotide is 18 to 30 linked subunits in length. In certain embodiments, compound described herein comprises an oligonucleotide is 18 to 21 linked subunits in length. In certain embodiments, compound described herein comprises an oligonucleotide is 18 to 20 linked subunits in length. In certain embodiments, compound described herein comprises an oligonucleotide is 20 to 30 linked subunits in length. In other words, such oligonucleotides are from 12 to 30 linked subunits, 14 to 30 linked subunits, 14 to 20 subunits, 15 to 30 subunits, 15 to 20 subunits, 16 to 30 subunits, 16 to 20 subunits, 17 to 30 subunits, 17 to 20 subunits, 18 to 30 subunits, 18 to 20 subunits, 18 to 21 subunits, 20 to 30 subunits, or 12 to 22 linked subunits, respectively. In certain embodiments, a compound described herein comprises an oligonucleotide 14 linked subunits in length. In certain embodiments, a compound described herein comprises an oligonucleotide 16 linked subunits in length. In certain embodiments, a compound described herein comprises an oligonucleotide 17 linked subunits in length. In certain embodiments, compound described herein comprises an oligonucleotide 18 linked subunits in length. In certain embodiments, a compound described herein comprises an oligonucleotide 19 linked subunits in length. In certain embodiments, a compound described herein comprises an oligonucleotide 20 linked subunits in length. In other embodiments, a compound described herein comprises an oligonucleotide 8 to 80, 12 to 50, 13 to 30, 13 to 50, 14 to 30, 14 to 50, 15 to 30, 15 to 50, 16 to 30, 16 to 50, 17 to 30, 17 to 50, 18 to 22, 18 to 24, 18 to 30, 18 to 50, 19 to 22, 19 to 30, 19 to 50, or 20 to 30 linked subunits. In certain such embodiments, the compound described herein comprises an oligonucleotide 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 linked subunits in length, or a range defined by any two of the above values. In some embodiments the linked subunits are nucleotides, nucleosides, or nucleobases.

In certain embodiments, compounds may be shortened or truncated. For example, a single subunit may be deleted from the 5' end (5' truncation), or alternatively from the 3' end (3' truncation). A shortened or truncated compound targeted to a TPO nucleic acid may have two subunits deleted from the 5' end, or alternatively may have two subunits deleted from the 3' end, of the compound. Alternatively, the deleted nucleosides may be dispersed throughout the compound.

When a single additional subunit is present in a lengthened compound, the additional subunit may be located at the 5' or 3' end of the compound. When two or more additional subunits are present, the added subunits may be adjacent to each other, for example, in a compound having two subunits added to the 5' end (5' addition), or alternatively to the 3' end (3' addition), of the compound. Alternatively, the added subunits may be dispersed throughout the compound.

It is possible to increase or decrease the length of a compound, such as an oligonucleotide, and/or introduce mismatch bases without eliminating activity (Woolf et al. (Proc. Natl. Acad. Sci. USA 89:7305-7309, 1992; Gautschi et al. *J. Natl. Cancer Inst.* 93:463-471, March 2001; Maher and Dolnick *Nuc. Acid. Res.* 16:3341-3358, 1988). However, seemingly small changes in oligonucleotide sequence, chemistry and motif can make large differences in one or more of the many properties required for clinical development (Seth et al. *J. Med. Chem.* 2009, 52, 10; Egli et al. *J. Am. Chem. Soc.* 2011, 133, 16642).

In certain embodiments, compounds described herein are interfering RNA compounds (RNAi), which include double-stranded RNA compounds (also referred to as short-interfering RNA or siRNA) and single-stranded RNAi compounds (or ssRNA). Such compounds work at least in part through the RISC pathway to degrade and/or sequester a target nucleic acid (thus, include microRNA/microRNA-mimic compounds). As used herein, the term siRNA is meant to be equivalent to other terms used to describe nucleic acid molecules that are capable of mediating sequence specific RNAi, for example short interfering RNA (siRNA), double-stranded RNA (dsRNA), micro-RNA (miRNA), short hairpin RNA (shRNA), short interfering oligonucleotide, short interfering nucleic acid, short interfering modified oligonucleotide, chemically modified siRNA, post-transcriptional gene silencing RNA (ptgsRNA), and others. In addition, as used herein, the term RNAi is meant to be equivalent to other terms used to describe sequence specific RNA interference, such as post transcriptional gene silencing, translational inhibition, or epigenetics.

In certain embodiments, a double-stranded compound comprises a first strand comprising the nucleobase sequence complementary to a target region of a TPO nucleic acid and a second strand. In certain embodiments, the double-stranded compound comprises ribonucleotides in which the first strand has uracil (U) in place of thymine (T) and is complementary to a target region. In certain embodiments, a double-stranded compound comprises (i) a first strand comprising a nucleobase sequence complementary to a target region of a TPO nucleic acid, and (ii) a second strand. In certain embodiments, the double-stranded compound comprises one or more modified nucleotides in which the 2' position in the sugar contains a halogen (such as fluorine group; 2'-F) or contains an alkoxy group (such as a methoxy group; 2'-OMe). In certain embodiments, the double-stranded compound comprises at least one 2'-F sugar modification and at least one 2'-OMe sugar modification. In certain embodiments, the at least one 2'-F sugar modification and at least one 2'-OMe sugar modification are arranged in an alternating pattern for at least 2, 3, 4, 5, 6, 7, 8, 9, 10, 11, 12, 13, 14, 15, 16, 17, 18, 19, or 20 contiguous nucleobases along a strand of the dsRNA compound. In certain embodiments, the double-stranded compound comprises one or more linkages between adjacent nucleotides other than a naturally-occurring phosphodiester linkage. Examples of such linkages include phosphoramide, phosphorothioate, and phosphorodithioate linkages. The double-stranded compounds may also be chemically modified nucleic acid molecules as taught in U.S. Pat. No. 6,673,661. In other embodiments, the dsRNA contains one or two capped strands, as disclosed, for example, by WO 00/63364, filed Apr. 19, 2000. In certain embodiments, the first strand of the double-stranded compound is an siRNA guide strand and the second strand of the double-stranded compound is an siRNA passenger strand. In certain embodiments, the second strand of the double-stranded compound is complementary to the first strand. In certain embodiments, each strand of the double-stranded compound consists of 16, 17, 18, 19, 20, 21, 22, or 23 linked nucleosides.

In certain embodiments, a single-stranded compound described herein can comprise any of the oligonucleotide sequences targeted to TPO described herein. In certain embodiments, such a single-stranded compound is a single-stranded RNAi (ssRNAi) compound. In certain embodiments, a ssRNAi compound comprises the nucleobase sequence complementary to a target region of a TPO nucleic acid. In certain embodiments, the ssRNAi compound comprises ribonucleotides in which uracil (U) is in place of thymine (T). In certain embodiments, ssRNAi compound comprises a nucleobase sequence complementary to a target region of a TPO nucleic acid. In certain embodiments, a ssRNAi compound comprises one or more modified nucleotides in which the 2' position in the sugar contains a halogen (such as fluorine group; 2'-F) or contains an alkoxy group (such as a methoxy group; 2'-OMe). In certain embodiments, a ssRNAi compound comprises at least one 2'-F sugar modification and at least one 2'-OMe sugar modification. In certain embodiments, the at least one 2'-F sugar modification and at least one 2'-OMe sugar modification are arranged in an alternating pattern for at least 2, 3, 4, 5, 6, 7, 8, 9, 10, 11, 12, 13, 14, 15, 16, 17, 18, 19, or 20 contiguous nucleobases along a strand of the ssRNAi compound. In certain embodiments, the ssRNAi compound comprises one or more linkages between adjacent nucleotides other than a naturally-occurring phosphodiester linkage. Examples of such linkages include phosphoramide, phosphorothioate, and phosphorodithioate linkages. The ssRNAi compounds may also be chemically modified nucleic acid molecules as taught in U.S. Pat. No. 6,673,661. In other embodiments, the ssRNAi contains a capped strand, as disclosed, for example, by WO 00/63364, filed Apr. 19, 2000. In certain embodiments, the ssRNAi compound consists of 16, 17, 18, 19, 20, 21, 22, or 23 linked nucleosides.

In certain embodiments, compounds described herein comprise modified oligonucleotides. Certain modified oligonucleotides have one or more asymmetric center and thus give rise to enantiomers, diastereomers, and other stereoisomeric configurations that may be defined, in terms of absolute stereochemistry, as (R) or(S), as α or β such as for sugar anomers, or as (D) or (L) such as for amino acids etc. Included in the modified oligonucleotides provided herein are all such possible isomers, including their racemic and optically pure forms, unless specified otherwise. Likewise, all cis- and trans-isomers and tautomeric forms are also included.

Certain Mechanisms

In certain embodiments, compounds described herein comprise or consist of modified oligonucleotides. In certain embodiments, compounds described herein are antisense compounds. In certain embodiments, such antisense compounds comprise oligomeric compounds. In certain embodiments, compounds described herein are capable of hybridizing to a target nucleic acid, resulting in at least one antisense activity. In certain embodiments, compounds described herein selectively affect one or more target nucleic acid. Such selective compounds comprise a nucleobase sequence that hybridizes to one or more target nucleic acid, resulting in one or more desired antisense activity and does not hybridize to one or more non-target nucleic acid or does not hybridize to one or more non-target nucleic acid in such a way that results in a significant undesired antisense activity.

In certain antisense activities, hybridization of a compound described herein to a target nucleic acid results in recruitment of a protein that cleaves the target nucleic acid. For example, certain compounds described herein result in RNase H mediated cleavage of the target nucleic acid. RNase H is a cellular endonuclease that cleaves the RNA strand of an RNA:DNA duplex. The DNA in such an RNA:DNA duplex need not be unmodified DNA. In certain embodiments, compounds described herein are sufficiently "DNA-like" to elicit RNase H activity. Further, in certain embodiments, one or more non-DNA-like nucleoside in the gap of a gapmer is tolerated.

In certain antisense activities, compounds described herein or a portion of the compound is loaded into an RNA-induced silencing complex (RISC), ultimately resulting in cleavage of the target nucleic acid. For example, certain compounds described herein result in cleavage of the target nucleic acid by Argonaute. Compounds that are loaded into RISC are RNAi compounds. RNAi compounds may be double-stranded (siRNA) or single-stranded (ssRNA).

In certain embodiments, hybridization of compounds described herein to a target nucleic acid does not result in recruitment of a protein that cleaves that target nucleic acid. In certain such embodiments, hybridization of the compound to the target nucleic acid results in alteration of splicing of the target nucleic acid. In certain embodiments, hybridization of the compound to a target nucleic acid results in inhibition of a binding interaction between the target nucleic acid and a protein or other nucleic acid. In certain such embodiments, hybridization of the compound to a target nucleic acid results in alteration of translation of the target nucleic acid.

Antisense activities may be observed directly or indirectly. In certain embodiments, observation or detection of an antisense activity involves observation or detection of a change in an amount of a target nucleic acid or protein encoded by such target nucleic acid, a change in the ratio of splice variants of a nucleic acid or protein, and/or a phenotypic change in a cell or individual.

Target Nucleic Acids, Target Regions and Nucleotide Sequences

In certain embodiments, compounds described herein comprise or consist of an oligonucleotide comprising a region that is complementary to a TPO nucleic acid. In certain embodiments, the target nucleic acid is an endogenous RNA molecule. In certain embodiments, the target nucleic acid encodes a protein. In certain such embodiments, the target nucleic acid is selected from: an mRNA and a pre-mRNA, including intronic, exonic and untranslated regions. In certain embodiments, the target RNA is an mRNA. In certain embodiments, the target nucleic acid is a pre-mRNA.

In certain embodiments, the target nucleic acid has a nucleotide sequence that encodes a TPO protein. In certain embodiments, the target nucleic acid is encoded by THPO. In certain embodiments, the target nucleic acid is encoded by human THPO. SEQ ID NO: 232 is a representative sequence of human THPO. Nucleotide sequences that encode TPO include, without limitation, the following: RefSEQ Nos. NT_082359_TRUNC_357491_368345 (incorporated by reference, disclosed herein as SEQ ID NO: 1) and NM_009379.3 (incorporated by reference, disclosed herein as SEQ ID NO: 2), NM_000460.3 (incorporated by reference, disclosed herein as SEQ ID NO: 231), NC_000003.12_TRUNC_184369001_184383000_COMP (incorporated by reference, disclosed herein as SEQ ID NO: 232).

One of skill in the art understands that there is natural variation in a species population and that the foregoing reference sequence numbers (RefSEQ Nos.) are representative sequences. Nucleotide sequences that encode TPO include, without limitation, sequences that are at least 90%, at least 92%, at least 94%, at least 96%, at least 98%, at least 99%, at least 99.5%, or at least 99.9% identical to the foregoing reference sequence numbers.

Hybridization

In some embodiments, hybridization occurs between a compound disclosed herein and a TPO nucleic acid. The most common mechanism of hybridization involves hydrogen bonding (e.g., Watson-Crick, Hoogsteen or reversed Hoogsteen hydrogen bonding) between complementary nucleobases of the nucleic acid molecules.

Hybridization can occur under varying conditions. Hybridization conditions are sequence-dependent and are determined by the nature and composition of the nucleic acid molecules to be hybridized.

Methods of determining whether a sequence is specifically hybridizable to a target nucleic acid are well known in the art. In certain embodiments, the compounds provided herein are specifically hybridizable with a TPO nucleic acid.

Complementarity

An oligonucleotide is said to be complementary to another nucleic acid when the nucleobase sequence of such oligonucleotide or one or more regions thereof matches the nucleobase sequence of another oligonucleotide or nucleic acid or one or more regions thereof when the two nucleobase sequences are aligned in opposing directions. Nucleobase matches or complementary nucleobases, as described herein, are limited to adenine (A) and thymine (T), adenine (A) and uracil (U), cytosine (C) and guanine (G), and 5-methyl cytosine (mC) and guanine (G) unless otherwise specified. Complementary oligonucleotides and/or nucleic acids need not have nucleobase complementarity at each nucleoside and may include one or more nucleobase mismatches. An oligonucleotide is fully complementary or 100% complementary when such oligonucleotides have nucleobase matches at each nucleoside without any nucleobase mismatches.

In certain embodiments, compounds described herein comprise or consist of modified oligonucleotides. In certain embodiments, compounds described herein are antisense compounds. In certain embodiments, compounds comprise oligomeric compounds. Non-complementary nucleobases between a compound and a TPO nucleic acid may be tolerated provided that the compound remains able to specifically hybridize to a target nucleic acid. Moreover, a compound may hybridize over one or more segments of a TPO nucleic acid such that intervening or adjacent segments are not involved in the hybridization event (e.g., a loop structure, mismatch or hairpin structure).

In certain embodiments, the compounds provided herein, or a specified portion thereof, are, or are at least, 70%, 80%, 85%, 86%, 87%, 88%, 89%, 90%, 91%, 92%, 93%, 94%, 95%, 96%, 97%, 98%, 99%, or 100% complementary to a TPO nucleic acid, a target region, target segment, or specified portion thereof. Percent complementarity of a compound with a target nucleic acid can be determined using routine methods.

For example, a compound in which 18 of 20 nucleobases of the compound are complementary to a target region, and would therefore specifically hybridize, would represent 90 percent complementarity. In this example, the remaining non-complementary nucleobases may be clustered or interspersed with complementary nucleobases and need not be contiguous to each other or to complementary nucleobases. As such, a compound which is 18 nucleobases in length having four non-complementary nucleobases which are flanked by two regions of complete complementarity with the target nucleic acid would have 77.8% overall complementarity with the target nucleic acid and would thus fall within the scope of the present invention. Percent complementarity of a compound with a region of a target nucleic acid can be determined routinely using BLAST programs (basic local alignment search tools) and PowerBLAST programs known in the art (Altschul et al., *J. Mol. Biol.*, 1990, 215, 403 410; Zhang and Madden, Genome Res., 1997, 7, 649 656). Percent homology, sequence identity or complementarity, can be determined by, for example, the Gap program (Wisconsin Sequence Analysis Package, Version 8 for Unix, Genetics Computer Group, University Research Park, Madison Wis.), using default settings, which uses the algorithm of Smith and Waterman (Adv. Appl. Math., 1981, 2, 482 489).

In certain embodiments, compounds described herein, or specified portions thereof, are fully complementary (i.e. 100% complementary) to a target nucleic acid, or specified portion thereof. For example, a compound may be fully complementary to a TPO nucleic acid, or a target region, or a target segment or target sequence thereof. As used herein, "fully complementary" means each nucleobase of a compound is capable of precise base pairing with the corresponding nucleobases of a target nucleic acid. For example, a 20 nucleobase compound is fully complementary to a target sequence that is 400 nucleobases long, so long as there is a corresponding 20 nucleobase portion of the target nucleic acid that is fully complementary to the compound. Fully complementary can also be used in reference to a specified portion of the first and/or the second nucleic acid. For example, a 20 nucleobase portion of a 30 nucleobase compound can be "fully complementary" to a target sequence that is 400 nucleobases long. The 20 nucleobase portion of the 30 nucleobase compound is fully complementary to the target sequence if the target sequence has a corresponding 20 nucleobase portion wherein each nucleobase is complementary to the 20 nucleobase portion of the compound. At the same time, the entire 30 nucleobase compound may or may not be fully complementary to the target sequence, depending on whether the remaining 10 nucleobases of the compound are also complementary to the target sequence.

In certain embodiments, compounds described herein comprise one or more mismatched nucleobases relative to the target nucleic acid. In certain such embodiments, antisense activity against the target is reduced by such mismatch, but activity against a non-target is reduced by a greater amount. Thus, in certain such embodiments selectivity of the compound is improved. In certain embodiments, the mismatch is specifically positioned within an oligonucleotide having a gapmer motif. In certain such embodiments, the mismatch is at position 1, 2, 3, 4, 5, 6, 7, or 8 from the 5'-end of the gap region. In certain such embodiments, the mismatch is at position 9, 8, 7, 6, 5, 4, 3, 2, 1 from the 3'-end of the gap region. In certain such embodiments, the mismatch is at position 1, 2, 3, or 4 from the 5'-end of the wing region. In certain such embodiments, the mismatch is at position 4, 3, 2, or 1 from the 3'-end of the wing region. In certain embodiments, the mismatch is specifically positioned within an oligonucleotide not having a gapmer motif. In certain such embodiments, the mismatch is at position 1, 2, 3, 4, 5, 6, 7, 8, 9, 10, 11, or 12 from the 5'-end of the oligonucleotide. In certain such embodiments, the mismatch is at position, 2, 3, 4, 5, 6, 7, 8, 9, 10, 11, or 12 from the 3'-end of the oligonucleotide.

The location of a non-complementary nucleobase may be at the 5' end or 3' end of the compound. Alternatively, the non-complementary nucleobase or nucleobases may be at an internal position of the compound. When two or more non-complementary nucleobases are present, they may be contiguous (i.e. linked) or non-contiguous. In one embodiment, a non-complementary nucleobase is located in the wing segment of a gapmer oligonucleotide.

In certain embodiments, compounds described herein that are, or are up to 11, 12, 13, 14, 15, 16, 17, 18, 19, or 20 nucleobases in length comprise no more than 4, no more than 3, no more than 2, or no more than 1 non-complementary nucleobase(s) relative to a target nucleic acid, such as a TPO nucleic acid, or specified portion thereof.

In certain embodiments, compounds described herein that are, or are up to 11, 12, 13, 14, 15, 16, 17, 18, 19, 20, 21, 22, 23, 24, 25, 26, 27, 28, 29, or 30 nucleobases in length comprise no more than 6, no more than 5, no more than 4, no more than 3, no more than 2, or no more than 1 non-complementary nucleobase(s) relative to a target nucleic acid, such as a TPO nucleic acid, or specified portion thereof.

In certain embodiments, compounds described herein also include those which are complementary to a portion of a target nucleic acid. As used herein, "portion" refers to a defined number of contiguous (i.e. linked) nucleobases within a region or segment of a target nucleic acid. A "portion" can also refer to a defined number of contiguous nucleobases of a compound. In certain embodiments, the compounds are complementary to at least an 8 nucleobase portion of a target segment. In certain embodiments, the compounds are complementary to at least a 9 nucleobase portion of a target segment. In certain embodiments, the compounds are complementary to at least a 10 nucleobase portion of a target segment. In certain embodiments, the compounds are complementary to at least an 11 nucleobase portion of a target segment. In certain embodiments, the compounds are complementary to at least a 12 nucleobase portion of a target segment. In certain embodiments, the compounds are complementary to at least a 13 nucleobase portion of a target segment. In certain embodiments, the compounds are complementary to at least a 14 nucleobase portion of a target segment. In certain embodiments, the compounds are complementary to at least a 15 nucleobase portion of a target segment. In certain embodiments, the compounds are complementary to at least a 16 nucleobase portion of a target segment. Also contemplated are compounds that are complementary to at least a 9, 10, 11, 12, 13, 14, 15, 16, 17, 18, 19, 20, or more nucleobase portion of a target segment, or a range defined by any two of these values.

Identity

The compounds provided herein may also have a defined percent identity to a particular nucleotide sequence, SEQ ID NO, or compound represented by a specific Isis number, or portion thereof. In certain embodiments, compounds described herein are antisense compounds or oligomeric compounds. In certain embodiments, compounds described herein are modified oligonucleotides. As used herein, a compound is identical to the sequence disclosed herein if it has the same nucleobase pairing ability. For example, a RNA which contains uracil in place of thymidine in a disclosed DNA sequence would be considered identical to the DNA sequence since both uracil and thymidine pair with adenine. Shortened and lengthened versions of the compounds described herein as well as compounds having non-identical bases relative to the compounds provided herein also are contemplated. The non-identical bases may be adjacent to each other or dispersed throughout the compound. Percent identity of a compound is calculated according to the number of bases that have identical base pairing relative to the sequence to which it is being compared.

In certain embodiments, compounds described herein, or portions thereof, are, or are at least, 70%, 75%, 80%, 85%, 90%, 91%, 92%, 93%, 94%, 95%, 96%, 97%, 98%, 99% or 100% identical to one or more of the compounds or SEQ ID NOs, or a portion thereof, disclosed herein. In certain embodiments, compounds described herein are about 70%, 75%, 80%, 85%, 90%, 91%, 92%, 93%, 94%, 95%, 96%, 97%, 98%, or 99% identical, or any percentage between such values, to a particular nucleotide sequence, SEQ ID NO, or compound represented by a specific Isis number, or portion thereof, in which the compounds comprise an oligonucleotide having one or more mismatched nucleobases. In certain such embodiments, the mismatch is at position 1, 2, 3, 4, 5, 6, 7, 8, 9, 10, 11, or 12 from the 5'-end of the oligonucleotide. In certain such embodiments, the mismatch is at position 2, 3, 4, 5, 6, 7, 8, 9, 10, 11, or 12 from the 3'-end of the oligonucleotide.

In certain embodiments, compounds described herein are antisense compounds. In certain embodiments, a portion of the compound is compared to an equal length portion of the target nucleic acid. In certain embodiments, an 8, 9, 10, 11, 12, 13, 14, 15, 16, 17, 18, 19, 20, 21, 22, 23, 24, or 25 nucleobase portion is compared to an equal length portion of the target nucleic acid.

In certain embodiments, compounds described herein are oligonucleotides. In certain embodiments, a portion of the oligonucleotide is compared to an equal length portion of the target nucleic acid. In certain embodiments, an 8, 9, 10, 11, 12, 13, 14, 15, 16, 17, 18, 19, 20, 21, 22, 23, 24, or 25 nucleobase portion is compared to an equal length portion of the target nucleic acid.

Certain Modified Compounds

In certain embodiments, compounds described herein comprise or consist of oligonucleotides consisting of linked nucleosides. Oligonucleotides may be unmodified oligonucleotides (RNA or DNA) or may be modified oligonucleotides. Modified oligonucleotides comprise at least one modification relative to unmodified RNA or DNA (i.e., comprise at least one modified nucleoside (comprising a modified sugar moiety and/or a modified nucleobase) and/or at least one modified internucleoside linkage).

A. Modified Nucleosides

Modified nucleosides comprise a modified sugar moiety or a modified nucleobase or both a modified sugar moiety and a modified nucleobase.

1. Modified Sugar Moieties

In certain embodiments, sugar moieties are non-bicyclic modified sugar moieties. In certain embodiments, modified sugar moieties are bicyclic or tricyclic sugar moieties. In certain embodiments, modified sugar moieties are sugar surrogates. Such sugar surrogates may comprise one or more substitutions corresponding to those of other types of modified sugar moieties.

In certain embodiments, modified sugar moieties are non-bicyclic modified sugar moieties comprising a furanosyl ring with one or more acyclic substituent, including but not limited to substituents at the 2', 4', and/or 5' positions. In certain embodiments one or more acyclic substituent of non-bicyclic modified sugar moieties is branched. Examples of 2'-substituent groups suitable for non-bicyclic modified sugar moieties include but are not limited to: 2'-F, 2'-OCH$_3$ ("OMe" or "O-methyl"), and 2'-O(CH$_2$)$_2$OCH$_3$ ("MOE"). In certain embodiments, 2'-substituent groups are selected from among: halo, allyl, amino, azido, SH, CN, OCN, CF$_3$, OCF$_3$, O—C$_1$-C$_{10}$ alkoxy, O—C$_1$-C$_{10}$ substituted alkoxy, O—C$_1$-C$_{10}$ alkyl, O—C$_1$-C$_{10}$ substituted alkyl, S-alkyl, N(R$_m$)-alkyl, O-alkenyl, S-alkenyl, N(R$_m$)-alkenyl, O-alkynyl, S-alkynyl, N(R$_m$)-alkynyl, O-alkylenyl-O-alkyl, alkynyl, alkaryl, aralkyl, O-alkaryl, O-aralkyl, O(CH$_2$)$_2$SCH$_3$, O(CH$_2$)$_2$ON(R$_m$)(R$_n$) or OCH$_2$C(=O)—N(R$_m$)(R$_n$), where each R$_m$ and R$_n$ is, independently, H, an amino protecting group, or substituted or unsubstituted C$_1$-C$_{10}$ alkyl, and the 2'-substituent groups described in Cook et al., U.S. Pat. No. 6,531,584; Cook et al., U.S. Pat. No. 5,859,221; and Cook et al., U.S. Pat. No. 6,005,087. Certain embodiments of these 2'-substituent groups can be further substituted with one or more substituent groups independently selected from among: hydroxyl, amino, alkoxy, carboxy, benzyl, phenyl, nitro (NO$_2$), thiol, thioalkoxy, thioalkyl, halogen, alkyl, aryl, alkenyl and alkynyl. Examples of 4'-substituent groups suitable for linearly non-bicyclic modified sugar moieties include but are not limited to alkoxy (e.g., methoxy), alkyl, and those described in Manoharan et al., WO 2015/106128. Examples of 5'-substituent groups suitable for non-bicyclic modified sugar moieties include but are not limited to: 5'-methyl (R or S), 5'-vinyl, and 5'-methoxy. In certain embodiments, non-bicyclic modified sugars comprise more than one non-bridging sugar substituent, for example, 2'-F-5'-methyl sugar moieties and the modified sugar moieties and modified nucleosides described in Migawa et al., WO 2008/101157 and Rajeev et al., US2013/0203836.

In certain embodiments, a 2'-substituted nucleoside or 2'-non-bicyclic modified nucleoside comprises a sugar moiety comprising a linear 2'-substituent group selected from: F, NH$_2$, N$_3$, OCF$_3$, OCH$_3$, O(CH$_2$)$_3$NH$_2$, CH$_2$CH=CH$_2$, OCH$_2$CH=CH$_2$, OCH$_2$CH$_2$OCH$_3$, O(CH$_2$)$_2$SCH$_3$, O(CH$_2$)$_2$ON(R$_m$)(R$_n$), O(CH$_2$)$_2$O(CH$_2$)$_2$N(CH$_3$)$_2$, and N-substituted acetamide (OCH$_2$C(=O)—N(R$_m$)(R$_n$)), where each R$_m$ and R$_n$ is, independently, H, an amino protecting group, or substituted or unsubstituted C$_1$-C$_{10}$ alkyl.

In certain embodiments, a 2'-substituted nucleoside or 2'-non-bicyclic modified nucleoside comprises a sugar moiety comprising a linear 2'-substituent group selected from: F, OCF$_3$, OCH$_3$, OCH$_2$CH$_2$OCH$_3$, O(CH$_2$)$_2$SCH$_3$, O(CH$_2$)$_2$ON(CH$_3$)$_2$, O(CH$_2$)$_2$O(CH$_2$)$_2$N(CH$_3$)$_2$, and OCH$_2$C(=O)—N(H)CH$_3$ ("NMA").

In certain embodiments, a 2'-substituted nucleoside or 2'-non-bicyclic modified nucleoside comprises a sugar moiety comprising a linear 2'-substituent group selected from: F, OCH$_3$, and OCH$_2$CH$_2$OCH$_3$.

Nucleosides comprising modified sugar moieties, such as non-bicyclic modified sugar moieties, are referred to by the position(s) of the substitution(s) on the sugar moiety of the nucleoside. For example, nucleosides comprising 2'-substituted or 2-modified sugar moieties are referred to as 2'-substituted nucleosides or 2-modified nucleosides.

Certain modified sugar moieties comprise a bridging sugar substituent that forms a second ring resulting in a bicyclic sugar moiety. In certain such embodiments, the bicyclic sugar moiety comprises a bridge between the 4' and the 2' furanose ring atoms. Examples of such 4' to 2' bridging sugar substituents include but are not limited to: 4'-CH$_2$-2', 4'-(CH$_2$)$_2$-2', 4'-(CH$_2$)$_3$-2', 4'-CH$_2$—O-2' ("LNA"), 4'-CH$_2$—S-2', 4'-(CH$_2$)$_2$—O-2' ("ENA"), 4'-CH(CH$_3$)—O-2' (referred to as "constrained ethyl" or "cEt" when in the S configuration), 4'-CH$_2$—O—CH$_2$-2', 4'-CH$_2$—N(R)-2', 4'-CH(CH$_2$OCH$_3$)—O-2' ("constrained MOE" or "cMOE") and analogs thereof (see, e.g., Seth et al., U.S. Pat. No. 7,399,845, Bhat et al., U.S. Pat. No. 7,569,686, Swayze et al., U.S. 7,741,457, and Swayze et al., U.S. Pat. No. 8,022,193), 4'-C(CH$_3$)(CH$_3$)—O-2' and analogs thereof (see, e.g., Seth et al., U.S. Pat. No. 8,278,283), 4'-CH$_2$—N(OCH$_3$)-2' and analogs thereof (see, e.g., Prakash et al., U.S. Pat. No. 8,278,425), 4'-CH$_2$—O—N(CH$_3$)-2' (see, e.g., Allerson et al., U.S. Pat. No. 7,696,345 and Allerson et al., U.S. Pat. No. 8,124,745), 4'-CH$_2$—C(H)(CH$_3$)-2' (see, e.g., Zhou, et al., J. Org. Chem., 2009, 74, 118-134), 4'-CH$_2$—C(=CH$_2$)-2' and analogs thereof (see e.g., Seth et al., U.S. Pat. No. 8,278,426), 4'-C(R$_a$R$_b$)—N(R)—O-2', 4'-C(R$_a$R$_b$)—O—N(R)-2', 4'-CH$_2$—O—N(R)-2', and 4'-CH$_2$—N(R)—O-2', wherein each R, R$_a$, and R$_b$ is, independently, H, a protecting group, or C$_1$-C$_{12}$ alkyl (see, e.g. Imanishi et al., U.S. Pat. No. 7,427,672).

In certain embodiments, such 4' to 2' bridges independently comprise from 1 to 4 linked groups independently selected from: —[C(R$_a$)(R$_b$)]$_n$—, —[C(R$_a$)(R$_b$)]$_n$—O—, —C(R$_a$)—C(R$_b$)—, —C(R$_a$)=N—, —C(=NR$_a$)—, —C(=O)—, —C(=S)—, —O—, —Si(R$_a$)$_2$—, —S(=O)$_x$—, and —N(R$_a$)—;

wherein:

x is 0, 1, or 2;

n is 1, 2, 3, or 4; and each R$_a$ and R$_b$ is, independently, H, a protecting group, hydroxyl, C$_1$-C$_{12}$ alkyl, substituted C$_1$-C$_{12}$ alkyl, C$_2$-C$_{12}$ alkenyl, substituted C$_2$-C$_{12}$ alkenyl, C$_2$-C$_{12}$ alkynyl, substituted $C_2$-$C_{12}$ alkynyl, $C_5$-$C_{20}$ aryl, substituted $C_5$-$C_{20}$ aryl, heterocycle radical, substituted heterocycle radical, heteroaryl, substituted heteroaryl, $C_5$-$C_7$ alicyclic radical, substituted $C_5$-$C_7$ alicyclic radical, halogen, $OJ_1$, $NJ_1J_2$, $SJ_1$, $N_3$, $COOJ_1$, acyl (C(=O)—H), substituted acyl, CN, sulfonyl (S(=O)$_2$-$J_1$), or sulfoxyl (S(=O)-$J_1$); and each $J_1$ and $J_2$ is, independently, H, $C_1$-$C_{12}$ alkyl, substituted $C_1$-$C_{12}$ alkyl, $C_2$-$C_{12}$ alkenyl, substituted $C_2$-$C_{12}$ alkenyl, $C_2$-$C_{12}$ alkynyl, substituted $C_2$-$C_{12}$ alkynyl, $C_5$-$C_{20}$ aryl, substituted $C_5$-$C_{20}$ aryl, acyl (C(=O)—H), substituted acyl, a heterocycle radical, a substituted heterocycle radical, $C_1$-$C_{12}$ aminoalkyl, substituted $C_1$-$C_{12}$ aminoalkyl, or a protecting group.

Additional bicyclic sugar moieties are known in the art, see, for example: Freier et al., *Nucleic Acids Research*, 1997, 25 (22), 4429-4443, Albaek et al., *J. Org. Chem.*, 2006, 71, 7731-7740, Singh et al., *Chem. Commun.*, 1998, 4, 455-456; Koshkin et al., *Tetrahedron*, 1998, 54, 3607-3630; Wahlestedt et al., *Proc. Natl. Acad. Sci. U.S.A.*, 2000, 97, 5633-5638; Kumar et al., *Bioorg. Med. Chem. Lett.*, 1998, 8, 2219-2222; Singh et al., *J. Org. Chem.*, 1998, 63, 10035-10039; Srivastava et al., *J. Am. Chem. Soc.*, 20017, 129, 8362-8379; Elayadi et al., *Curr. Opinion Invens. Drugs*, 2001, 2, 558-561; Braasch et al., *Chem. Biol.*, 2001, 8, 1-7; Orum et al., *Curr. Opinion Mol. Ther.*, 2001, 3, 239-243; Wengel et al., U.S. Pat. No. 7,053,207, Imanishi et al., U.S. Pat. No. 6,268,490, Imanishi et al. U.S. Pat. No. 6,770,748, Imanishi et al., U.S. RE44,779; Wengel et al., U.S. Pat. No. 6,794,499, Wengel et al., U.S. Pat. No. 6,670,461; Wengel et al., U.S. Pat. No. 7,034,133, Wengel et al., U.S. Pat. No. 8,080,644; Wengel et al., U.S. Pat. No. 8,034,909; Wengel et al., U.S. Pat. No. 8,153,365; Wengel et al., U.S. Pat. No. 7,572,582; and Ramasamy et al., U.S. Pat. No. 6,525,191, Torsten et al., WO 2004/106356, Wengel et al., WO 91999/014226; Seth et al., WO 2007/134181; Seth et al., U.S. Pat. No. 7,547,684; Seth et al., U.S. Pat. No. 7,666,854; Seth et al., U.S. Pat. No. 8,088,746; Seth et al., U.S. Pat. No. 7,750,131; Seth et al., U.S. Pat. No. 8,030,467; Seth et al., U.S. Pat. No. 8,268,980; Seth et al., U.S. Pat. No. 8,546,556; Seth et al., U.S. Pat. No. 8,530,640; Migawa et al., U.S. Pat. No. 9,012,421; Seth et al., U.S. Pat. No. 8,501,805; and U.S. Patent Publication Nos. Allerson et al., US2008/0039618 and Migawa et al., US2015/0191727.

In certain embodiments, bicyclic sugar moieties and nucleosides incorporating such bicyclic sugar moieties are further defined by isomeric configuration. For example, an LNA nucleoside (described herein) may be in the α-L configuration or in the β-D configuration.

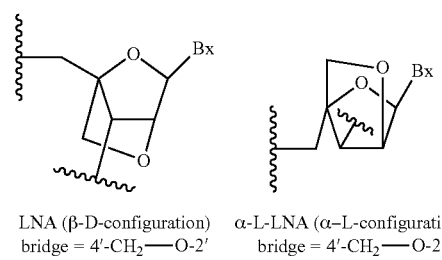

LNA (β-D-configuration)　α-L-LNA (α–L-configuration)
bridge = 4'-CH$_2$—O-2'　　bridge = 4'-CH$_2$—O-2'

α-L-methyleneoxy (4'-CH$_2$—O-2') or α-L-LNA bicyclic nucleosides have been incorporated into oligonucleotides that showed antisense activity (Frieden et al., *Nucleic Acids Research*, 2003, 21, 6365-6372). Herein, general descriptions of bicyclic nucleosides include both isomeric configurations. When the positions of specific bicyclic nucleosides (e.g., LNA or cEt) are identified in exemplified embodiments herein, they are in the β-D configuration, unless otherwise specified.

In certain embodiments, modified sugar moieties comprise one or more non-bridging sugar substituent and one or more bridging sugar substituent (e.g., 5'-substituted and 4'-2' bridged sugars).

In certain embodiments, modified sugar moieties are sugar surrogates. In certain such embodiments, the oxygen atom of the sugar moiety is replaced, e.g., with a sulfur, carbon or nitrogen atom. In certain such embodiments, such modified sugar moieties also comprise bridging and/or non-bridging substituents as described herein. For example, certain sugar surrogates comprise a 4'-sulfur atom and a substitution at the 2'-position (see, e.g., Bhat et al., U.S. Pat. No. 7,875,733 and Bhat et al., U.S. Pat. No. 7,939,677) and/or the 5' position.

In certain embodiments, sugar surrogates comprise rings having other than 5 atoms. For example, in certain embodiments, a sugar surrogate comprises a six-membered tetrahydropyran ("THP"). Such tetrahydropyrans may be further modified or substituted. Nucleosides comprising such modified tetrahydropyrans include but are not limited to hexitol nucleic acid ("HNA"), anitol nucleic acid ("ANA"), manitol nucleic acid ("MNA") (see e.g., Leumann, CJ. *Bioorg. & Med. Chem.* 2002, 10, 841-854), fluoro HNA:

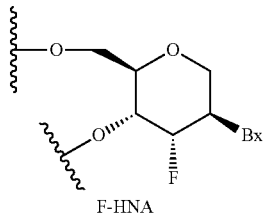

F-HNA ("F-HNA", see e.g., Swayze et al., U.S. Pat. No. 8,088,904; Swayze et al., U.S. Pat. No. 8,440,803; Swayze et al., U.S.; and Swayze et al., U.S. Pat. No. 9,005,906, F-HNA can also be referred to as a F-THP or 3'-fluoro tetrahydropyran), and nucleosides comprising additional modified THP compounds having the formula:

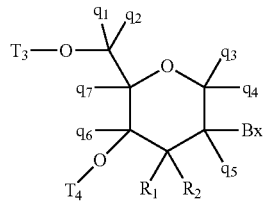

wherein, independently, for each of said modified THP nucleoside: Bx is a nucleobase moiety; $T_3$ and $T_4$ are each, independently, an internucleoside linking group linking the modified THP nucleoside to the remainder of an oligonucleotide or one of $T_3$ and $T_4$ is an internucleoside linking group linking the modified THP nucleoside to the remainder of an oligonucleotide and the other of $T_3$ and $T_4$ is H, a hydroxyl protecting group, a linked conjugate group, or a 5' or 3'-terminal group; $q_1$, $q_2$, $q_3$, $q_4$, $q_5$, $q_6$ and $q_7$ are each, independently, H, $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl; and each of R1 and R2 is independently selected from among: hydrogen, halogen, substituted or unsubstituted alkoxy, $NJ_1J_2$, $SJ_1$, $N_3$, $OC(=X)J_1$, $OC(=X)NJ_1J_2$, $NJ_3C(=X)NJ_1J_2$, and CN, wherein X is O, S or $NJ_1$, and each $J_1$, $J_2$, and $J_3$ is, independently, H or $C_1$-$C_6$ alkyl.

In certain embodiments, modified THP nucleosides are provided wherein $q_1$, $q_2$, $q_3$, $q_4$, $q_5$, $q_6$ and $q_7$ are each H. In certain embodiments, at least one of $q_1$, $q_2$, $q_3$, $q_4$, $q_5$, $q_6$ and $q_7$ is other than H. In certain embodiments, at least one of $q_1$, $q_2$, $q_3$, $q_4$, $q_5$, $q_6$ and $q_7$ is methyl. In certain embodiments, modified THP nucleosides are provided wherein one of $R_1$ and $R_2$ is F. In certain embodiments, $R_1$ is F and $R_2$ is H, in certain embodiments, $R_1$ is methoxy and $R_2$ is H, and in certain embodiments, $R_1$ is methoxyethoxy and $R_2$ is H.

In certain embodiments, sugar surrogates comprise rings having more than 5 atoms and more than one heteroatom. For example, nucleosides comprising morpholino sugar moieties and their use in oligonucleotides have been reported (see, e.g., Braasch et al., Biochemistry, 2002, 41, 4503-4510 and Summerton et al., U.S. Pat. No. 5,698,685; Summerton et al., U.S. Pat. No. 5,166,315; Summerton et al., U.S. Pat. No. 5,185,444; and Summerton et al., U.S. Pat. No. 5,034,506). As used here, the term "morpholino" means a sugar surrogate having the following structure:

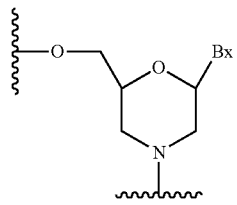

In certain embodiments, morpholinos may be modified, for example by adding or altering various substituent groups from the above morpholino structure. Such sugar surrogates are referred to herein as "modified morpholinos."

In certain embodiments, sugar surrogates comprise acyclic moieties. Examples of nucleosides and oligonucleotides comprising such acyclic sugar surrogates include but are not limited to: peptide nucleic acid ("PNA"), acyclic butyl nucleic acid (see, e.g., Kumar et al., Org. Biomol. Chem., 2013, 11, 5853-5865), and nucleosides and oligonucleotides described in Manoharan et al., WO2011/133876.

Many other bicyclic and tricyclic sugar and sugar surrogate ring systems are known in the art that can be used in modified nucleosides.

2. Modified Nucleobases

Nucleobase (or base) modifications or substitutions are structurally distinguishable from, yet functionally interchangeable with, naturally occurring or synthetic unmodified nucleobases. Both natural and modified nucleobases are capable of participating in hydrogen bonding. Such nucleobase modifications can impart nuclease stability, binding affinity or some other beneficial biological property to compounds described herein.

In certain embodiments, compounds described herein comprise modified oligonucleotides. In certain embodiments, modified oligonucleotides comprise one or more nucleoside comprising an unmodified nucleobase. In certain embodiments, modified oligonucleotides comprise one or more nucleoside comprising a modified nucleobase. In certain embodiments, modified oligonucleotides comprise one or more nucleoside that does not comprise a nucleobase, referred to as an abasic nucleoside.

In certain embodiments, modified nucleobases are selected from: 5-substituted pyrimidines, 6-azapyrimi-dines, alkyl or alkynyl substituted pyrimidines, alkyl substituted purines, and N-2, N-6 and O-6 substituted purines. In certain embodiments, modified nucleobases are selected from: 2-aminopropyladenine, 5-hydroxymethyl cytosine, 5-methylcytosine, xanthine, hypoxanthine, 2-aminoadenine, 6-N-methylguanine, 6-N-methyladenine, 2-propyladenine, 2-thiouracil, 2-thiothymine and 2-thiocytosine, 5-propynyl ($C\equiv C$—$CH_3$) uracil, 5-propynylcytosine, 6-azouracil, 6-azocytosine, 6-azothymine, 5-ribosyluracil (pseudouracil), 4-thiouracil, 8-halo, 8-amino, 8-thiol, 8-thioalkyl, 8-hydroxyl, 8-aza and other 8-substituted purines, 5-halo, particularly 5-bromo, 5-trifluoromethyl, 5-halouracil, and 5-halocytosine, 7-methylguanine, 7-methyladenine, 2-F-adenine, 2-aminoadenine, 7-deazaguanine, 7-deazaadenine, 3-deazaguanine, 3-deazaadenine, 6-N-benzoyladenine, 2-N-isobutyrylguanine, 4-N-benzoylcytosine, 4-N-benzoyluracil, 5-methyl 4-N-benzoylcytosine, 5-methyl 4-N-benzoyluracil, universal bases, hydrophobic bases, promiscuous bases, size-expanded bases, and fluorinated bases. Further modified nucleobases include tricyclic pyrimidines, such as 1,3-diazaphenoxazine-2-one, 1,3-diazaphenothiazine-2-one and 9-(2-aminoethoxy)-1,3-diazaphenoxazine-2-one (G-clamp). Modified nucleobases may also include those in which the purine or pyrimidine base is replaced with other heterocycles, for example 7-deaza-adenine, 7-deazaguanosine, 2-aminopyridine and 2-pyridone. Further nucleobases include those disclosed in Merigan et al., U.S. Pat. No. 3,687,808, those disclosed in The Concise Encyclopedia Of Polymer Science And Engineering, Kroschwitz, J. I., Ed., John Wiley & Sons, 1990, 858-859; Englisch et al., Angewandte Chemie, International Edition, 1991, 30, 613; Sanghvi, Y. S., Chapter 15, Antisense Research and Applications, Crooke, S. T. and Lebleu, B., Eds., CRC Press, 1993, 273-288; and those disclosed in Chapters 6 and 15, Antisense Drug Technology, Crooke S. T., Ed., CRC Press, 2008, 163-166 and 442-443.

Publications that teach the preparation of certain of the above noted modified nucleobases as well as other modified nucleobases include without limitation, Manoharan et al., US2003/0158403, Manoharan et al., US2003/0175906; Dinh et al., U.S. Pat. No. 4,845,205; Spielvogel et al., U.S. Pat. No. 5,130,302; Rogers et al., U.S. Pat. No. 5,134,066; Bischofberger et al., U.S. Pat. No. 5,175,273; Urdea et al., U.S. Pat. No. 5,367,066; Benner et al., U.S. Pat. No. 5,432,272; Matteucci et al., U.S. Pat. No. 5,434,257; Gmeiner et al., U.S. Pat. No. 5,457,187; Cook et al., U.S. Pat. No. 5,459,255; Froehler et al., U.S. Pat. No. 5,484,908; Matteucci et al., U.S. Pat. No. 5,502,177; Hawkins et al., U.S. Pat. No. 5,525,711; Haralambidis et al., U.S. Pat. No. 5,552,540; Cook et al., U.S. Pat. No. 5,587,469; Froehler et al., U.S. Pat. No. 5,594,121; Switzer et al., U.S. Pat. No. 5,596,091; Cook et al., U.S. Pat. No. 5,614,617; Froehler et al., U.S. Pat. No. 5,645,985; Cook et al., U.S. Pat. No. 5,681,941; Cook et al., U.S. Pat. No. 5,811,534; Cook et al., U.S. Pat. No. 5,750,692; Cook et al., U.S. Pat. No. 5,948,903; Cook et al., U.S. Pat. No. 5,587,470; Cook et al., U.S. 5,457,191; Matteucci et al., U.S. Pat. No. 5,763,588; Froehler et al., U.S. Pat. No. 5,830,653; Cook et al., U.S. Pat. No. 5,808,027; Cook et al., 6,166,199; and Matteucci et al., U.S. Pat. No. 6,005,096.

In certain embodiments, compounds targeted to a TPO nucleic acid comprise one or more modified nucleobases. In certain embodiments, the modified nucleobase is 5-methylcytosine. In certain embodiments, each cytosine is a 5-methylcytosine.

B. Modified Internucleoside Linkages

The naturally occurring internucleoside linkage of RNA and DNA is a 3' to 5' phosphodiester linkage. In certain embodiments, compounds described herein having one or more modified, i.e. non-naturally occurring, internucleoside linkages are often selected over compounds having naturally occurring internucleoside linkages because of desirable properties such as, for example, enhanced cellular uptake, enhanced affinity for target nucleic acids, and increased stability in the presence of nucleases.

In certain embodiments, compounds targeted to a TPO nucleic acid comprise one or more modified internucleoside linkages. In certain embodiments, the modified internucleoside linkages are phosphorothioate linkages. In certain embodiments, each internucleoside linkage of the compound is a phosphorothioate internucleoside linkage.

In certain embodiments, compounds described herein comprise oligonucleotides. Oligonucleotides having modified internucleoside linkages include internucleoside linkages that retain a phosphorus atom as well as internucleoside linkages that do not have a phosphorus atom. Representative phosphorus containing internucleoside linkages include, but are not limited to, phosphodiesters, phosphotriesters, methylphosphonates, phosphoramidate, and phosphorothioates. Methods of preparation of phosphorous-containing and non-phosphorous-containing linkages are well known.

In certain embodiments, nucleosides of modified oligonucleotides may be linked together using any internucleoside linkage. The two main classes of internucleoside linking groups are defined by the presence or absence of a phosphorus atom. Representative phosphorus-containing internucleoside linkages include but are not limited to phosphates, which contain a phosphodiester bond ("P=O") (also referred to as unmodified or naturally occurring linkages), phosphotriesters, methylphosphonates, phosphoramidates, and phosphorothioates ("P=S"), and phosphorodithioates ("HS—P=S"). Representative non-phosphorus containing internucleoside linking groups include but are not limited to methylenemethylimino (—CH2-N(CH3)-O—CH2-), thiodiester, thionocarbamate (—O—C(=O)(NH)—S—); siloxane (—O—SiH2-O—); and N,N'-dimethylhydrazine (—CH2-N(CH3)-N(CH3)-). Modified internucleoside linkages, compared to naturally occurring phosphate linkages, can be used to alter, typically increase, nuclease resistance of the oligonucleotide. In certain embodiments, internucleoside linkages having a chiral atom can be prepared as a racemic mixture, or as separate enantiomers. Representative chiral internucleoside linkages include but are not limited to alkylphosphonates and phosphorothioates. Methods of preparation of phosphorous-containing and non-phosphorous-containing internucleoside linkages are well known to those skilled in the art.

Neutral internucleoside linkages include, without limitation, phosphotriesters, methylphosphonates, MMI (3'-CH2-N(CH3)-O-5'), amide-3 (3'-CH2-C(=O)—N(H)-5'), amide-4 (3'-CH2-N(H)—C(=O)-5'), formacetal (3'-O—CH2-O-5'), methoxypropyl, and thioformacetal (3'-S—CH2-O-5'). Further neutral internucleoside linkages include nonionic linkages comprising siloxane (dialkylsiloxane), carboxylate ester, carboxamide, sulfide, sulfonate ester and amides (See for example: Carbohydrate Modifications in Antisense Research; Y. S. Sanghvi and P. D. Cook, Eds., ACS Symposium Series 580; Chapters 3 and 4, 40-65). Further neutral internucleoside linkages include nonionic linkages comprising mixed N, O, S and CH2 component parts.

In certain embodiments, oligonucleotides comprise modified internucleoside linkages arranged along the oligonucleotide or region thereof in a defined pattern or modified internucleoside linkage motif. In certain embodiments, internucleoside linkages are arranged in a gapped motif. In such embodiments, the internucleoside linkages in each of two wing regions are different from the internucleoside linkages in the gap region. In certain embodiments the internucleoside linkages in the wings are phosphodiester and the internucleoside linkages in the gap are phosphorothioate. The nucleoside motif is independently selected, so such oligonucleotides having a gapped internucleoside linkage motif may or may not have a gapped nucleoside motif and if it does have a gapped nucleoside motif, the wing and gap lengths may or may not be the same.

In certain embodiments, oligonucleotides comprise a region having an alternating internucleoside linkage motif. In certain embodiments, oligonucleotides of the present invention comprise a region of uniformly modified internucleoside linkages. In certain such embodiments, the oligonucleotide comprises a region that is uniformly linked by phosphorothioate internucleoside linkages. In certain embodiments, the oligonucleotide is uniformly linked by phosphorothioate. In certain embodiments, each internucleoside linkage of the oligonucleotide is selected from phosphodiester and phosphorothioate. In certain embodiments, each internucleoside linkage of the oligonucleotide is selected from phosphodiester and phosphorothioate and at least one internucleoside linkage is phosphorothioate.

In certain embodiments, the oligonucleotide comprises at least 6 phosphorothioate internucleoside linkages. In certain embodiments, the oligonucleotide comprises at least 8 phosphorothioate internucleoside linkages. In certain embodiments, the oligonucleotide comprises at least 10 phosphorothioate internucleoside linkages. In certain embodiments, the oligonucleotide comprises at least one block of at least 6 consecutive phosphorothioate internucleoside linkages. In certain embodiments, the oligonucleotide comprises at least one block of at least 8 consecutive phosphorothioate internucleoside linkages. In certain embodiments, the oligonucleotide comprises at least one block of at least 10 consecutive phosphorothioate internucleoside linkages. In certain embodiments, the oligonucleotide comprises at least block of at least one 12 consecutive phosphorothioate internucleoside linkages. In certain such embodiments, at least one such block is located at the 3' end of the oligonucleotide. In certain such embodiments, at least one such block is located within 3 nucleosides of the 3' end of the oligonucleotide.

In certain embodiments, oligonucleotides comprise one or more methylphosponate linkages. In certain embodiments, oligonucleotides having a gapmer nucleoside motif comprise a linkage motif comprising all phosphorothioate linkages except for one or two methylphosponate linkages. In certain embodiments, one methylphosponate linkage is in the central gap of an oligonucleotide having a gapmer nucleoside motif.

In certain embodiments, it is desirable to arrange the number of phosphorothioate internucleoside linkages and phosphodiester internucleoside linkages to maintain nuclease resistance. In certain embodiments, it is desirable to arrange the number and position of phosphorothioate internucleoside linkages and the number and position of phosphodiester internucleoside linkages to maintain nuclease resistance. In certain embodiments, the number of phosphorothioate internucleoside linkages may be decreased and the number of phosphodiester internucleoside linkages may be increased. In certain embodiments, the number of phosphorothioate internucleoside linkages may be decreased and the number of phosphodiester internucleoside linkages may be increased while still maintaining nuclease resistance. In certain embodiments it is desirable to decrease the number of phosphorothioate internucleoside linkages while retaining nuclease resistance. In certain embodiments it is desirable to increase the number of phosphodiester internucleoside linkages while retaining nuclease resistance.

C. Certain Motifs

In certain embodiments, compounds described herein comprise oligonucleotides. Oligonucleotides can have a motif, e.g. a pattern of unmodified and/or modified sugar moieties, nucleobases, and/or internucleoside linkages. In certain embodiments, modified oligonucleotides comprise one or more modified nucleoside comprising a modified sugar. In certain embodiments, modified oligonucleotides comprise one or more modified nucleosides comprising a modified nucleobase. In certain embodiments, modified oligonucleotides comprise one or more modified internucleoside linkage. In such embodiments, the modified, unmodified, and differently modified sugar moieties, nucleobases, and/or internucleoside linkages of a modified oligonucleotide define a pattern or motif. In certain embodiments, the patterns of sugar moieties, nucleobases, and internucleoside linkages are each independent of one another. Thus, a modified oligonucleotide may be described by its sugar motif, nucleobase motif and/or internucleoside linkage motif (as used herein, nucleobase motif describes the modifications to the nucleobases independent of the sequence of nucleobases).

1. Certain Sugar Motifs

In certain embodiments, compounds described herein comprise oligonucleotides. In certain embodiments, oligonucleotides comprise one or more type of modified sugar and/or unmodified sugar moiety arranged along the oligonucleotide or region thereof in a defined pattern or sugar motif. In certain instances, such sugar motifs include but are not limited to any of the sugar modifications discussed herein.

In certain embodiments, modified oligonucleotides comprise or consist of a region having a gapmer motif, which comprises two external regions or "wings" and a central or internal region or "gap." The three regions of a gapmer motif (the 5'-wing, the gap, and the 3'-wing) form a contiguous sequence of nucleosides wherein at least some of the sugar moieties of the nucleosides of each of the wings differ from at least some of the sugar moieties of the nucleosides of the gap. Specifically, at least the sugar moieties of the nucleosides of each wing that are closest to the gap (the 3'-most nucleoside of the 5'-wing and the 5'-most nucleoside of the 3'-wing) differ from the sugar moiety of the neighboring gap nucleosides, thus defining the boundary between the wings and the gap (i.e., the wing/gap junction). In certain embodiments, the sugar moieties within the gap are the same as one another. In certain embodiments, the gap includes one or more nucleoside having a sugar moiety that differs from the sugar moiety of one or more other nucleosides of the gap. In certain embodiments, the sugar motifs of the two wings are the same as one another (symmetric gapmer). In certain embodiments, the sugar motif of the 5'-wing differs from the sugar motif of the 3'-wing (asymmetric gapmer).

In certain embodiments, the wings of a gapmer comprise 1-5 nucleosides. In certain embodiments, the wings of a gapmer comprise 2-5 nucleosides. In certain embodiments, the wings of a gapmer comprise 3-5 nucleosides. In certain embodiments, the nucleosides of a gapmer are all modified nucleosides.

In certain embodiments, the gap of a gapmer comprises 7-12 nucleosides. In certain embodiments, the gap of a gapmer comprises 7-10 nucleosides. In certain embodiments, the gap of a gapmer comprises 8-10 nucleosides. In certain embodiments, the gap of a gapmer comprises 10 nucleosides. In certain embodiment, each nucleoside of the gap of a gapmer is an unmodified 2'-deoxy nucleoside.

In certain embodiments, the gapmer is a deoxy gapmer. In such embodiments, the nucleosides on the gap side of each wing/gap junction are unmodified 2'-deoxy nucleosides and the nucleosides on the wing sides of each wing/gap junction are modified nucleosides. In certain such embodiments, each nucleoside of the gap is an unmodified 2'-deoxy nucleoside. In certain such embodiments, each nucleoside of each wing is a modified nucleoside.

In certain embodiments, a modified oligonucleotide has a fully modified sugar motif wherein each nucleoside of the modified oligonucleotide comprises a modified sugar moiety. In certain embodiments, modified oligonucleotides comprise or consist of a region having a fully modified sugar motif wherein each nucleoside of the region comprises a modified sugar moiety. In certain embodiments, modified oligonucleotides comprise or consist of a region having a fully modified sugar motif, wherein each nucleoside within the fully modified region comprises the same modified sugar moiety, referred to herein as a uniformly modified sugar motif. In certain embodiments, a fully modified oligonucleotide is a uniformly modified oligonucleotide. In certain embodiments, each nucleoside of a uniformly modified comprises the same 2'-modification.

2. Certain Nucleobase Motifs

In certain embodiments, compounds described herein comprise oligonucleotides. In certain embodiments, oligonucleotides comprise modified and/or unmodified nucleobases arranged along the oligonucleotide or region thereof in a defined pattern or motif. In certain embodiments, each nucleobase is modified. In certain embodiments, none of the nucleobases are modified. In certain embodiments, each purine or each pyrimidine is modified. In certain embodiments, each adenine is modified. In certain embodiments, each guanine is modified. In certain embodiments, each thymine is modified. In certain embodiments, each uracil is modified. In certain embodiments, each cytosine is modified. In certain embodiments, some or all of the cytosine nucleobases in a modified oligonucleotide are 5-methylcytosines.

In certain embodiments, modified oligonucleotides comprise a block of modified nucleobases. In certain such embodiments, the block is at the 3'-end of the oligonucleotide. In certain embodiments the block is within 3 nucleosides of the 3'-end of the oligonucleotide. In certain embodiments, the block is at the 5'-end of the oligonucleotide. In certain embodiments the block is within 3 nucleosides of the 5'-end of the oligonucleotide.

In certain embodiments, oligonucleotides having a gapmer motif comprise a nucleoside comprising a modified nucleobase. In certain such embodiments, one nucleoside comprising a modified nucleobase is in the central gap of an oligonucleotide having a gapmer motif. In certain such embodiments, the sugar moiety of said nucleoside is a 2'-deoxyribosyl moiety. In certain embodiments, the modified nucleobase is selected from: a 2-thiopyrimidine and a 5-propynepyrimidine.

3. Certain Internucleoside Linkage Motifs

In certain embodiments, compounds described herein comprise oligonucleotides. In certain embodiments, oligonucleotides comprise modified and/or unmodified internucleoside linkages arranged along the oligonucleotide or region thereof in a defined pattern or motif. In certain embodiments, essentially each internucleoside linking group is a phosphate internucleoside linkage (P=O). In certain embodiments, each internucleoside linking group of a modified oligonucleotide is a phosphorothioate (P=S). In certain embodiments, each internucleoside linking group of a modified oligonucleotide is independently selected from a phosphorothioate and phosphate internucleoside linkage. In certain embodiments, the sugar motif of a modified oligonucleotide is a gapmer and the internucleoside linkages within the gap are all modified. In certain such embodiments, some or all of the internucleoside linkages in the wings are unmodified phosphate linkages. In certain embodiments, the terminal internucleoside linkages are modified.

D. Certain Modified Oligonucleotides

In certain embodiments, compounds described herein comprise modified oligonucleotides. In certain embodiments, the above modifications (sugar, nucleobase, internucleoside linkage) are incorporated into a modified oligonucleotide. In certain embodiments, modified oligonucleotides are characterized by their modification, motifs, and overall lengths. In certain embodiments, such parameters are each independent of one another. Thus, unless otherwise indicated, each internucleoside linkage of an oligonucleotide having a gapmer sugar motif may be modified or unmodified and may or may not follow the gapmer modification pattern of the sugar modifications. For example, the internucleoside linkages within the wing regions of a sugar gapmer may be the same or different from one another and may be the same or different from the internucleoside linkages of the gap region of the sugar motif. Likewise, such gapmer oligonucleotides may comprise one or more modified nucleobase independent of the gapmer pattern of the sugar modifications. Furthermore, in certain instances, an oligonucleotide is described by an overall length or range and by lengths or length ranges of two or more regions (e.g., a regions of nucleosides having specified sugar modifications), in such circumstances it may be possible to select numbers for each range that result in an oligonucleotide having an overall length falling outside the specified range. In such circumstances, both elements must be satisfied. For example, in certain embodiments, a modified oligonucleotide consists of 15-20 linked nucleosides and has a sugar motif consisting of three regions, A, B, and C, wherein region A consists of 2-6 linked nucleosides having a specified sugar motif, region B consists of 6-10 linked nucleosides having a specified sugar motif, and region C consists of 2-6 linked nucleosides having a specified sugar motif. Such embodiments do not include modified oligonucleotides where A and C each consist of 6 linked nucleosides and B consists of 10 linked nucleosides (even though those numbers of nucleosides are permitted within the requirements for A, B, and C) because the overall length of such oligonucleotide is 22, which exceeds the upper limit of the overall length of the modified oligonucleotide (20). Herein, if a description of an oligonucleotide is silent with respect to one or more parameter, such parameter is not limited. Thus, a modified oligonucleotide described only as having a gapmer sugar motif without further description may have any length, internucleoside linkage motif, and nucleobase motif. Unless otherwise indicated, all modifications are independent of nucleobase sequence.

E. Certain Conjugate Groups

In certain embodiments, oligonucleotides are covalently attached to one or more conjugate groups. In certain embodiments, conjugate groups modify one or more properties of the attached oligonucleotide, including but not limited to pharmacodynamics, pharmacokinetics, stability, binding, absorption, tissue distribution, cellular distribution, cellular uptake, charge and clearance. In certain embodiments, conjugate groups impart a new property on the attached oligonucleotide, e.g., fluorophores or reporter groups that enable detection of the oligonucleotide.

Certain conjugate groups and conjugate moieties have been described previously, for example: cholesterol moiety (Letsinger et al., Proc. Natl. Acad. Sci. USA, 1989, 86, 6553-6556), cholic acid (Manoharan et al., Bioorg. Med. Chem. Lett., 1994, 4, 1053-1060), a thioether, e.g., hexyl-S-tritylthiol (Manoharan et al., Ann. N.Y. Acad. Sci., 1992, 660, 306-309; Manoharan et al., Bioorg. Med. Chem. Lett., 1993, 3, 2765-2770), a thiocholesterol (Oberhauser et al., Nucl. Acids Res., 1992, 20, 533-538), an aliphatic chain, e.g., do-decan-diol or undecyl residues (Saison-Behmoaras et al., EMBO J., 1991, 10, 1111-1118; Kabanov et al., FEBS Lett., 1990, 259, 327-330; Svinarchuk et al., Biochimie, 1993, 75, 49-54), a phospholipid, e.g., di-hexadecyl-rac-glycerol or triethyl-ammonium 1,2-di-O-hexadecyl-rac-glycero-3-H-phosphonate (Manoharan et al., Tetrahedron Lett., 1995, 36, 3651-3654; Shea et al., Nucl. Acids Res., 1990, 18, 3777-3783), a polyamine or a polyethylene glycol chain (Manoharan et al., Nucleosides & Nucleotides, 1995, 14, 969-973), or adamantane acetic, a palmityl moiety (Mishra et al., Biochim. Biophys. Acta, 1995, 1264, 229-237), an octadecylamine or hexylamino-carbonyl-oxycholesterol moiety (Crooke et al., J. Pharmacol. Exp. Ther., 1996, i, 923-937), a tocopherol group (Nishina et al., Molecular Therapy Nucleic Acids, 2015, 4, e220; doi: 10.1038/mtna.2014.72 and Nishina et al., Molecular Therapy, 2008, 16, 734-740), or a GalNAc cluster (e.g., WO2014/179620).

In certain embodiments, conjugate groups comprise a cell-targeting moiety having the formula:

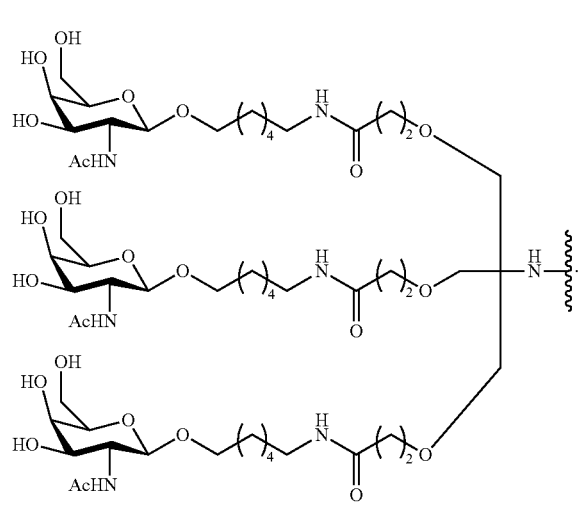

In certain embodiments, conjugate groups comprise a cell-targeting moiety having the formula:

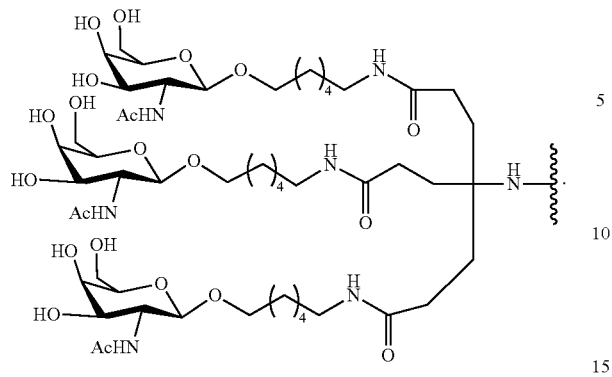
In certain embodiments, conjugate groups comprise a cell-targeting moiety having the formula:
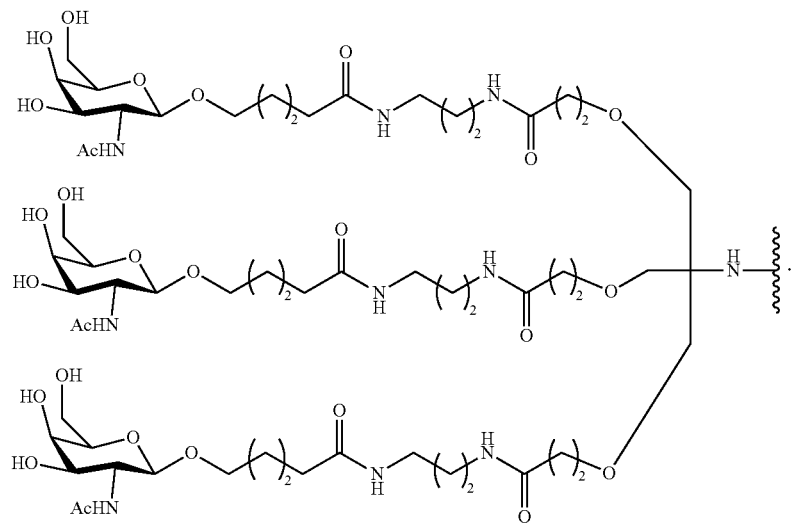
In certain embodiments, compounds described herein comprise a conjugate group described herein as "LICA-1". LICA-1 is shown below without the optional cleavable moiety at the end of the conjugate linker:
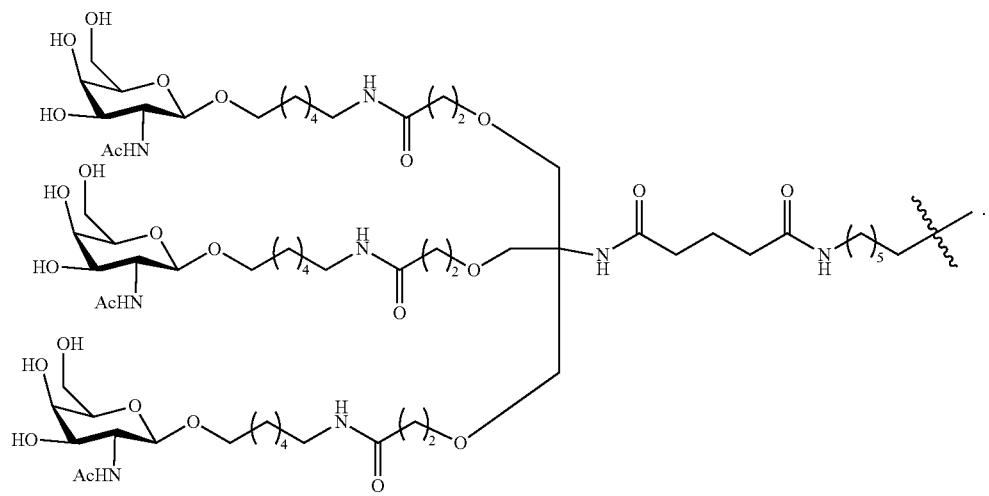

In certain embodiments, compounds described herein comprise LICA-1 and a cleavable moiety within the conjugate linker have the formula:

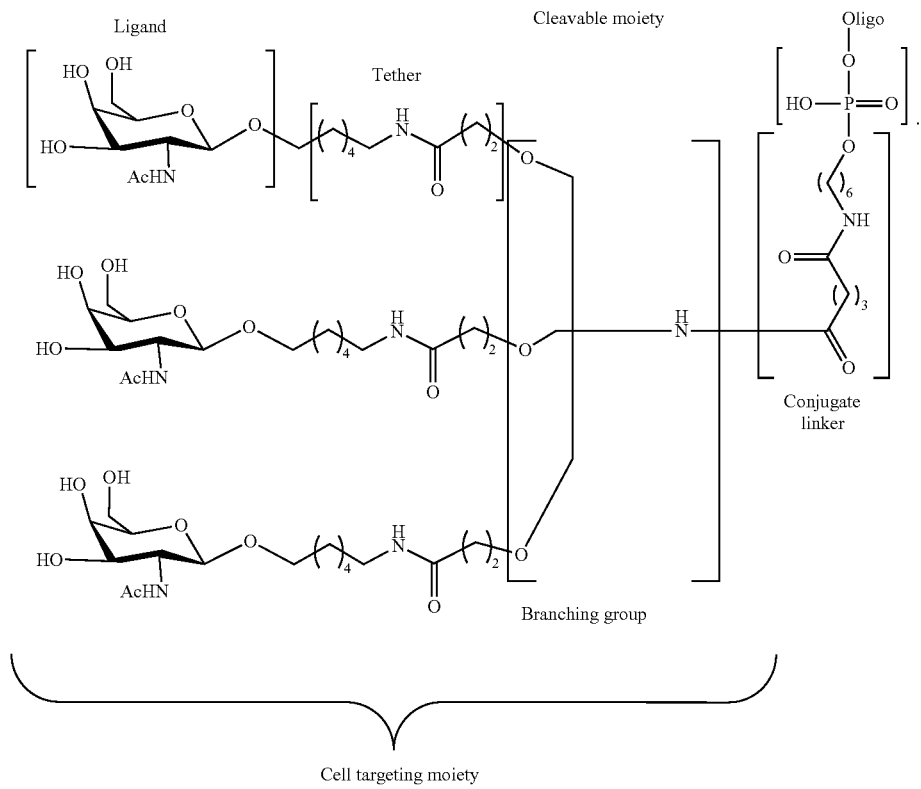

wherein oligo is an oligonucleotide.

Representative publications that teach the preparation of certain of the above noted conjugate groups and compounds comprising conjugate groups, tethers, conjugate linkers, branching groups, ligands, cleavable moieties as well as other modifications include without limitation, U.S. Pat. Nos. 5,994,517, 6,300,319, 6,660,720, 6,906,182, 7,262,177, 7,491,805, 8,106,022, 7,723,509, 9,127,276, US 2006/0148740, US 2011/0123520, WO 2013/033230 and WO 2012/037254, Biessen et al., *J. Med. Chem.* 1995, 38, 1846-1852, Lee et al., *Bioorganic & Medicinal Chemistry* 2011, 19, 2494-2500, Rensen et al., *J. Biol. Chem.* 2001, 276, 37577-37584, Rensen et al., *J. Med. Chem.* 2004, 47, 5798-5808, Sliedregt et al., *J. Med. Chem.* 1999, 42, 609-618, and Valentijn et al., *Tetrahedron*, 1997, 53, 759-770, each of which is incorporated by reference herein in its entirety.

In certain embodiments, compounds described herein comprise modified oligonucleotides comprising a gapmer or fully modified motif and a conjugate group comprising at least one, two, or three GalNAc ligands. In certain embodiments, compounds described herein comprise a conjugate group found in any of the following references: Lee, *Carbohydr Res*, 1978, 67, 509-514; Connolly et al., *J Biol Chem*, 1982, 257, 939-945; Pavia et al., *Int J Pep Protein Res*, 1983, 22, 539-548; Lee et al., *Biochem*, 1984, 23, 4255-4261; Lee et al., *Glycoconjugate J*, 1987, 4, 317-328; Toyokuni et al., *Tetrahedron Lett*, 1990, 31, 2673-2676; Biessen et al., *J Med Chem*, 1995, 38, 1538-1546; Valentijn et al., *Tetrahedron*, 1997, 53, 759-770; Kim et al., *Tetrahedron Lett*, 1997, 38, 3487-3490; Lee et al., *Bioconjug Chem*, 1997, 8, 762-765; Kato et al., *Glycobiol*, 2001, 11, 821-829; Rensen et al., *J Biol Chem*, 2001, 276, 37577-37584; Lee et al., *Methods Enzymol*, 2003, 362, 38-43; Westerlind et al., *Glycoconj J*, 2004, 21, 227-241; Lee et al., *Bioorg Med Chem Lett*, 2006, 16 (19), 5132-5135; Maierhofer et al., *Bioorg Med Chem*, 2007, 15, 7661-7676; Khorev et al., *Bioorg Med Chem*, 2008, 16, 5216-5231; Lee et al., *Bioorg Med Chem*, 2011, 19, 2494-2500; Kornilova et al., Analyt Biochem, 2012, 425, 43-46; Pujol et al., *Angew Chemie Int Ed Engl*, 2012, 51, 7445-7448; Biessen et al., *J Med Chem*, 1995, 38, 1846-1852; Sliedregt et al., *J Med Chem*, 1999, 42, 609-618; Rensen et al., *J Med Chem*, 2004, 47, 5798-5808; Rensen et al., *Arterioscler Thromb Vasc Biol*, 2006, 26, 169-175; van Rossenberg et al., *Gene Ther*, 2004, 11, 457-464; Sato et al., *J Am Chem Soc*, 2004, 126, 14013-14022; Lee et al., *J Org Chem*, 2012, 77, 7564-7571; Biessen et al., *FASEB J*, 2000, 14, 1784-1792; Rajur et al., *Bioconjug Chem*, 1997, 8, 935-940; Duff et al., *Methods Enzymol*, 2000, 313, 297-321; Maier et al., *Bioconjug Chem*, 2003, 14, 18-29; Jayaprakash et al., *Org Lett*, 2010, 12, 5410-5413; Manoharan, *Antisense Nucleic Acid Drug Dev*, 2002, 12, 103-128; Merwin et al., *Bioconjug Chem*, 1994, 5, 612-620; Tomiya et al., Bioorg Med Chem, 2013, 21, 5275-5281; International applications WO1998/013381; WO2011/038356; WO1997/046098; WO2008/098788; WO2004/101619; WO2012/037254; WO2011/120053; WO2011/100131; WO2011/163121; WO2012/177947; WO2013/033230; WO2013/075035; WO2012/083185; WO2012/083046; WO2009/082607; WO2009/134487; WO2010/144740; WO2010/148013; WO1997/020563; WO2010/088537; WO2002/043771; WO2010/129709; WO2012/068187; WO2009/126933; WO2004/024757; WO2010/054406; WO2012/089352;

WO2012/089602; WO2013/166121; WO2013/165816; U.S. Pat. Nos. 4,751,219; 8,552,163; 6,908,903; 7,262,177; 5,994,517; 6,300,319; 8,106,022; 7,491,805; 7,491,805; 7,582,744; 8,137,695; 6,383,812; 6,525,031; 6,660,720; 7,723,509; 8,541,548; 8,344,125; 8,313,772; 8,349,308; 8,450,467; 8,501,930; 8,158,601; 7,262,177; 6,906,182; 6,620,916; 8,435,491; 8,404,862; 7,851,615; Published U.S. Patent Application Publications US2011/0097264; US2011/0097265; US2013/0004427; US2005/0164235; US2006/0148740; US2008/0281044; US2010/0240730; US2003/0119724; US2006/0183886; US2008/0206869; US2011/0269814; US2009/0286973; US2011/0207799; US2012/0136042; US2012/0165393; US2008/0281041; US2009/0203135; US2012/0035115; US2012/0095075; US2012/0101148; US2012/0128760; US2012/0157509; US2012/0230938; US2013/0109817; US2013/0121954; US2013/0178512; US2013/0236968; US2011/0123520; US2003/0077829; US2008/0108801; and US2009/0203132; each of which is incorporated by reference in its entirety. 1.

1. Conjugate Moieties

Conjugate moieties include, without limitation, intercalators, reporter molecules, polyamines, polyamides, peptides, carbohydrates (e.g., GalNAc), vitamin moieties, polyethylene glycols, thioethers, polyethers, cholesterols, thiocholesterols, cholic acid moieties, folate, lipids, phospholipids, biotin, phenazine, phenanthridine, anthraquinone, adamantane, acridine, fluoresceins, rhodamines, coumarins, fluorophores, and dyes.

In certain embodiments, a conjugate moiety comprises an active drug substance, for example, aspirin, warfarin, phenylbutazone, ibuprofen, suprofen, fen-bufen, ketoprofen, (S)-(+)-pranoprofen, carprofen, dansylsarcosine, 2,3,5-triiodobenzoic acid, fingolimod, flufenamic acid, folinic acid, a benzothiadiazide, chlorothiazide, a diazepine, indomethicin, a barbiturate, a cephalosporin, a sulfa drug, an antidiabetic, an antibacterial or an antibiotic.

2. Conjugate Linkers

Conjugate moieties are attached to oligonucleotides through conjugate linkers. In certain compounds, a conjugate linker is a single chemical bond (i.e. a conjugate moiety is attached to an oligonucleotide via a conjugate linker that is a single bond). In certain embodiments, the conjugate linker comprises a chain structure, such as a hydrocarbyl chain, or an oligomer of repeating units such as ethylene glycol, nucleosides, or amino acid units.

In certain embodiments, a conjugate linker comprises one or more groups selected from alkyl, amino, oxo, amide, disulfide, polyethylene glycol, ether, thioether, and hydroxylamino. In certain such embodiments, the conjugate linker comprises groups selected from alkyl, amino, oxo, amide and ether groups. In certain embodiments, the conjugate linker comprises groups selected from alkyl and amide groups. In certain embodiments, the conjugate linker comprises groups selected from alkyl and ether groups. In certain embodiments, the conjugate linker comprises at least one phosphorus moiety. In certain embodiments, the conjugate linker comprises at least one phosphate group. In certain embodiments, the conjugate linker includes at least one neutral linking group.

In certain embodiments, conjugate linkers, including the conjugate linkers described above, are bifunctional linking moieties, e.g., those known in the art to be useful for attaching conjugate groups to parent compounds, such as the oligonucleotides provided herein. In general, a bifunctional linking moiety comprises at least two functional groups. One of the functional groups is selected to bind to a particular site on a compound and the other is selected to bind to a conjugate group. Examples of functional groups used in a bifunctional linking moiety include but are not limited to electrophiles for reacting with nucleophilic groups and nucleophiles for reacting with electrophilic groups. In certain embodiments, bifunctional linking moieties comprise one or more groups selected from amino, hydroxyl, carboxylic acid, thiol, alkyl, alkenyl, and alkynyl.

Examples of conjugate linkers include but are not limited to pyrrolidine, 8-amino-3,6-dioxaoctanoic acid (ADO), succinimidyl 4-(N-maleimidomethyl) cyclohexane-1-carboxylate (SMCC) and 6-aminohexanoic acid (AHEX or AHA). Other conjugate linkers include but are not limited to substituted or unsubstituted C1-C10 alkyl, substituted or unsubstituted C2-C10 alkenyl or substituted or unsubstituted C2-C10 alkynyl, wherein a nonlimiting list of preferred substituent groups includes hydroxyl, amino, alkoxy, carboxy, benzyl, phenyl, nitro, thiol, thioalkoxy, halogen, alkyl, aryl, alkenyl and alkynyl.

In certain embodiments, conjugate linkers comprise 1-10 linker-nucleosides. In certain embodiments, such linker-nucleosides are modified nucleosides. In certain embodiments such linker-nucleosides comprise a modified sugar moiety. In certain embodiments, linker-nucleosides are unmodified. In certain embodiments, linker-nucleosides comprise an optionally protected heterocyclic base selected from a purine, substituted purine, pyrimidine or substituted pyrimidine. In certain embodiments, a cleavable moiety is a nucleoside selected from uracil, thymine, cytosine, 4-N-benzoylcytosine, 5-methylcytosine, 4-N-benzoyl-5-methylcytosine, adenine, 6-N-benzoyladenine, guanine and 2-N-isobutyrylguanine. It is typically desirable for linker-nucleosides to be cleaved from the compound after it reaches a target tissue. Accordingly, linker-nucleosides are typically linked to one another and to the remainder of the compound through cleavable bonds. In certain embodiments, such cleavable bonds are phosphodiester bonds.

Herein, linker-nucleosides are not considered to be part of the oligonucleotide. Accordingly, in embodiments in which a compound comprises an oligonucleotide consisting of a specified number or range of linked nucleosides and/or a specified percent complementarity to a reference nucleic acid and the compound also comprises a conjugate group comprising a conjugate linker comprising linker-nucleosides, those linker-nucleosides are not counted toward the length of the oligonucleotide and are not used in determining the percent complementarity of the oligonucleotide for the reference nucleic acid. For example, a compound may comprise (1) a modified oligonucleotide consisting of 8-30 nucleosides and (2) a conjugate group comprising 1-10 linker-nucleosides that are contiguous with the nucleosides of the modified oligonucleotide. The total number of contiguous linked nucleosides in such a compound is more than 30. Alternatively, an compound may comprise a modified oligonucleotide consisting of 8-30 nucleosides and no conjugate group. The total number of contiguous linked nucleosides in such a compound is no more than 30. Unless otherwise indicated conjugate linkers comprise no more than 10 linker-nucleosides. In certain embodiments, conjugate linkers comprise no more than 5 linker-nucleosides. In certain embodiments, conjugate linkers comprise no more than 3 linker-nucleosides. In certain embodiments, conjugate linkers comprise no more than 2 linker-nucleosides. In certain embodiments, conjugate linkers comprise no more than 1 linker-nucleoside.

In certain embodiments, it is desirable for a conjugate group to be cleaved from the oligonucleotide. For example, in certain circumstances compounds comprising a particular conjugate moiety are better taken up by a particular cell type, but once the compound has been taken up, it is desirable that the conjugate group be cleaved to release the unconjugated or parent oligonucleotide. Thus, certain conjugate may comprise one or more cleavable moieties, typically within the conjugate linker. In certain embodiments, a cleavable moiety is a cleavable bond. In certain embodiments, a cleavable moiety is a group of atoms comprising at least one cleavable bond. In certain embodiments, a cleavable moiety comprises a group of atoms having one, two, three, four, or more than four cleavable bonds. In certain embodiments, a cleavable moiety is selectively cleaved inside a cell or subcellular compartment, such as a lysosome. In certain embodiments, a cleavable moiety is selectively cleaved by endogenous enzymes, such as nucleases.

In certain embodiments, a cleavable bond is selected from among: an amide, an ester, an ether, one or both esters of a phosphodiester, a phosphate ester, a carbamate, or a disulfide. In certain embodiments, a cleavable bond is one or both of the esters of a phosphodiester. In certain embodiments, a cleavable moiety comprises a phosphate or phosphodiester. In certain embodiments, the cleavable moiety is a phosphate linkage between an oligonucleotide and a conjugate moiety or conjugate group.

In certain embodiments, a cleavable moiety comprises or consists of one or more linker-nucleosides. In certain such embodiments, one or more linker-nucleosides are linked to one another and/or to the remainder of the compound through cleavable bonds. In certain embodiments, such cleavable bonds are unmodified phosphodiester bonds. In certain embodiments, a cleavable moiety is 2'-deoxy nucleoside that is attached to either the 3' or 5'-terminal nucleoside of an oligonucleotide by a phosphate internucleoside linkage and covalently attached to the remainder of the conjugate linker or conjugate moiety by a phosphate or phosphorothioate linkage. In certain such embodiments, the cleavable moiety is 2'-deoxyadenosine.

Compositions and Methods for Formulating Pharmaceutical Compositions

Compounds described herein may be admixed with pharmaceutically acceptable active or inert substances for the preparation of pharmaceutical compositions or formulations. Compositions and methods for the formulation of pharmaceutical compositions are dependent upon a number of criteria, including, but not limited to, route of administration, extent of disease, or dose to be administered.

In certain embodiments, the present invention provides pharmaceutical compositions comprising one or more compounds or a salt thereof. In certain embodiments, the compounds are antisense compounds or oligomeric compounds. In certain embodiments, the compounds comprise or consist of a modified oligonucleotide. In certain such embodiments, the pharmaceutical composition comprises a suitable pharmaceutically acceptable diluent or carrier. In certain embodiments, a pharmaceutical composition comprises a sterile saline solution and one or more compound. In certain embodiments, such pharmaceutical composition consists of a sterile saline solution and one or more compound. In certain embodiments, the sterile saline is pharmaceutical grade saline. In certain embodiments, a pharmaceutical composition comprises one or more compound and sterile water. In certain embodiments, a pharmaceutical composition consists of one compound and sterile water. In certain embodiments, the sterile water is pharmaceutical grade water. In certain embodiments, a pharmaceutical composition comprises one or more compound and phosphate-buffered saline (PBS). In certain embodiments, a pharmaceutical composition consists of one or more compound and sterile PBS. In certain embodiments, the sterile PBS is pharmaceutical grade PBS. Compositions and methods for the formulation of pharmaceutical compositions are dependent upon a number of criteria, including, but not limited to, route of administration, extent of disease, or dose to be administered.

A compound described herein targeted to a TPO nucleic acid can be utilized in pharmaceutical compositions by combining the compound with a suitable pharmaceutically acceptable diluent or carrier. In certain embodiments, a pharmaceutically acceptable diluent is water, such as sterile water suitable for injection. Accordingly, in one embodiment, employed in the methods described herein is a pharmaceutical composition comprising a compound targeted to a TPO nucleic acid and a pharmaceutically acceptable diluent. In certain embodiments, the pharmaceutically acceptable diluent is water. In certain embodiments, the compound comprises or consists of a modified oligonucleotide provided herein.

Pharmaceutical compositions comprising compounds provided herein encompass any pharmaceutically acceptable salts, esters, or salts of such esters, or any other oligonucleotide which, upon administration to an individual, including a human, is capable of providing (directly or indirectly) the biologically active metabolite or residue thereof. In certain embodiments, the compounds are antisense compounds or oligomeric compounds. In certain embodiments, the compound comprises or consists of a modified oligonucleotide. Accordingly, for example, the disclosure is also drawn to pharmaceutically acceptable salts of compounds, prodrugs, pharmaceutically acceptable salts of such prodrugs, and other bioequivalents. Suitable pharmaceutically acceptable salts include, but are not limited to, sodium and potassium salts.

A prodrug can include the incorporation of additional nucleosides at one or both ends of a compound which are cleaved by endogenous nucleases within the body, to form the active compound.

In certain embodiments, the compounds or compositions further comprise a pharmaceutically acceptable carrier or diluent.

Certain Combinations and Combination Therapies

In certain embodiments, a first agent comprising the compound described herein is co-administered with one or more secondary agents. In certain embodiments, such second agents are designed to treat the same disease, disorder, or condition as the first agent described herein. In certain embodiments, such second agents are designed to treat a different disease, disorder, or condition as the first agent described herein. In certain embodiments, a first agent is designed to treat an undesired side effect of a second agent. In certain embodiments, second agents are co-administered with the first agent to treat an undesired effect of the first agent. In certain embodiments, such second agents are designed to treat an undesired side effect of one or more pharmaceutical compositions as described herein. In certain embodiments, second agents are co-administered with the first agent to produce a combinational effect. In certain embodiments, second agents are co-administered with the first agent to produce a synergistic effect. In certain embodiments, the co-administration of the first and second agents permits use of lower dosages than would be required to achieve a therapeutic or prophylactic effect if the agents were administered as independent therapy.

In certain embodiments, one or more compounds or compositions provided herein are co-administered with one or more secondary agents. In certain embodiments, the secondary agent is a TPO receptor agonist. In certain embodiments, it may be desirable to rescue the platelet count reducing effect of a TPO-specific inhibitor by administering a TPO receptor agonist as a rescuing agent. Any TPO receptor agonist known in the art may be used, for example, romiplostim or eltrombopag, which are both FDA approved. In certain embodiments, a recombinant TPO protein may be used as a rescuing agent. In certain embodiments, it may be desirable to rescue the platelet count reducing effect of a TPO-specific inhibitor by administering platelets, such as by infusion.

In certain embodiments, methods of treating an individual suffering from cancer comprise administering a compound or composition provided herein and one or more secondary agents. In certain embodiments, the secondary agent is a chemotherapeutic agent including, but not limited to, docetaxel, cyclophosphamide, and anthracycline. In certain embodiments, the secondary agent is a hormone therapy including, but not limited to, an aromatase inhibitor or tamoxifen. In certain embodiments, the secondary agent is an anti-HER2 antibody including, but not limited, to trastuzumab (Herceptin) and pertuzumab (Perjeta). In certain embodiments, the secondary agent is a tyrosine kinase inhibitor including, but not limited to, lapatinib (Tykerb). In certain embodiments, the secondary agent is a PARP inhibitor including, but not limited to, olaparib (Lynparza). In certain embodiments, the secondary agent is a JAK2 or JAK1/2 inhibitor including, but not limited to, ruxolitinib, oclacitinib, lestaurtinib, SB1518, SAR302503, AZD1480, baricitinib, filgotinib, gandotinib, momelotinib, parcritinib, and upadacitinib.

In certain embodiments, methods of treating an individual suffering from a cardiovascular disease or a metabolic disorder comprise administering a compound or composition provided herein and one or more secondary agents. In certain embodiments, the one or more secondary agents are selected from a cholesterol lowering agent, a blood pressure lowering agent, and a blood glucose lowering agent, and a combination thereof. Non-limiting examples of cholesterol lowering agents are statins, PCSK9 inhibitors, bile acid sequestrants, cholesterol absorption inhibitors, nicotinic acid agents and fibrates. Non-limiting examples of blood pressure lowering agents are angiotensin-converting enzyme inhibitors and angiotensin II receptor blockers. Non-limiting examples of blood glucose lowering agents are insulin, alpha-glucosidase inhibitors, biguanides (e.g., metformin), DPP-4 inhibitors, glucagon-like peptides, sodium glucose transporter 2 inhibitors, sulfonylureas, and thiazolediones.

In certain embodiments, methods of treating an individual suffering from an inflammatory condition comprise administering a compound or composition provided herein and one or more secondary agents. In certain embodiments, the one or more secondary agents is a non-steroidal anti-inflammatory drug (NSAID). Non-limiting examples of NSAIDs are aspirin, ibuprofen, naproxen, meloxicam, celecoxib, and indomethacin. In certain embodiments, the one or more secondary agents is acetaminophen.

In certain embodiments, one or more compounds or compositions provided herein and one or more secondary agents are administered at different times. In certain embodiments, one or more compounds or compositions provided herein and one or more secondary agents are prepared together in a single formulation. In certain embodiments, one or more compounds or compositions provided herein and one or more secondary agents are prepared separately.

Certain embodiments are directed to the use of a compound targeted to TPO as described herein in combination with a secondary agent. In certain embodiments, the secondary agent is a chemotherapeutic agent including, but not limited to, docetaxel, cyclophosphamide, and anthracycline. In certain embodiments, the secondary agent is a hormone therapy including, but not limited to, an aromatase inhibitor or tamoxifen. In certain embodiments, the secondary agent is an anti-HER2 antibody including, but not limited, to trastuzumab (Herceptin) and pertuzumab (Perjeta). In certain embodiments, the secondary agent is a tyrosine kinase inhibitor including, but not limited to, lapatinib (Tykerb). In certain embodiments, the secondary agent is a PARP inhibitor including, but not limited to, olaparib (Lynparza). Certain embodiments are directed to use of a compound targeted to TPO as described herein and a secondary agent in the preparation or manufacture of a medicament for treating cancer. In certain embodiments the cancer is selected from: breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis.

Certain embodiments are drawn to a combination comprising a compound targeted to TPO as described herein and a secondary agent. In certain embodiments, the secondary agent is a chemotherapeutic agent including, but not limited to, docetaxel, cyclophosphamide, and anthracycline. In certain embodiments, the secondary agent is a hormone therapy including, but not limited to, an aromatase inhibitor or tamoxifen. In certain embodiments, the secondary agent is an anti-HER2 antibody including, but not limited, to trastuzumab (Herceptin) and pertuzumab (Perjeta). In certain embodiments, the secondary agent is a tyrosine kinase inhibitor including, but not limited to, lapatinib (Tykerb). In certain embodiments, the secondary agent is a PARP inhibitor including, but not limited to, olaparib (Lynparza). In certain embodiments, such a combination is useful for reducing or cancer cell proliferation, the number of primary tumors, individual tumor volume, total tumor volume, tumor growth, primary tumor intra-tumoral vessel density, primary tumor platelet deposition, and/or metastasis, or a combination thereof and/or treating cancer. In certain embodiments the cancer is selected from: breast cancer, ovarian cancer, endometrial cancer, cervical cancer, prostate cancer, lung cancer (e.g. non-small cell lung carcinoma and small-cell lung carcinoma, mesothelioma, gastrointestinal cancer (e.g. large intestinal cancer, small intestinal cancer, and stomach cancer), colon cancer, colorectal cancer, bladder cancer, liver cancer, esophageal cancer, pancreatic cancer, biliary tract cancer, sarcomas (e.g. epithelioid, rhabdoid and synovial), chordoma, renal cancer, neuroblastoma, and brain cancer (e.g. glioblastoma), blood cancer, myeloma, multiple myeloma, B cell malignancies, lymphoma, B cell lymphoma, T cell lymphoma, leukemia (e.g. acute lymphocytic leukemia, or myeloproliferative neoplasms including, but not limited to, polycythemia vera, essential thrombocythemia, and primary myelofibrosis.

Certain embodiments are drawn to a combination comprising a compound targeted to TPO as described herein and a secondary agent, or a use thereof. In certain embodiments, the secondary agent is a cholesterol lowering agent, a blood pressure lowering agent, and a blood glucose lowering agent, an anti-inflammatory agent, or a combination thereof. In certain embodiments, such a combination is useful for the treatment of a cardiovascular disease, an inflammatory condition, an autoimmune disease, or a combination thereof.

In certain embodiment, a compound targeted to TPO as described herein, and a secondary agent are used in a combination treatment by administering the compound and the secondary agent simultaneously, separately or sequentially. In certain embodiments, the compound and the secondary agent are formulated as a fixed dose combination product. In other embodiments, the compound and the secondary agent are provided to the patient as separate units which can then either be taken simultaneously or serially (sequentially). In certain embodiments, the secondary agent is selected from a chemotherapeutic agent, a blood cholesterol lowering agent, a blood glucose lowering agent, a blood pressure lowering agent, an anti-inflammatory agent, and a combination thereof.

EXAMPLES

Non-Limiting Disclosure and Incorporation by Reference

While certain compounds, compositions and methods described herein have been described with specificity in accordance with certain embodiments, the following examples serve only to illustrate the compounds described herein and are not intended to limit the same. Each of the references recited in the present application is incorporated herein by reference in its entirety.

Example 1: Effect of Antisense Oligonucleotides Targeted to Mouse Thrombopoietin (TPO) In Vitro Modified oligonucleotides complementary to mouse TPO mRNA were designed and tested for their effect on TPO mRNA in vitro.

Mouse primary hepatocyte cells at a density of 20,000 cells per well were transfected by electroporation with 7,000 nM concentration of modified oligonucleotide or no modified oligonucleotide for untreated controls. After approximately 24 hours, RNA was isolated from the cells and TPO mRNA levels were measured by quantitative real-time PCR. Mouse primer probe set RTS35917 (forward sequence CCCTTTGTCTATCCCTGTTCTG, designated herein as SEQ ID NO: 3; reverse sequence ACTGCCCCTAGAATGTCCT, designated herein as SEQ ID NO: 4; probe sequence CCTTGCTCTGTTCCGTCTGGGTT, designated herein as SEQ ID: 5) was used to measure mRNA levels. TPO mRNA levels were adjusted according to total RNA content, as measured by RIBOGREEN®. Results are presented in the table below as percent control of the amount of TPO mRNA, relative to untreated control cells. The modified oligonucleotides with percent control values marked with an asterisk (*) target the amplicon region of the primer probe set. Additional assays may be used to measure the potency and efficacy of oligonucleotides targeting the amplicon region. Modified oligonucleotides that did not show any inhibition of TPO mRNA relative to untreated controls are represented as 100% control.

The modified oligonucleotides in Tables 1-4 below are 5-10-5 MOE gapmers. The gapmers are 20 nucleobases in length, wherein the central gap segment comprises ten 2'-deoxynucleosides and is flanked by wing segments on both the 5' end and on the 3' end comprising five 2'-MOE modified nucleosides. The sugar motif for the gapmers is (from 5' to 3'): eeeeedddddddddddeeeee; wherein 'd' represents a 2'-deoxyribose sugar and 'e' represents a MOE modified sugar. Each internucleoside linkage is a phosphorothioate internucleoside linkage and each cytosine residue is a 5'-methyl cytosine. "Start Site" indicates the 5'-most nucleoside to which the gapmer is complementary in the mouse nucleic acid sequence. "Stop Site" indicates the 3'-most nucleoside to which the gapmer is complementary in the mouse nucleic acid sequence.

Each modified oligonucleotide listed in Tables 1 through 4 below is complementary to mouse TPO nucleic acid sequences GENBANK Accession No. NT_082359_TRUNC_357491_368345 (NT_082359 truncated from nucleotides 357491 to 368345) (SEQ ID NO: 1), and GENBANK Accession No. NM_009379.3 (SEQ ID NO: 2), as indicated. 'N/A' indicates that the modified oligonucleotide is not complementary to that particular nucleic acid sequence with 100% complementarity. As shown below, modified oligonucleotides complementary to TPO reduced the amount of TPO mRNA.

TABLE 1

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 892827 | 414 | 433 | 14 | 33 | TCTCGAAGACTTTGTGGCGC | 100 | 6 |
| 892831 | 462 | 481 | 62 | 81 | AGTTTGAGTCCCGCGGCAAG | 100 | 7 |
| 892835 | N/A | N/A | 155 | 174 | CGCAGTTACAGTGATCGAGG | 93 | 8 |
| 892839 | 605 | 624 | 205 | 224 | ATCCACAGCCCGCTGGCCTG | 100 | 9 |
| 892843 | 5731 | 5750 | 277 | 296 | CTTTCGGCAGAGTCGGGTGG | 67 | 10 |
| 892847 | 5809 | 5828 | 355 | 374 | ACTGAAGTGGCTCCCTGTAT | 62 | 11 |
| 892851 | 6085 | 6104 | 414 | 433 | TGCAAGAAGCATGGCCGCCA | 45 | 12 |

TABLE 1-continued

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 892859 | 6480 | 6499 | 559 | 578 | GCAGCAGAACAGGGATAGAC | 21* | 13 |
| 892862 | N/A | N/A | 616 | 635 | GTGCCTTGCTCTGTTCCGTC | 15* | 14 |
| 892866 | 8503 | 8522 | 687 | 706 | GGAGGGTTCCAACTGTCCTC | 71 | 15 |
| 892890 | 9107 | 9126 | 1068 | 1087 | ACCAGGAGTAATCTTGACTC | 34 | 16 |
| 892894 | 9177 | 9196 | 1138 | 1157 | TCACAGGTCCGTGTGTCCTG | 29 | 17 |
| 892898 | 9230 | 9249 | 1191 | 1210 | TGAGGCTTCCAGGGTCTGAA | 26 | 18 |
| 892906 | 9333 | 9352 | 1294 | 1313 | GGAAGGGTGTGTGTCCATCA | 40 | 19 |
| 892910 | 9419 | 9438 | 1380 | 1399 | GTTAGGCATGGTGGTGGAAG | 56 | 20 |
| 892914 | 9496 | 9515 | 1457 | 1476 | GGCCAGTGCCCGCGCTATGT | 39 | 21 |
| 892918 | 9584 | 9603 | 1545 | 1564 | GTGAAAGCAGAACATCTGGA | 35 | 22 |
| 892922 | 9636 | 9655 | 1597 | 1616 | CTAAAATTTTACAATCTCCA | 44 | 23 |
| 892926 | 9693 | 9712 | 1654 | 1673 | CCAAAGATCGCTAGCTGCTC | 16 | 24 |
| 892930 | 9755 | 9774 | 1716 | 1735 | GACTTAATGTATGAAAGCAC | 27 | 25 |
| 892934 | 9808 | 9827 | 1769 | 1788 | TATGGTGTAGCATCTACCTG | 47 | 26 |
| 892938 | 9867 | 9886 | 1828 | 1847 | GTTGGAGGCGCGGGAAGGCT | 87 | 27 |
| 892942 | 9938 | 9957 | 1899 | 1918 | AGCAGTATATCTCGAGGACC | 28 | 28 |
| 892946 | 9994 | 10013 | 1955 | 1974 | TGTCTCTTAAGTAGGGACAG | 53 | 29 |
| 892950 | 10043 | 10062 | 2004 | 2023 | TTTTATTGGCTTTTGGGTGC | 59 | 30 |
| 892954 | 10093 | 10112 | 2054 | 2073 | GGCAGGGTCCAGGAGCTCTG | 57 | 31 |
| 892958 | 10154 | 10173 | 2115 | 2134 | CCAGCTGCACAGCCTTACCT | 54 | 32 |
| 892962 | 10203 | 10222 | 2164 | 2183 | GCTGATGCTCTTTGCTCAGC | 69 | 33 |
| 892970 | 10321 | 10340 | 2282 | 2301 | TCTGTGCTTGTCCTGCTGTG | 85 | 34 |
| 892974 | 10385 | 10404 | 2346 | 2365 | GGAGTGGCCACACAGGGCTG | 100 | 35 |
| 892978 | 4339 | 4358 | N/A | N/A | GTAGGAAGACACTGGTTGGG | 66 | 36 |
| 892985 | 633 | 652 | N/A | N/A | ACCCCGGATGCAGAGCGCAG | 100 | 37 |
| 892989 | 823 | 842 | N/A | N/A | TGCCCCACCCTGGCCTGCAG | 85 | 38 |
| 892993 | 1034 | 1053 | N/A | N/A | TCTACTTTGCAGACAGGGAC | 99 | 39 |
| 892997 | 1239 | 1258 | N/A | N/A | GCCTGCCCTACTCTAGAGGG | 93 | 40 |
| 893001 | 1512 | 1531 | N/A | N/A | TGGCTTCGCGCAGCGGGAGG | 100 | 41 |
| 893009 | 1882 | 1901 | N/A | N/A | GGCGACTGTGAGACGAGCCC | 77 | 42 |
| 893013 | 2134 | 2153 | N/A | N/A | GGGTCCCAGCCTGTCCCCCT | 100 | 43 |
| 893017 | 2331 | 2350 | N/A | N/A | CCCGAGGCTCAGCCTCTGCC | 100 | 44 |
| 893021 | 2538 | 2557 | N/A | N/A | GGAAGCACTGCTTGATTCTG | 97 | 45 |
| 893025 | 2786 | 2805 | N/A | N/A | GGGAAGAACGGTGCGCGCGC | 100 | 46 |
| 893033 | 3159 | 3178 | N/A | N/A | CCCTTGATTGCTCAATGATC | 89 | 47 |
| 893037 | 3395 | 3414 | N/A | N/A | ATGTCTTGATTCTCAGCACT | 97 | 48 |
| 893041 | 3731 | 3750 | N/A | N/A | GTTAAGATTGAGCCCAGAGG | 100 | 49 |

TABLE 1-continued

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 893045 | 3914 | 3933 | N/A | N/A | TGACAGCATGCTGGCTTGCT | 94 | 50 |
| 893049 | 4098 | 4117 | N/A | N/A | TCTCATGTCCTGGCGACATG | 100 | 51 |
| 893061 | 4747 | 4766 | N/A | N/A | CTTAAGCTAACAAGAATGAC | 100 | 52 |
| 893069 | 5115 | 5134 | N/A | N/A | AAGTGGGTAATAGAACTAGG | 70 | 53 |
| 893073 | 5323 | 5342 | N/A | N/A | GTCACCAGGCCAAGAAGAAA | 82 | 54 |
| 893077 | 5530 | 5549 | N/A | N/A | TTATAGTGCCTCCTCTTGTA | 79 | 55 |
| 893081 | 5684 | 5703 | N/A | N/A | TGAAAATGACAGAAATAGTG | 84 | 56 |
| 893085 | 5996 | 6015 | N/A | N/A | ACTCAGGGATCCCCATTTGG | 56 | 57 |
| 893089 | 6286 | 6305 | N/A | N/A | TGGTGGTCTCGCCAAAGACA | 32 | 58 |
| 893097 | 6715 | 6734 | N/A | N/A | GTAAGACTTTTTAAAAATTC | 87* | 59 |
| 893101 | 6899 | 6918 | N/A | N/A | GTGTCTCATCCCTGACTGGC | 67* | 60 |
| 893105 | 7133 | 7152 | N/A | N/A | AACAAGAATAAGAGTAGGTC | 77* | 61 |
| 893109 | 7429 | 7448 | N/A | N/A | GAAGGAGGAAAATGAGGAGG | 100* | 62 |
| 893113 | 7661 | 7680 | N/A | N/A | ATTTTGCCTTAATTTAGTGA | 61* | 63 |
| 893117 | 7799 | 7818 | N/A | N/A | TGCTATTGTTTATTTTTGA | 100* | 64 |
| 893121 | 8017 | 8036 | N/A | N/A | ATATGATGACACATGCCTGT | 59* | 65 |
| 893125 | 8214 | 8233 | N/A | N/A | GTAGCCTGGTCTTGCATAGA | 43* | 66 |
| 893129 | 8404 | 8423 | N/A | N/A | AAGTGGACTGCTTAAAAAAA | 91* | 67 |
| 893133 | 8727 | 8746 | N/A | N/A | GCCAGCACCCAGGTATCACG | 13 | 68 |

TABLE 2

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 892828 | 426 | 445 | 26 | 45 | GCCATCTTCTCTTCTCGAAG | 92 | 69 |
| 892832 | 474 | 493 | 74 | 93 | TGGGCCTGATGAAGTTTGAG | 100 | 70 |
| 892840 | 617 | 636 | 217 | 236 | GCAGCAATCTAGATCCACAG | 100 | 71 |
| 892844 | 5743 | 5762 | 289 | 308 | GCTTCTGTGCTTCTTTCGGC | 21 | 72 |
| 892848 | 5822 | 5841 | 368 | 387 | GCCAGGGTGTCTAACTGAAG | 91 | 73 |
| 892852 | 6099 | 6118 | 428 | 447 | GTTAGTCTTGCCACTGCAAG | 54 | 74 |
| 892879 | 8949 | 8968 | 910 | 929 | TGGTTGGCAGGGTCCGTCTG | 59 | 75 |
| 892895 | 9189 | 9208 | 1150 | 1169 | CATGAGTTCCATTCACAGGT | 56 | 76 |
| 892899 | 9242 | 9261 | 1203 | 1222 | GGGCGAGATGTCTGAGGCTT | 42 | 77 |
| 892903 | 9291 | 9310 | 1252 | 1271 | GAAGTCCACCCTGGAGGTTG | 57 | 78 |
| 892907 | 9348 | 9367 | 1309 | 1328 | AGGCAGGTGAAGGAGGGAAG | 70 | 79 |

TABLE 2-continued

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 892911 | 9447 | 9466 | 1408 | 1427 | ACATTGTGACTGGATGAGGG | 26 | 80 |
| 892915 | 9527 | 9546 | 1488 | 1507 | TGTCCCCGAGAGAAGCTGCA | 57 | 81 |
| 892919 | 9598 | 9617 | 1559 | 1578 | CCAGGGCCTTTTAGGTGAAA | 35 | 82 |
| 892923 | 9654 | 9673 | 1615 | 1634 | GTTAAAAAAAAATAGCTCCT | 66 | 83 |
| 892931 | 9768 | 9787 | 1729 | 1748 | CTAGGCATTTGCAGACTTAA | 71 | 84 |
| 892935 | 9821 | 9840 | 1782 | 1801 | TTTTGTTTTCTGATATGGTG | 100 | 85 |
| 892939 | 9901 | 9920 | 1862 | 1881 | ATTACAGTGAAGGGAAGGAG | 81 | 86 |
| 892943 | 9951 | 9970 | 1912 | 1931 | ATTCTTTATCAAGAGCAGTA | 40 | 87 |
| 892951 | N/A | N/A | 2016 | 2035 | TTGGTCCCTGATTTTTATTG | 100 | 88 |
| 892955 | 10108 | 10127 | 2069 | 2088 | TTAGCTTTCTTGGGAGGCAG | 47 | 89 |
| 892959 | 10166 | 10185 | 2127 | 2146 | CTCTTTACTGAGCCAGCTGC | 60 | 90 |
| 892963 | 10215 | 10234 | 2176 | 2195 | CCCTGCTGAGCTGCTGATGC | 81 | 91 |
| 892971 | 10347 | 10366 | 2308 | 2327 | GGAAATTATAAAGAGCCTTC | 61 | 92 |
| 892975 | 10398 | 10417 | 2359 | 2378 | TCCAATAAAGTTTGGAGTGG | 77 | 93 |
| 892986 | 678 | 697 | N/A | N/A | ACTGGTCCTCCTGGTACCTT | 100 | 94 |
| 892994 | 1082 | 1101 | N/A | N/A | ACTTCCCCCCTCCCGTTACA | 100 | 95 |
| 893002 | 1560 | 1579 | N/A | N/A | TGACTCCTGGCAAGTCTACA | 84 | 96 |
| 893014 | 2180 | 2199 | N/A | N/A | ACCCACTCCGCTCCCCCCTC | 76 | 97 |
| 893022 | 2586 | 2605 | N/A | N/A | TGGACTTGAGAGCAGGTTGG | 83 | 98 |
| 893026 | 2834 | 2853 | N/A | N/A | TGAATAAGAGATGCCTTCTA | 100 | 99 |
| 893034 | 3228 | 3247 | N/A | N/A | GCTCAGTCTTTCTACTAGGG | 89 | 100 |
| 893038 | 3497 | 3516 | N/A | N/A | CACTCCTTTAATTCTAGCGC | 100 | 101 |
| 893042 | 3779 | 3798 | N/A | N/A | CAGTATGGACAATATGTGGG | 88 | 102 |
| 893058 | 4612 | 4631 | N/A | N/A | GAGTCTGTGAATAATCCCTC | 49 | 103 |
| 893062 | 4793 | 4812 | N/A | N/A | GTGCCTTGGCTCACCTGACC | 57 | 104 |
| 893066 | 4976 | 4995 | N/A | N/A | CCCTGCCCCCTCCAGATCCC | 70 | 105 |
| 893070 | 5160 | 5179 | N/A | N/A | AATAAAACCCAGGACTTTTC | 82 | 106 |
| 893074 | 5394 | 5413 | N/A | N/A | GTTAGCTGGGAGAGAATGTG | 89 | 107 |
| 893078 | 5558 | 5577 | N/A | N/A | GGTCCCATATTTTCTTGTGA | 73 | 108 |
| 893086 | 6041 | 6060 | N/A | N/A | GTGACGGTGAAGGGTGGATA | 84 | 109 |
| 893090 | 6333 | 6352 | N/A | N/A | CCTCTAAGAGACCAATGCCA | 51 | 110 |
| 893094 | 6571 | 6590 | N/A | N/A | CTAGGCTGGCAGGTGTGAGG | 100* | 111 |
| 893102 | 6997 | 7016 | N/A | N/A | ACAAATATACATATATACAA | 100* | 112 |
| 893106 | 7180 | 7199 | N/A | N/A | GCTGCCATATATATATATAT | 80* | 113 |
| 893110 | 7477 | 7496 | N/A | N/A | ATAGCCAGGGATAGACATAA | 100* | 114 |
| 893114 | 7663 | 7682 | N/A | N/A | TGATTTTGCCTTAATTTAGT | 58* | 115 |
| 893118 | 7844 | 7863 | N/A | N/A | GGGATTCTACATAGTACAGG | 57* | 116 |

TABLE 2-continued

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 893122 | 8074 | 8093 | N/A | N/A | AACTGTCACCATAACCCTGA | 32* | 117 |
| 893126 | 8261 | 8280 | N/A | N/A | ATAACTGGTCATTGGCCTCT | 27* | 118 |
| 893134 | 8772 | 8791 | N/A | N/A | GGCCCACATATCAGGCCTCT | 80 | 119 |

TABLE 3

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 892833 | 501 | 520 | 101 | 120 | GGCCACACAGGTAGGCTGGG | 84 | 120 |
| 892837 | 580 | 599 | 180 | 199 | CGAGTATCCAAGGGATCCAG | 100 | 121 |
| 892841 | N/A | N/A | 233 | 252 | TCCCCGGATGCAGAGCGCAG | 100 | 122 |
| 892845 | 5756 | 5775 | 302 | 321 | GGAGGCGGCTTGAGCTTCTG | 54 | 123 |
| 892853 | 6131 | 6150 | 460 | 479 | GGTCACAGGCAGGAGCTACG | 58 | 124 |
| 892864 | 8462 | 8481 | 646 | 665 | GTAGAAGGGACACTGCCCCT | 23* | 125 |
| 892888 | 9082 | 9101 | 1043 | 1062 | CCCTGAAGCCTGCTCAGAAG | 24 | 126 |
| 892892 | 9150 | 9169 | 1111 | 1130 | ATCCAGAGATTTGGACTGGG | 43 | 127 |
| 892896 | 9205 | 9224 | 1166 | 1185 | GTTCCAGCAAAGAGCCCATG | 33 | 128 |
| 892900 | 9254 | 9273 | 1215 | 1234 | GTTGAAAGCTCCGGGCGAGA | 86 | 129 |
| 892904 | 9307 | 9326 | 1268 | 1287 | AGGCTTGGAGAAGGAGGAAG | 68 | 130 |
| 892908 | 9372 | 9391 | 1333 | 1352 | GTGGAGATCCATGGGTGGTG | 44 | 131 |
| 892912 | 9469 | 9488 | 1430 | 1449 | GACAAATTCCTGGGATGAGG | 20 | 132 |
| 892916 | 9555 | 9574 | 1516 | 1535 | GCTGCCTCTCAGCCTTCCTG | 55 | 133 |
| 892920 | 9610 | 9629 | 1571 | 1590 | TGTATCCCTTCCCCAGGGCC | 50 | 134 |
| 892928 | 9723 | 9742 | 1684 | 1703 | AGTGATTTTCAAATTTATAC | 70 | 135 |
| 892932 | 9781 | 9800 | 1742 | 1761 | AGGCAAGACCTGCCTAGGCA | 42 | 136 |
| 892944 | 9964 | 9983 | 1925 | 1944 | TGATAGCCTGTTAATTCTTT | 72 | 137 |
| 892948 | 10018 | 10037 | 1979 | 1998 | GTTATTCTCTTACAGGTTCA | 53 | 138 |
| 892952 | N/A | N/A | 2028 | 2047 | CAGTGAAGAACATTGGTCCC | 65 | 139 |
| 892960 | 10178 | 10197 | 2139 | 2158 | CATCCAAGTCTGCTCTTTAC | 59 | 140 |
| 892964 | 10228 | 10247 | 2189 | 2208 | GGCCTGGCTGAGCCCCTGCT | 100 | 141 |
| 892972 | 10359 | 10378 | 2320 | 2339 | AGGTGCATTTGTGGAAATTA | 63 | 142 |
| 892976 | 10420 | 10439 | 2381 | 2400 | GTCTGCCTTCATTTGGGAGG | 69 | 143 |
| 892987 | 725 | 744 | N/A | N/A | TGGAAGGCTCTACACTAGGT | 88 | 144 |
| 892991 | 931 | 950 | N/A | N/A | CTGATGGTTTCATTCCCTTA | 100 | 145 |
| 892995 | 1128 | 1147 | N/A | N/A | GTGTTGACAGTTATTGATCG | 95 | 146 |

TABLE 3-continued

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 893007 | 1790 | 1809 | N/A | N/A | CTGCTCCCTCCTCCCGCCCG | 72 | 147 |
| 893019 | 2447 | 2466 | N/A | N/A | ACAGCCAGAGTGAAAGGAAG | 73 | 148 |
| 893023 | 2632 | 2651 | N/A | N/A | TCTTGGATGAAGGAAAAGCA | 85 | 149 |
| 893027 | 2882 | 2901 | N/A | N/A | ATGGGCTATCTACTGAGGCG | 82 | 150 |
| 893031 | 3064 | 3083 | N/A | N/A | CTGCCGAGCCTCCCCCACAA | 100 | 151 |
| 893035 | 3291 | 3310 | N/A | N/A | TTTAAAATAGACAGACAGAC | 96 | 152 |
| 893039 | 3618 | 3637 | N/A | N/A | CTGACTCTCCTGGAGTGTCT | 100 | 153 |
| 893043 | 3824 | 3843 | N/A | N/A | AGTAGGTATTGCCTATATTA | 98 | 154 |
| 893047 | 4005 | 4024 | N/A | N/A | GGAAAGAGAGGTCTTGTTTT | 100 | 155 |
| 893051 | 4192 | 4211 | N/A | N/A | GGGACTAGAGCCCATGGCTG | 100 | 156 |
| 893055 | 4472 | 4491 | N/A | N/A | GCTAAGAGCCCGGTTCTTTT | 74 | 157 |
| 893059 | 4657 | 4676 | N/A | N/A | TTATTTTCTCATGGCCCCAA | 62 | 158 |
| 893063 | 4838 | 4857 | N/A | N/A | AGGTCTGTCAACAGACACAC | 57 | 159 |
| 893067 | 5024 | 5043 | N/A | N/A | TTCACCTTAGACACTGCCAG | 63 | 160 |
| 893071 | 5209 | 5228 | N/A | N/A | GGCAGGAATTAAAAGAGAAA | 68 | 161 |
| 893075 | 5439 | 5458 | N/A | N/A | TGTTACGCACACATTTTAAG | 70 | 162 |
| 893079 | 5575 | 5594 | N/A | N/A | CTGTTTGTGTTCCAACTGGT | 44 | 163 |
| 893083 | 5887 | 5906 | N/A | N/A | CGGCCAAGCCATTCTTGAAC | 33 | 164 |
| 893091 | 6391 | 6410 | N/A | N/A | GTCAGGATGGTGGCCCCTGA | 100 | 165 |
| 893099 | 6807 | 6826 | N/A | N/A | CCTATTTGATATATTGGTCA | 30* | 166 |
| 893103 | 7042 | 7061 | N/A | N/A | ATATATGTACTATCTCATAT | 91* | 167 |
| 893107 | 7225 | 7244 | N/A | N/A | GGTGCTGTGGCCAAGCTTAA | 65* | 168 |
| 893111 | 7572 | 7591 | N/A | N/A | TGGTCAGTGATGGCGCACGC | 43* | 169 |
| 893115 | 7708 | 7727 | N/A | N/A | AGGATTTCTGGTTTGTGTCA | 38* | 170 |
| 893119 | 7890 | 7909 | N/A | N/A | TGATTCATCCTTCTCCTGAC | 44* | 171 |
| 893123 | 8123 | 8142 | N/A | N/A | TGATACAAAACTGTTGCCCA | 60* | 172 |
| 893127 | 8307 | 8326 | N/A | N/A | AGGATGAGGGTCCCACCCAT | 80* | 173 |
| 893131 | 8633 | 8652 | N/A | N/A | TCCTTAGGAACTGAATAAAA | 63 | 174 |

TABLE 4

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 892830 | 450 | 469 | 50 | 69 | GCGGCAAGGCTTGACAGTGC | 104 | 175 |
| 892842 | N/A | N/A | 246 | 265 | GCCAAGGACTCTGTCCCCGG | 34 | 176 |
| 892854 | 6151 | 6170 | 480 | 499 | CAGTTTATTTAGGAGTCTGG | 45 | 177 |

TABLE 4-continued

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 892858 | 6468 | 6487 | 547 | 566 | GGATAGACAAAGGGTCGACG | 58* | 178 |
| 892869 | 8552 | 8571 | 736 | 755 | AGAGGAGGCGAACCTGCCCA | 139 | 179 |
| 892877 | 8915 | 8934 | 876 | 895 | ACCTTCTACCAGAAGCAGGA | 60 | 180 |
| 892881 | 8974 | 8993 | 935 | 954 | TGAGAAGTACTGCTTGGGAC | 74 | 181 |
| 892885 | 9044 | 9063 | 1005 | 1024 | GGCTGTGACACTGAAGTTCG | 32 | 182 |
| 892897 | 9217 | 9236 | 1178 | 1197 | GTCTGAAGTGAGGTTCCAGC | 25 | 183 |
| 892901 | 9267 | 9286 | 1228 | 1247 | CCAGGGAGCCTTTGTTGAAA | 80 | 184 |
| 892905 | 9321 | 9340 | 1282 | 1301 | GTCCATCAGGAGCAAGGCTT | 17 | 185 |
| 892913 | 9483 | 9502 | 1444 | 1463 | GCTATGTTTCCTGAGACAAA | 16 | 186 |
| 892917 | 9567 | 9586 | 1528 | 1547 | GGAGCAGATGCAGCTGCCTC | 53 | 187 |
| 892929 | 9739 | 9758 | 1700 | 1719 | GCACATATAGAGAATTAGTG | 41 | 188 |
| 892933 | 9796 | 9815 | 1757 | 1776 | TCTACCTGGGTTAAAAGGCA | 99 | 189 |
| 892937 | 9853 | 9872 | 1814 | 1833 | AAGGCTTAAACTTGAAGCAA | 50 | 190 |
| 892941 | 9926 | 9945 | 1887 | 1906 | CGAGGACCATACAGTCTCAC | 36 | 191 |
| 892945 | 9976 | 9995 | 1937 | 1956 | AGTCTTTCTAAGTGATAGCC | 41 | 192 |
| 892949 | 10030 | 10049 | 1991 | 2010 | TGGGTGCTCCCAGTTATTCT | 39 | 193 |
| 892953 | 10079 | 10098 | 2040 | 2059 | GCTCTGTTGCCCCAGTGAAG | 64 | 194 |
| 892957 | 10133 | 10152 | 2094 | 2113 | GGGTGTGGAGCTCCCAGGCT | 78 | 195 |
| 892969 | 10309 | 10328 | 2270 | 2289 | CTGCTGTGTGAGCCGAGGAG | 86 | 196 |
| 892977 | 10432 | 10451 | 2393 | 2412 | AAAGTCCTATAAGTCTGCCT | 31 | 197 |
| 892981 | N/A | N/A | N/A | N/A | CAAGGACTCTGTCCGGGTGG | 55 | 198 |
| 892992 | 976 | 995 | N/A | N/A | ATGTAACTTGTAAATAGCAG | 91 | 199 |
| 893000 | 1434 | 1453 | N/A | N/A | GGGCAGAGCCCGGAGCAGGC | 105 | 200 |
| 893004 | 1650 | 1669 | N/A | N/A | AGCACTGCCCATCCGTTCCG | 100 | 201 |
| 893016 | 2283 | 2302 | N/A | N/A | GGTGGACACCACCTCCAGGG | 135 | 202 |
| 893020 | 2493 | 2512 | N/A | N/A | CTGGGAAGTGAAGAAAGAGG | 85 | 203 |
| 893024 | 2680 | 2699 | N/A | N/A | AGCAGGACAAAGGAGGTGGG | 88 | 204 |
| 893028 | 2927 | 2946 | N/A | N/A | CTCTCTCCCTTGTCTTCCTC | 84 | 205 |
| 893036 | 3350 | 3369 | N/A | N/A | AGAGAGTTTAAGGCTAGCCT | 90 | 206 |
| 893040 | 3669 | 3688 | N/A | N/A | TTCCGAAGTTCAAATACCAG | 114 | 207 |
| 893044 | 3869 | 3888 | N/A | N/A | TCCAGAGGAGTGTCTTTCCT | 89 | 208 |
| 893048 | 4050 | 4069 | N/A | N/A | AGAGGGTTAGTCCAGGAGAA | 94 | 209 |
| 893052 | 4237 | 4256 | N/A | N/A | AGGTGAAGGCTCCCCCGGAA | 76 | 210 |
| 893060 | 4702 | 4721 | N/A | N/A | CGTTCCTCTGGACAAAGTTC | 47 | 211 |
| 893064 | 4883 | 4902 | N/A | N/A | AGTTGAGCCGAGACCTGCAC | 46 | 212 |
| 893068 | 5069 | 5088 | N/A | N/A | GGTGGCACTTACAGAGCAAG | 95 | 213 |

TABLE 4-continued

Reduction of mouse TPO RNA with modified oligonucleotides

| Compound Number | SEQ ID No: 1 Start Site | SEQ ID No: 1 Stop Site | SEQ ID No: 2 Start Site | SEQ ID No: 2 Stop Site | Sequence (5' to 3') | TPO (% control) | SEQ ID NO |
|---|---|---|---|---|---|---|---|
| 893072 | 5254 | 5273 | N/A | N/A | AGTGGGACTGAGGCAGACTG | 74 | 214 |
| 893076 | 5484 | 5503 | N/A | N/A | TCTTGGTGCCATCTACCAAT | 77 | 215 |
| 893080 | 5621 | 5640 | N/A | N/A | AACGGGTGCTTGGAGGCCTT | 59 | 216 |
| 893084 | 5945 | 5964 | N/A | N/A | AGACAGACCCCTTTTCTAGG | 104 | 217 |
| 893088 | 6236 | 6255 | N/A | N/A | GTCCCTTAACTCAGTTACAT | 48 | 218 |
| 893092 | 6439 | 6458 | N/A | N/A | TGACTCTGTTAAGAAAGATG | 85 | 219 |
| 893096 | 6670 | 6689 | N/A | N/A | CTGTAATAACAAGACGATCT | 51* | 220 |
| 893100 | 6854 | 6873 | N/A | N/A | CACTGCTTCCTGAGTGATGA | 59* | 221 |
| 893104 | 7087 | 7106 | N/A | N/A | ACCAACTTTTTATGGTATTC | 27* | 222 |
| 893108 | 7271 | 7290 | N/A | N/A | AGAGAGAGAGAGCAAGCTGA | 135* | 223 |
| 893112 | 7618 | 7637 | N/A | N/A | TGGGCAGCAGATCAGATTAC | 45* | 224 |
| 893116 | 7754 | 7773 | N/A | N/A | GCTAGCCTGTAGCTCCTCAT | 29* | 225 |
| 893120 | 7936 | 7955 | N/A | N/A | ATAGGTAGACCCTGTTACAA | 71* | 226 |
| 893124 | 8168 | 8187 | N/A | N/A | GCAGCTTTTAGCTCTAGGCT | 77* | 227 |
| 893128 | 8352 | 8371 | N/A | N/A | ATAGGAGTAGCCAGAAGGAT | 74* | 228 |
| 893132 | 8678 | 8697 | N/A | N/A | CCTTCATACACTGGAAGCAC | 13 | 229 |
| 893136 | 10049 | 10068 | N/A | N/A | TCTGATTTTTATTGGCTTTT | 69 | 230 |

Example 2: Platelet Count Reduction by Thrombopoietin (TPO) Antisense Oligonucleotide Treatment in BALB/c Mice Male BALB/c mice were administered saline control or 50 mg/kg of selected TPO antisense oligonucleotide described in the table above twice a week for four weeks on day 1, 5, 8, 12, 15, 19, 22, and 26 by subcutaneous injection. The mice (n=4 per treatment group) were analyzed for levels of TPO mRNA in the liver and platelet count (PLC). The PLC of certain treatment groups was not determined (N/D). The data is shown in Table 5. The data demonstrated a positive correlation between level of TPO liver mRNA inhibition and PLC reduction.

TABLE 5

TPO liver mRNA levels and platelet count in mice treated with saline or TPO ASOs

| Compound | TPO liver mRNA (% PBS control) | PLC (10³/µL) |
|---|---|---|
| PBS | 100 | 1153 |
| 892844 | 19 | N/D |
| 892897 | 25 | 320 |
| 892898 | 43 | 631 |
| 892905 | 20 | 370 |
| 892912 | 52 | 591 |
| 892913 | 15 | N/D |
| 892926 | 20 | 370 |
| 893099 | 39 | 474 |
| 893104 | 43 | 330 |
| 893126 | 34 | N/D |
| 893132 | 57 | 671 |
| 893133 | 21 | 489 |

Example 3: Platelet Count Reduction by Thrombopoietin (TPO) Antisense Oligonucleotide Treatment in FVBn Mice FVBn mice were administered saline control (n=3) or 50 mg/kg of ION 892897 TPO ASO (n=7) at days 1, 3, 5, 7, 14, 21, 28, 35, 42, 49, 56, and 63 by subcutaneous injection. Blood was taken at days 1, 14, 28, 42, 56, and 70 to determine plasma TPO levels and platelet count. Plasma TPO levels were measured and platelet count was measured by Plasma TPO levels were quantified by ELISA (Mouse Thrombopoietin Quantikine ELISA Kit) at day 70. As shown in Table 6, TPO ASO inhibited expression of plasma TPO and reduced platelet count. Levels or counts of red blood cells (RBC), hemoglobin (HGB), hematocrit (HCT), white blood cells (WBC), lymphocytes, monocytes, granulocytes, mean cell volume (MCV), mean corpuscular hemoglobin (MCH), mean corpuscular hemoglobin concentration (MCHC), red blood cell distribution width (RDW), mean platelet volume, and body weight were not appreciably different between saline and TPO ASO treated mice.

TABLE 6

Platelet count at day 70 of mice treated with saline or TPO ASO

|  | Saline (n = 3) | TPO ASO (n = 7) |
|---|---|---|
| Platelets ($10^7$/mL) | 1087 | 460 |

Example 4: Pharmacokinetic and Pharmacodynamic Effects of Thrombopoietin (TPO) Antisense Oligonucleotide Treatment in a Mouse Model of Spontaneous Breast Cancer (MMTV-PyMT)

The MMTV-PyMT transgenic mouse model of spontaneous breast cancer was selected to test the effects of TPO ASO treatment. MMTV-PyMT mice are described in Guy C T et al., *Mol Cell Biol* 1992; 12:954-61, which is incorporated by reference in its entirety. Treatment of the mice with TPO ASO was investigated. In the studies described below, MMTV-PyMT mice were administered saline control or 50 mg/kg of ION 892897 TPO ASO at days 1, 3, 5, 7, 14, 21, 28, 35, 42, 49, 56, and 63, or until euthanasia, whichever occurred first, from the indicated starting point by subcutaneous injection. The mice were assessed for platelet count, number of primary mammary tumors, individual tumor volume, total tumor volume, tumor growth inhibition, primary tumor intra-tumoral vessel density, primary tumor platelet deposition, pulmonary metastasis, number of tumors diagnosed at a given time or time to tumor diagnosis, and time to reaching combined tumor size of 2 $cm^3$.

Study 1: Platelet Count

Different cohorts of mice were assessed in this study: (1) MMTV-PyMT mice treated with saline (control; n=2-6); (2) MMTV-PyMT mice treated with ION 892897 TPO ASO at day 40 of age (TPO ASO 40; n=6); (3) MMTV-PyMT mice treated with ION 892897 TPO ASO at day 80 of age (TPO ASO 80; n=4-6), and (4) healthy control mice lacking the PyMT transgene (n=4).

Blood (20 µL) was drawn from tail tip using EDTA-prewetting micropipette tip, and then mixed with 180 µL of 5 mM EDTA in PBS. Platelet count was determined at days 40, 60, and 80 by using a complete blood counter. The average platelet count for each cohort at the given day is shown in Table 7. The data demonstrated that administration of TPO ASO reduced platelet count in MMTV-PyMT mice.

TABLE 7

Platelet count ($10^6$/mL) by treatment group

| Day | Control | TPO ASO 40 | TPO ASO 80 | Healthy control |
|---|---|---|---|---|
| 40 | 880 | 850 | 833 | 746 |
| 60 | 933 | 431 | 897 | 830 |
| 80 | 915 | 521 | 849 | 865 |
| 100 | 846 | 428 | 489 | 910 |

Study 2: Number of Mammary Tumors

The number of mammary tumors were measured by palpation at 80 days of age and results are presented in Table 8. The data demonstrated that administration of TPO ASO at day 40 reduced the number of palpable (macroscopic) mammary tumors at day 80. Mice administered TPO ASO at day 80 had a similar number of palpable tumors at day 80 as control treated mice, as expected.

TABLE 8

Number of Mammary Tumors

| Mouse No. | Control | TPO ASO40 | TPO ASO80 |
|---|---|---|---|
| 1 | 6 | 2 | 2 |
| 2 | 4 | 3 | 4 |
| 3 | 8 | 5 | 4 |
| 4 | 7 | 4 | 8 |
| 5 | 6 | 4 | 6 |
| 6 | 5 | 4 | 10 |
| 7 | 10 | 6 | 8 |
| 8 | 5 | 5 | 2 |
| 9 | 8 | 4 | 8 |
| 10 | 10 | 7 | 3 |

Study 3: Individual Tumor Volume

The volume of individual tumors in the mice at 80 days of age were measured by caliper. The results are shown in Table 9. The data demonstrated that the volume of individual tumors at day 80 was smaller in mice treated with TPO ASO at day 40 compared to control treated mice or mice administered TPO ASO at day 80.

TABLE 9

Individual Tumor Volume ($mm^3$)

| Sample No. | Control (from 10 mice) | TPO ASO40 (from 15 mice) | TPO ASO80 (from 10 mice) |
|---|---|---|---|
| 1 | 37 | 5 | 39 |
| 2 | 33 | 5 | 25 |
| 3 | 100 | 4 | 22 |
| 4 | 29 | 3 | 26 |
| 5 | 186 | 19 | 16 |
| 6 | 45 | 14 | 13 |
| 7 | 28 | 14 | 30 |
| 8 | 41 | 24 | 15 |
| 9 | 18 | 21 | 180 |
| 10 | 15 | 38 | 243 |
| 11 | 36 | 14 | 28 |
| 12 | 24 | 13 | 23 |
| 13 | 35 | 10 | 16 |
| 14 | 237 | 18 | 42 |
| 15 | 118 | 18 | 21 |
| 16 | 45 | 48 | 43 |
| 17 | 220 | 29 | 95 |
| 18 | 57 | 256 | 28 |
| 19 | 84 | 17 | 16 |
| 20 | 162 | 29 | 45 |
| 21 | 56 | 30 | 81 |
| 22 | 68 | 26 | 189 |
| 23 | 110 | 83 | 20 |
| 24 | 39 | 13 | 76 |
| 25 | 25 | 126 | 22 |
| 26 | 22 | 34 | 105 |
| 27 | 26 | 5 | 65 |
| 28 | 16 | 4 | 139 |
| 29 | 13 | 12 | 40 |
| 30 | 30 | 4 | 67 |
| 31 | 15 | 8 | 28 |
| 32 | 180 | 18 | 70 |
| 33 | 243 | 13 | 10 |
| 34 | 28 | N/A | 7 |
| 35 | 23 | N/A | 40 |
| 36 | 16 | N/A | 109 |
| 37 | N/A | N/A | 65 |
| 38 | N/A | N/A | 112 |
| 39 | N/A | N/A | 30 |
| 40 | N/A | N/A | 163 |
| 41 | N/A | N/A | 115 |

TABLE 9-continued

Individual Tumor Volume (mm³)

| Sample No. | Control (from 10 mice) | TPO ASO40 (from 15 mice) | TPO ASO80 (from 10 mice) |
|---|---|---|---|
| 42 | N/A | N/A | 28 |
| 43 | N/A | N/A | 11 |
| 44 | N/A | N/A | 40 |
| 45 | N/A | N/A | 19 |
| 46 | N/A | N/A | 11 |

Study 4: Tumor Growth Inhibition

Different cohorts of mice were assessed in this study: (1) MMTV-PyMT mice treated with saline (control; n=6); (2) MMTV-PyMT mice treated with ION 892897 TPO ASO at day 40 of age (TPO ASO 40; n=6); and (3) MMTV-PyMT mice treated with ION 892897 TPO ASO at day 80 of age (TPO ASO 80; n=6). Tumor volume measurement was started from 80 days of age. Each tumor size (length, width, and height) was measured by caliper every 3 days. Tumor volume was calculated as Tv=Length×Width×Height×0.52. The average tumor volume for each cohort at the given day is shown in Table 10. The data demonstrated that administration of TPO ASO inhibited tumor growth in MMTV-PyMT mice.

TABLE 10

Tumor volume (mm³) by treatment group

| Day | Control | TPO ASO 40 | TPO ASO 80 |
|---|---|---|---|
| 80 | 258 | 106 | 426 |
| 83 | 493 | 166 | 505 |
| 86 | 1144 | 207 | 993 |
| 89 | 1474 | 396 | 1482 |
| 92 | 2257 | 630 | 2218 |

Study 6: Primary Tumor Intra-Tumoral Vessel Density

Primary tumors were isolated from control mice and mice treated with TPO ASO day 40 at sacrificial endpoint, fixed with 4% PFA, applied with 30% sucrose, embedded in OCT compound, and sectioned at 8-μm thickness (100-μm interval). Tumor vasculature was visualized using microscopy by labeling with rabbit-anti-mCD34 monoclonal antibody and AF546-labeled secondary antibody. Five random fields and 3 different levels were imaged and used for quantification. Area of the CD34-positive cells was analyzed using ImageJ. Data set indicates mean of 3 levels. The data is presented in Table 11, and indicate that TPO ASO reduced vascularization of tumors.

TABLE 11

Percent area of CD34-positive cells

| Primary Tumor Number | Control | TPO ASO 40 |
|---|---|---|
| 1 | 2.9 | 0.40 |
| 2 | 4.2 | 0.94 |
| 3 | 4.4 | 2.7 |
| 4 | 1.8 | 2.2 |
| 5 | 2.9 | 1.3 |
| 6 | 2.6 | 1.5 |

Study 7: Primary Tumor Platelet Deposition

Primary tumors were isolated from mice (control and TPO ASO day 40) at sacrificial endpoint, fixed with 4% PFA, applied with 30% sucrose, embedded in OCT compound, and sectioned at 8-μm thickness (100-μm interval). Platelet deposition in the tumor vasculature was visualized by labeling with rabbit-anti-mCD34 monoclonal antibody and rat anti-mCD41 (MWReg300 antibodies, and AF-labeled secondary antibodies and using microscopy. Five random fields and 3 different levels were imaged and used for quantification. Platelet-adhered vessel was manually counted. Data set indicates mean of 3 levels. Results are presented in Table 12, and indicate that TPO ASO treatment reduced platelet accumulation in the tumors.

TABLE 12

Percent of platelet-deposited tumor vessel

| Primary Tumor Number | Control | TPO ASO 40 |
|---|---|---|
| 1 | 54 | 29 |
| 2 | 54 | 26 |
| 3 | 58 | 18 |
| 4 | 67 | 39 |
| 5 | 53 | 17 |
| 6 | 39 | 29 |

Study 8: Pulmonary Metastasis

Metastasis of breast tumors to the lung was assessed at the time of euthanasia using microscopy in MMTV-PyMT mice treated with saline (control; n=6) or ION 892897 TPO ASO at day 40 of age (TPO ASO 40; n=6). Lungs from the control and ASO40 treated mice were isolated at euthanasia endpoint, fixed with 4% PFA in PBS, embedded in paraffin, sectioned at 5-μm thickness, and stained with hematoxyline and eosin. Metastatic nodules were manually counted under the microscope and a mean of 5 different levels (100 μm-interval) was used for the statistics. The data are presented in Table 13, and indicate that TPO ASO treatment reduced the number of metastases in the lungs.

TABLE 13

Number of metastatic nodules in the lung

| Sample Number | Control | TPO ASO 40 |
|---|---|---|
| 1 | 6.2 | 11.8 |
| 2 | 14 | 0 |
| 3 | 17.4 | 3.4 |
| 4 | 7.6 | 5 |
| 5 | 10.8 | 1.4 |
| 6 | 17.8 | 5 |

The data demonstrated that administration of TPO ASO inhibited metastasis in MMTV-PyMT mice.

Study 9: Palpable Mammary Tumor Detection

Different cohorts of mice were assessed in this study: (1) MMTV-PyMT mice treated with saline (control; n=14); (2) MMTV-PyMT mice treated with ION 892897 TPO ASO at day 40 of age (TPO ASO 40; n=16); and (3) MMTV-PyMT mice treated with ION 892897 TPO ASO at day 80 of age (TPO ASO 80; n=12). Macroscopic tumor assessment was started from 40 days of age when none of the mice had yet developed a palpable mammary tumor. Mammary gland palpation was performed every 3 days. Table 14 shows the percentage of each cohort that had no detectable tumor in any of the mammary glands as a function of age (days). The data indicate that TPO ASO treatment starting at day 40 during microscopic tumor development had no effect on the appearance of at least one palpable tumor by day 77.

TABLE 14

Palpable Mammary Tumor Free Detection

| Days after birth | % control mice without palpable tumors (n = 14) | % ASO40 mice without palpable tumors (n = 16) | % ASO80 mice without palpable tumors (n = 12) |
|---|---|---|---|
| 45 | 93 | 88 | 100 |
| 46 | 93 | 75 | 100 |
| 50 | 79 | 75 | 75 |
| 51 | 79 | 69 | 67 |
| 52 | 71 | 69 | 58 |
| 55 | 71 | 69 | 42 |
| 56 | 64 | 56 | 33 |
| 58 | 42 | 50 | 33 |
| 59 | 36 | 44 | 33 |
| 60 | 21 | 31 | 33 |
| 61 | 21 | 31 | 25 |
| 63 | 7 | 31 | 25 |
| 64 | 7 | 25 | 25 |
| 66 | 0 | 25 | 25 |
| 67 | 0 | 19 | 25 |
| 70 | 0 | 19 | 17 |
| 72 | 0 | 19 | 8 |
| 74 | 0 | 0 | 8 |
| 77 | 0 | 0 | 0 |

Study 10: Overall Time to Sacrifice

Different cohorts of mice were assessed in this study: (1) MMTV-PyMT mice treated with saline (control; n=10); (2) MMTV-PyMT mice treated with ION 892897 TPO ASO at day 40 of age (TPO ASO 40; n=10); and (3) MMTV-PyMT mice treated with ION 892897 TPO ASO at day 80 of age (TPO ASO 80; n=10). Mice were sacrificed when total combined palpable mammary tumor volume reached 2000 mm³. Table 15 shows the percentage of mice that had a total tumor volume of less than 2000 mm³ as a function of age.

These data indicate that treatment during early tumor development decreases the rate of tumor growth in the mammary glands, and therefore delays time to euthanasia, which translates to a projected increase in survival. Thus, while ASO treatment at day 40 did not abolish the detection of palpable tumors in Study 9, ASO treatment at day 40 did delay tumor growth and/or reduce tumor size.

TABLE 15

Overall Time to Sacrifice

| Days after birth | % live control mice (n = 10) | % live ASO40 mice (n = 10) | % live ASO80 mice (n = 10) |
|---|---|---|---|
| 77 | 80 | 100 | 100 |
| 81 | 70 | 100 | 90 |
| 85 | 60 | 100 | 80 |
| 87 | 50 | 100 | 70 |
| 89 | 40 | 100 | 60 |
| 91 | 30 | 100 | 50 |
| 94 | 20 | 100 | 50 |
| 95 | 10 | 100 | 30 |
| 99 | 10 | 90 | 20 |
| 101 | 0 | 90 | 10 |
| 106 | 0 | 50 | 10 |
| 109 | 0 | 30 | 0 |
| 111 | 0 | 30 | 0 |
| 112 | 0 | 10 | 0 |
| 115 | 0 | 0 | 0 |

What is claimed is:

1. A method of treating breast cancer, myeloproliferative neoplasms, or a combination thereof in an individual, wherein thrombopoietin (TPO) or platelet activity contributes to initiation or progression of the breast cancer, myeloproliferative neoplasms, or combination thereof, the method comprising administering a compound comprising a modified oligonucleotide targeting TPO mRNA to the individual, thereby treating the breast cancer, myeloproliferative neoplasms, or combination thereof in the individual.

2. The method of claim 1, wherein the individual has a platelet count equal to or greater than about 100,000/μL, about 120,000/μL, about 150,000/μL, about 200,000/μL, about 250,000/μL, about 300,000/μL, about 350,000/μL, about 400,000/μL, about 450,000/μL, or about 500,000/μL before administering the compound.

3. The method of claim 1, wherein administering the compound safely and partially reduces platelet count while leaving sufficient synthesis of TPO to maintain hemostatically safe platelet count, wherein the platelet count of the individual is not reduced to less than about 25,000/μL.

4. The method of claim 1, wherein the modified oligonucleotide is single-stranded or double-stranded.

5. The method of claim 1, wherein the modified oligonucleotide is 12 to 30 linked nucleosides in length.

6. The method of claim 1, wherein the modified oligonucleotide comprises at least one modified internucleoside linkage, at least one modified sugar moiety, or at least one modified nucleobase.

7. The method of claim 6, wherein the at least one modified internucleoside linkage is a phosphorothioate internucleoside linkage, the at least one modified sugar is a bicyclic sugar or 2'-O-methyoxyethyl, and the at least one modified nucleobase is a 5-methylcytosine.

8. The method of claim 6, wherein at least one modified sugar comprises a 4'-CH(CH3)-O-2' bridge or a 4'-(CH2)n-O-2' bridge, wherein n is 1 or 2.

9. The method of claim 6, wherein each modified internucleoside is a phosphorothioate linkage.

10. The method of claim 6, wherein each cytosine is a 5-methylcytosine.

11. The method of claim 1, wherein the modified oligonucleotide comprises:
   a gap segment consisting of linked deoxynucleosides;
   a 5' wing segment consisting of linked nucleosides; and
   a 3' wing segment consisting of linked nucleosides;
   wherein the gap segment is positioned immediately adjacent to and between the 5' wing segment and the 3' wing segment and wherein each nucleoside of each wing segment comprises a modified sugar.

12. The method of claim 1, comprising co-administering the compound and at least one additional therapy.

13. The method of claim 12, wherein the compound and the at least one additional therapy are administered concomitantly or consecutively.

14. The method of claim 12, wherein the additional therapy is selected from an immunotherapy, an anti-cancer antibody, a cancer-specific antibody, a hormone therapy, an enzyme inhibitor, radiotherapy, targeted drug delivery, and surgery.

15. The method of claim 1, wherein the individual has a platelet count of from about 100,000/μL to about 2,000,000/μL before administering the compound.

16. The method of claim 1, wherein the myeloproliferative neoplasms comprise polycythemia vera, essential thrombocythemia, or primary myelofibrosis.

* * * * *